(12) United States Patent
Suwa et al.

(10) Patent No.: US 6,364,599 B1
(45) Date of Patent: Apr. 2, 2002

(54) ROBOT FOR HANDLING

(75) Inventors: Tatsunori Suwa; Kazuhiro Hatake; Shunsuke Sugimura, all of Hiratsuka (JP)

(73) Assignee: Komatsu Ltd., Toyko (JP)

( * ) Notice: Subject to any disclaimer, the term of this patent is extended or adjusted under 35 U.S.C. 154(b) by 0 days.

(21) Appl. No.: 09/142,502

(22) PCT Filed: Mar. 19, 1997

(86) PCT No.: PCT/JP97/00922

§ 371 Date: Sep. 10, 1998

§ 102(e) Date: Sep. 10, 1998

(87) PCT Pub. No.: WO97/35690

PCT Pub. Date: Oct. 2, 1997

(30) Foreign Application Priority Data

| Mar. 22, 1996 | (JP) | 8-065700 |
| Sep. 13, 1996 | (JP) | 8-243320 |
| Dec. 4, 1996 | (JP) | 8-324237 |
| Dec. 4, 1996 | (JP) | 8-324402 |

(51) Int. Cl.$^7$ .............................................. B25J 18/02
(52) U.S. Cl. ............................ 414/744.1; 414/744.5; 414/935; 414/222.01
(58) Field of Search .......................... 414/744.1, 744.5, 414/744.6, 941, 935

(56) References Cited

U.S. PATENT DOCUMENTS

| 5,151,008 A | | 9/1992 | Ishida et al. | |
| 5,447,409 A | * | 9/1995 | Grunes et al. | 414/744.6 |
| 5,647,724 A | * | 7/1997 | Davis, Jr. et al. | 414/744.5 |
| 5,857,826 A | * | 1/1999 | Sato et al. | 414/744.6 |
| 5,950,495 A | * | 9/1999 | Ogawa et al. | 414/941 |

FOREIGN PATENT DOCUMENTS

| EP | 0 567 121 | 10/1993 |
| JP | 3-136779 | 6/1991 |
| JP | 7-22777 | 8/1995 |
| WO | 97/26117 | 7/1997 |

* cited by examiner

Primary Examiner—Gregory A. Morse
(74) Attorney, Agent, or Firm—Wenderoth, Lind & Ponack, L.L.P.

(57) ABSTRACT

A handling robot comprises a first and a second robotic link mechanism (B1, B2) so configured as to be jointly rotatable. Each mechanism has a transfer table (8a, 8b) at its forward end and is adapted to operatively be projected and retracted in a radial direction with respect to the transfer table when operatively extended and contracted. The first and second robotic mechanisms are arranged so that the two transfer tables may located within a narrow angular range.

16 Claims, 60 Drawing Sheets

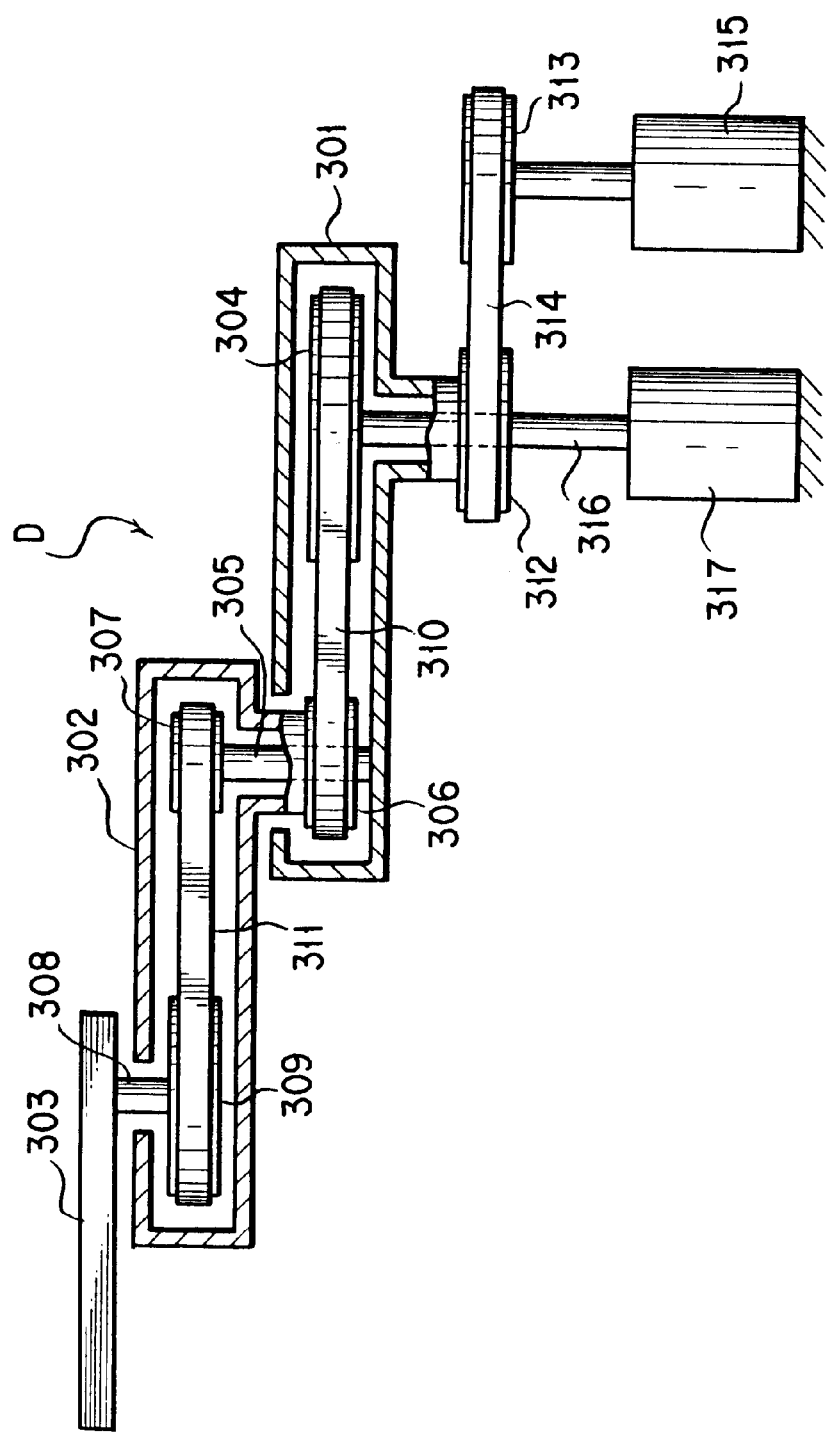

ROBOT FOR HANDLING

TECHNICAL FIELD

The present invention relates to a handling robot in a multiple chamber type manufacturing system such as a semiconductor manufacturing system and an LCD manufacturing system, in which a plurality of process chambers are disposed around a single transfer chamber to constitute a like plurality of stations, and in which a workpiece in the form of a thin plate such as a wafer that is to be machined and processed in each of the process chambers is conveyed by the handling robot that is arranged in the transfer chamber, via the transfer chamber from one of the process chambers to another.

BACKGROUND ART

A multiple chamber type semiconductor manufacturing system is constructed as shown in FIG. 1 of the drawings attached hereto and has a plurality of process chamber stations 2a, 2b, 2c, 2d and 2e disposed around a transfer chamber 1 and also has arranged therein a pair of workpiece delivery stations 3 by each of which the workpiece is delivered to an outside thereof, and in which the space within the transfer chamber 1 is kept in an evacuated state by a suction unit.

And, the above mentioned transfer chamber 1 is constructed as shown in FIG. 2 of the drawings attached hereto and has a handling robot A provided at a central region thereof so as to be rotatable. It is also provided with a plurality of partition walls 5 that serve as the peripheral walls thereof with each wall opposing to each of the process chamber stations 2a, 2b, 2c, 2d and 2e and the workpiece delivery stations 3 and in which there are also provided a plurality of gates 6 each of which constitutes both an inlet and an outlet for the workpiece to be fed into and out of each of the stations. Each such gate 6 is configured so as to be opened and closed by an opening and closing door (not shown) that is disposed in opposition to each of the gates 6 in the transfer chamber 1.

As a conventional handling robot of this sort that has been used with a semiconductor manufacturing equipment, there has hitherto been known a handling robot A of so called flog leg type with a pair of arms as shown in FIGS. 3 to 11 of the drawings attached hereto and a handling robot A' (see Japanese Unexamined Patent Publication No. Hei 7-227777) of identically directed operating type as shown in FIGS. 12 to 13B of the drawings attached hereto.

The above mentioned handling robot A of flog leg type with a pair of arms in the prior art is constructed as shown in FIGS. 3 to 6B.

In this construction, a boss section B is provided with the pair of arms, designated at 7a and 7b, of an identical length, which are arranged so as to be rotatable about a center of rotation. On the other hand, there are provided a pair of transfer tables 8a and 8b that have their respective bases, to each of which is connected one end of each of a pair of links 9a and 9b of an identical length, respectively. The one end of each of the both links 9a and 9b is coupled via a flog leg type transfer table attitude regulating mechanism to each of the transfer tables 8a and 8b, respectively, so that the two links 9a and 9b may be rotated in a pair of mutually opposite directions which are completely symmetrical with respect to the transfer tables 8a and 8b. And, one of the pair of links 9a and 9b which are coupled to the transfer tables 8a and 8b is pivotally coupled to one of the pair of arms 7a and 7b whereas the other of the links 9a and 9b is pivotally coupled to the other of the arms 7a and 7b, respectively.

FIGS. 4A and 4B in the drawings attached hereto show the transfer table attitude regulating mechanism of the above mentioned flog leg type, in which the respective forward end portions of the links 9a and 9b in the pair which are coupled to the transfer tables 8a and 8b are coupled together in an interlocking configuration that, as shown in FIG. 4A of the drawings attached hereto, comprises a pair of gears 9c and 9c which mesh with each other so that the angles of attitude $\theta_R$ and $\theta_L$ of the links 9a and 9b with respect to the transfer tables 8a and 8b may always be identical to each other. This allows each of the transfer tables 8a and 8b to be always oriented in a radial direction and operated in the radial direction when each of the arms 7a and 7b is rotated. It should be noted, however, that the above mentioned interlocking configuration for the links 9a and 9b may make use of a crossed belting arrangement 9d as shown in FIG. 4B of the drawings attached hereto, in lieu of the above mentioned gear arrangement.

FIG. 5 of the drawings attached hereto shows a mechanism for permitting the above mentioned arms 7a and 7b to be rotated independently each other. The respective bases of the arms 7a and 7b are each configured in the form of a ring shaped boss and such ring shaped bosses 10a and 10b are configured so as to be coaxial about the center of rotation and to be rotatably supported with respect to the transfer chamber 1.

On the other hand, the ring shaped bosses 10a and 10b have a pair of disk shaped bosses 11a and 11b disposed therein, respectively, wherein the ring shaped boss 10a, 10b and the disk shaped boss 11a, 11b corresponding thereto are arranged so as to be coaxial with each other. Each pair of a ring shaped boss 10a, 10b and a disk shaped boss 11a, 11b corresponding thereto are magnetically coupled with a corresponding one of magnetic couplings 12a and 12b, respectively.

The above mentioned pair of the disk shaped bosses 11a and 11b have their respective rotary shafts 13a and 13b which are arranged so as to be coaxial with each other. The rotary shafts 13a and 13b are coupled to the output sections of a pair of motor units 14a and 14b, respectively, which are coaxial with the frame 1a of the transfer chamber 1 and are supported with their positions deviated in their axial direction.

The above mentioned motor units 14a and 14b have each integrally coupled thereto a motor 15 which comprises, for example, an AC servo motor and a speed reduction gear 16 with a large speed reduction ratio which comprises, for example, a Harmonic Drive (trade name, identically referred to hereinafter). Such reduction gears 16 and 16 have their output sections which are coupled to the respective bases of the rotary shafts 13a and 13b, respectively. And, since the space within the transfer chamber 1 in which the arms 7a and 7b are positioned is held in an evacuated state, there is provided a sealing partition 17 each between the ring shaped boss 10a and the disk shaped boss 11a and between the ring shaped boss 10b and the disk shaped boss 11b of the present arm rotary mechanism.

FIGS. 6A and 6B show an operation of the above mentioned handling robot A. As shown in FIG. 6A, when the two arms 7a and 7b are located at a pair of diametrically symmetrical positions, respectively, with respect to the center of rotation, the links 9a and 9b will be in a state in which they assume their most expanded rotary positions with respect to each of the transfer tables 8a and 8b so that the latter may both be displaced toward the center of rotation.

In this state, by rotating the two arms 7a and 7b in an identical direction, it can be seen that the two transfer tables 8a and 8b will be rotated about the center of rotation whilst maintaining the radial positions thereof. Also, by rotating the two arms 7a and 7b in the directions in which they may approach towards each other (or in the mutually opposite directions), from the state shown in FIG. 6A, it can be seen that one of the transfer tables 8a that is located at such a position that the angle made by the two arms 7a and 7b is reduced will be pushed by the links 9a and 9b so as to be operatively projected in its radially outward direction so that it may be thrusted into one of the above mentioned process chamber stations 2a, 2b, 2c, 2d, 2e and 3 which are disposed adjacent to the radially outward side with respect to the transfer chamber 1 as shown in FIG. 6B. At this point of time, whilst the other of the transfer tables will be displaced towards the center of rotation, it can be seen that its amount of displacement will be small because of an angle that is made between the arm 7a, 7b and link 9a, 9b.

On the other hand, the latter handling robot A' of identically directed operating type in the prior art is constructed as shown in FIG. 12 to FIG. 13B of the drawings attached hereto.

The handling robot A' that is disposed within a transfer chamber has a cylindrical case 22 that is provided with a flange 24 at its upper end, and above the flange 24 there is provided a rotary table 23 such as to be rotatable and further displaceable vertically. And, a first driven shaft 25 is provided as projecting from the lower end surface of the rotary table 23 through the flange 24. And, the first driven shaft 25 is coupled to a first drive source 26 that is provided within the above mentioned case 22. Thus, the arrangement is so constructed that with the said drive source 26 operated to rotate the driven shaft 25, the said rotary table 23 may be rotated. Here, it should be noted that a drive source for vertically driving the rotary table is omitted from the illustration in the drawing.

The upper surface of the above mentioned rotary table 23 has the respective intermediate portions of a pair of first links 28a and 28b pivotally attached thereto. A pivotal section of one link 28a of the pair of links 28a and 28b has fastened thereto one end of a second driven shaft 29 that is provided as extending within the case 22. The other end of the second driven shaft 29 has coupled thereto a second drive source 30 that is also provided within the above mentioned case 22. Thus, the arrangement is so constructed that the one link 28a of the first pair of links 28a and 28b may be rotated via the second driven shaft 29 by the second drive source 30.

One end of each of the above mentioned pair of first links 28a and 28b has coupled thereto the corresponding one of a pair of second links 32a and 32b which are configured so as to be rotatable via a pair of second bearing shafts 31a and 31b, respectively. And, the forward ends of the pair of second links 32a and 32b have a first fork-like transfer table 8a' coupled thereto.

Also, the other end of each of the above mentioned first links 28a and 28b has coupled thereto a corresponding one of a pair of third links 35a and 35b which are configured so as to be rotatable via a pair of third bearing shafts 34a and 34b. And, the pair of third links 35a and 35b have at their forward ends a second fork-like transfer table 8b' coupled thereto.

And, whilst the above mentioned second bearing shaft 31a is configured so as to be rotatable with respect to the first link 28a and to be integral with the second link 32a, the above mentioned second bearing shaft 31b is configured so as to be integral with the first link 28b and to be rotatable with respect to the second link 32b. Also, whilst the third bearing shaft 34a is configured so as to be rotatable with respect to the first link 28a and to be integral with the said third link 35a, the above mentioned third bearing shaft 34b is configured so as to be integral with the first link 28b and to be rotatable with respect to the third link 35b.

The above mentioned two transfer tables 8a' and 8b' are deviated in position in a vertical direction and the first transfer table 8a' is displaced from the state shown in FIG. 12 in a retracting direction such that when the second transfer table 8b' is displaced in an advancing direction they may not interfere with each other. And, the two transfer tables 8a' and 8b' are then configured so as to be crossed in a state in which they are stacked one upon another vertically.

Each of the above mentioned bearing shafts 31a and 31b are projected at the lower sides of the first links 28a and 28b, respectively, and such projecting portions have fastened thereto a pair of second gears 36a and 36b which have an identical number of teeth. Also, each of the third bearing shafts 34a and 34b is projected towards each of the first links 28a and 28b, respectively and such projecting portions have fastened thereto, as shown in FIG. 13, a pair of third gears 37a and 37b which have an identical number of teeth, respectively. It should be noted that these pairs of gears, 36a and 36b; and 37a and 37b, respectively constitute synchronous mechanisms 38a and 38b.

The above mentioned two synchronous mechanisms 38a and 38b will enable one link 28a of the pair of first links 28a and 28b to be rotated in the direction of normal rotation or reverse rotation by the drive source 30 via the second driven shaft 29. The rotation will then be transmitted via the first and second synchronous mechanisms 38a and 38b to the other link 28b of the first links 28a and 28b and the second links 32a and 32b as well as to the third links 35a and 35b to cause the pair of transfer tables 8a' and 8b' to operatively be projected and retracted in an identical direction as shown in FIGS. 13A and 13B of the drawings attached hereto.

It may be noted at this point that the above mentioned conventional two handling robots A and A' have each been expected to provide a functional effect as a two arm robot by virtue of the advantage that a pair of transfer tables are provided and can alternately or consecutively be used for each of a variety of stations. It has been found, however, that as a matter of reality there arises following problems.

More specifically, since a process order has been determined, it should be noted that where a wafer that has been processed in a process chamber station is successively transferred to a series of the succeeding stations, each of these stations contains a wafer that is being or that has been processed. Then, if a wafer that has been processed within a given station is exchanged with an unprocessed wafer therein, what the above mentioned former handling robot A in the prior art does is first to support an unprocessed wafer $W_1$ on one of the transfer tables 8a and then to turn the handling robot A so as to oppose the other vacant transfer table 8b to the station 2e where the wafers are to be exchanged with each other (see FIG. 7).

Then, it will project the vacant transfer table 8b into the station 2e and receive a processed wafer $W_2$ thereon (FIG. 8) to convey it into the transfer chamber 1. Thereafter, the handling robot A will be turned by 180° (FIG. 9) to oppose the transfer table 8a supporting the unprocessed wafer $W_1$ to the above mentioned station 2e and will then operatively project it into the station 2e (FIG. 10) and to convey the said unprocessed wafer $W_1$ into the station 2e. The transfer table 8a that has then become vacant will be operatively retracted into the transfer chamber 1 (FIG. 11).

In this way, with the former handling robot A in the prior art, the problem has been encountered that each time a wafer is exchanged for a given station, it has to be turned by 180° thus prolonging the cycle time for each individual wafer exchanging operation.

On the other hand, if the latter handling robot A' in the prior art is adopted, it can be seen that since the two transfer tables 8a' and 8b' are configured so as to be operatively projected and retracted in an identical direction, not only can a given workpiece be conveyed into a given process chamber but another workpiece can be conveyed out thereof while the handling robot A' remains deactuated. Whilst with the handling robot A' there is thus the advantage that the cycle time for conveying a workpiece into and out of a process chamber can be reduced and the projecting/retracting operation for each of the two transfer tables 8a' and 8b' can be carried out with a single drive source or a small number of drive sources, not the feature that is lacking with the former handling robot A in the prior art, it has been found, however, that there have arisen there the problems which are mentioned below.

Specifically, inasmuch as the said handling robot A' allows the state in which the two transfer tables are stacked one upon another vertically at an identical position to be projected and retracted each time the transfer operation is performed, there has always been a fear that a dust that had deposited upon the upper transfer table might fall onto the upper surface of a workpiece that was held on the lower transfer table, thus contaminating a surface of the lower workpiece.

Also, the two transfer tables being deviated in position vertically, the lacking of a vertical displacement feature will, if those transfer tables are alternately projected and retracted without moving vertically, cause the width of a vertical aperture of the gate to be enlarged by the amount of vertical deviation of the transfer tables with an unfavorable result with respect to an air tight retention of such a gate portion. For this reason, the above mentioned handling robot A' of an identically directed operating type in the prior art has involved the problem that it requires a vertical displacement mechanism to be provided, thus complicating its structure for this provisioning. Also, when a workpiece is delivered onto a workpiece supporting table in a process chamber, it has been necessary that at least one transfer table should be moved vertically a distance by which it has been deviated in a vertical direction. Thus, an additional process step has been required and this has been an undesirable obstruction for the cycle time of a workpiece input and output conveyance to be reduced.

Accordingly, the present invention has been made with the foregoing problems taken into account, and has for its generic object to provide a handling robot that needs not to be turned at all or may be turned with a small angle in the order of 45° for a given process chamber, to enable a wafer that has been processed within a station and a wafer unprocessed within a transfer chamber to be exchanged with each other. It is also a further object of the present invention to provide a handling robot whereby a dust dispersed from one transfer table may not fall onto both transfer tables and yet a vertical displacement mechanism is not required, without moving the entire robot vertically the width of a gate in a vertical direction can only be for a single transfer table, a minimum number of simplified mechanisms can only be included, the air tight feature of a gate portion gives a performance substantially equal to the said former type in the prior art and at the same time the cycle time for a workpiece input and output conveyance can be substantially reduced.

SUMMARY OF THE INVENTION

In order to achieve the object mentioned above, there is provided in accordance with the present invention, in a certain aspect thereof, a handling robot, which comprises a first and a second robotic link mechanism which are so configured as to be jointly rotatable, each robotic link mechanism having a transfer table at a forward end thereof to mount a workpiece and adapted to operatively be projected and retracted in a radial direction of the transfer table when they operatively extended and contracted, and in which the first and second robotic link mechanisms are arranged so that the two transfer tables may be located in a narrow angular range.

At this point it should be noted that when one of the robotic link mechanisms is operatively projected, the other robotic link mechanism will be operatively retracted. The above mentioned projecting operation will cause the transfer table to be projected from the transfer chamber into the process chamber station to deliver a workpiece mounted on the transfer table into the process chamber, or alternatively to receive a workpiece from the process chamber station. Also, the retracting operation will cause the transfer table to be retracted from the process chamber into the transfer chamber side. Also, the two robotic link mechanisms may be in a retracting state so as to be rotated in the transfer chamber.

According to the above mentioned construction, it is possible to alternate a projecting operation and a retracting operation for the first and second transfer tables within a narrow angular range, this causing a wafer that has been processed in a station and an unprocessed wafer in the transfer chamber to be exchanged with each other without turning the handling robot at all or by only slightly turning the same for a given station. This will allow the cycle time for exchanging the wafers with each other to be largely reduced.

In the construction mentioned above, each of the first and second robotic mechanisms comprises:

a plurality of bosses which may be rotated independently from each other;

a drive source respectively connected to each of the bosses;

two pairs of arms which are composed of one or two arms respectively provided for each of the bosses;

a pair of links coupled to each pair of such arms at forward ends thereof, respectively; and the transfer tables coupled to the pair of links at forward ends thereof, respectively.

And also, in the construction mentioned above, it is preferred that there should be provided;

a first, a second and a third boss as aforesaid;

a first arm as aforesaid that is provided for the first boss on;

a second and a third arm as aforesaid which are provided for the second boss;

a fourth arm as aforesaid that is provided for third boss on a side surface thereof;

a first transfer table as aforesaid that is provided for the first and second arms at a forward end thereof via a pair of links; and a second transfer table as aforesaid that is provided for the third and fourth arms at a forward end thereof via a pair of links.

In the construction mentioned above, the first arm is radially directed and is provided for the first boss on a side surface thereof;

the second and third arms are radially directed and provided for the second boss on a side surface thereof so that they may be located at diametrically opposite sides of the second boss, respectively;

the fourth arm is radially directed and is provided for the third boss on a side surface thereof.

According to the preceding construction, it can be seen that with the first and second arms being rotated together in a direction in which they approach a side of the first transfer table that is coupled thereto via the links, the said first transfer table will be operatively projected. On the other hand, the third and fourth arms will then be rotated together in a direction in which they depart from the second transfer table that is coupled thereto via the links, this allowing the said second transfer table to be held in a retracted state.

In the above mentioned state, it can also be seen that with the third and fourth arms at this time being rotated together in a direction in which they approach the second transfer table that is coupled thereto via the links, the second transfer table will be operatively projected whilst the first transfer table on the contrary will be operatively retracted.

Also, in the above mentioned construction, it is preferred that there should be provided:

a first and a second boss as aforesaid;

a first and a second arms as aforesaid which are provided for the first boss;

a third and a fourth arms as aforesaid which are provided for the second boss;

a first transfer table as aforesaid that is provided for the first and fourth arms at a forward end thereof via the pair of links; and a second transfer table as aforesaid that is provided for the second and third arms at a forward end thereof via the pair of links.

In the construction mentioned above, the first and second arms are radially directed and are provided for the first boss on a side surface thereof so that they may be located at diametrically opposite sides of the first boss, respectively;

the third and fourth arms are radially directed and are provided for the second boss so that they may be located at diametrically opposite sides of the second boss, respectively, one of the third and fourth arms being provided on a surface of the second boss and the other of the third and fourth arms being located on a top surface of the second boss via an upstanding leg column.

And also, in the construction mentioned above, the first and second arms are radially directed and are provided for the first boss on a surface thereof so that they may be located at diametrically opposite sides of the first boss, respectively;

the third and fourth arms are radially directed and provided for the second boss on a side surface thereof so that they may be located at diametrically opposite sides of the second boss, respectively.

According to the preceding construction, it can be seen that with the first and fourth arms being rotated together in a direction in which they approach a side of the the first transfer table that is coupled thereto via the the links, the said first transfer table will be operatively projected. On the other hand, the second and third arms will be rotated in a direction in which they depart from the second transfer table that is coupled thereto via the links, this allowing the second transfer table to be held in a retracted state.

In the above mentioned state, it can also be seen that with the second and third arms at this time being rotated together in a direction in which they approach the second transfer table via the said links, the second transfer table will be operatively projected whilst the first transfer table on the contrary will be operatively retracted.

Also, in the construction mentioned above, the first and second robotic link mechanisms can be arranged so that the two transfer tables may be stacked one above another vertically.

Also, the first and second robotic link mechanisms can be arranged so that the two transfer tables may not be stacked one above another vertically but may be deviated in position in a rotary direction thereof.

According to the preceding construction, it can be seen that since the transfer tables are not stacked one above another, even if a dust is dispersed from either of the transfer tables, there will be no contamination thereby of a wafer on the other transfer table. It should be noted at this point that whilst if a wafer is put into and out of a given station, the two robotic link mechanisms need to be rotated by an angle corresponding to an amount of deviation, the deviation, being in an order in which the two transfer tables are not stacked one upon another, will be slight.

Also, the construction mentioned above may be constituted of:

a rotary table;

a first drive source operatively connected to the rotary table;

a first and a second drive link mechanism supported by the rotary table so as to be each rotatable;

a second drive source operatively connected to one of the first and second drive link mechanisms;

a first and a second driven link mechanism, each having one end coupled to each of the first and second drive link mechanisms at a forward end thereof, respectively, so that they may be synchronously rotated following a rotation of each of the drive link mechanisms; and a first and a second transfer table as aforesaid connected to the first and second driven link mechanisms, respectively.

According to the preceding construction, the first and second robotic link mechanisms will have their respective drive link mechanisms aforesaid rotate with a drive shaft so that the two transfer tables may be alternately projected and retracted via the driven link mechanisms. And, by causing the said rotary table to rotate with another drive source, the said two robotic mechanisms will be jointly rotated.

It should also be noted that any of said drive link mechanisms and the driven link mechanisms of the first and second robotic link mechanisms may be constituted by either a parallel link mechanism or a belt mechanism.

Also, in the construction mentioned above, it is preferable that the first and second robotic link mechanisms should be arranged so that the two transfer tables coupled respectively thereto may have an identical position in a vertical direction.

According to the preceding construction, it is advantageous that the projecting and retracting operation for the transfer tables by the first and second robotic link mechanisms is carried out at an identical position in a vertical direction. For this reason, not only is a vertical displacement mechanism required there but also this construction will enable the vertical width of a gate of the transfer chamber through which they are projected and retracted to be only for a single transfer table as aforesaid to enhance the air tightness of such a gate portion whilst simplifying the entire construction of the handling robot.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are not intended to limit the present invention, but rather to facilitate an explanation and understanding thereof.

In the accompanying drawings:

FIG. 55 is an explanatory view showing a relationship between the link length of the first bidirectional rotary link mechanism and the rotary angle or the like;

FIG. 59 is an explanatory view showing a relationship between the link length of the second bidirectional rotary link mechanism and the rotary angle or the like;

FIG. 62 is an explanatory view showing a relationship between the link length of a third bidirectional rotary link mechanism and the rotary angle or the like;

FIG. 64 is an explanatory view showing a relationship between the link length of a fourth bidirectional rotary link mechanism and the rotary angle or the like;

FIG. 72 is a cross sectional view showing the ninth embodiment of the present invention.

BEST MODES FOR CARRYING OUT THE INVENTION

Hereinafter, suitable embodiments of the present invention with respect to a handling robot will be set forth with reference to the accompanying drawings hereof.

Figure 1:
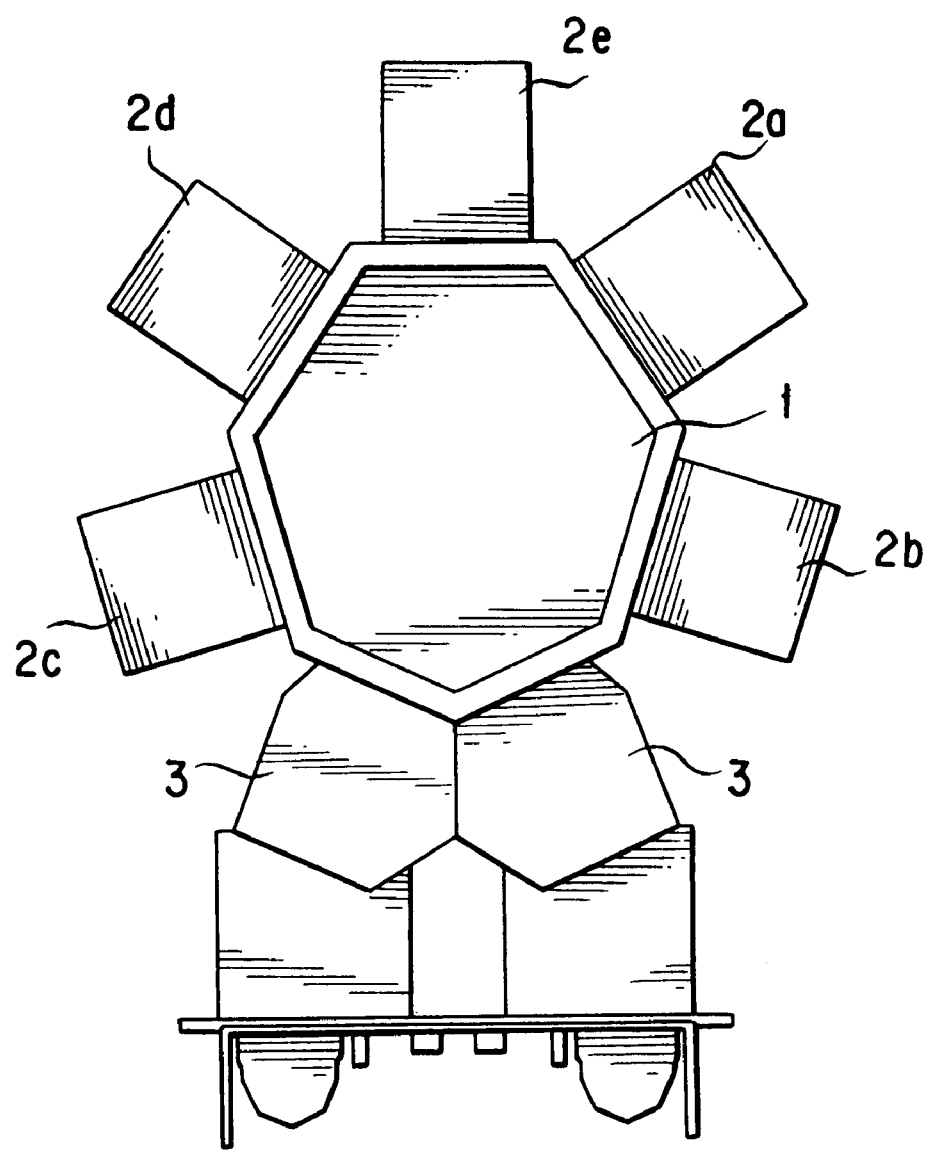
FIG. 1 is a diagrammatic top plan view of a semiconductor manufacturing equipment as an example of such equipment of multiple chamber type.
Figure 2:
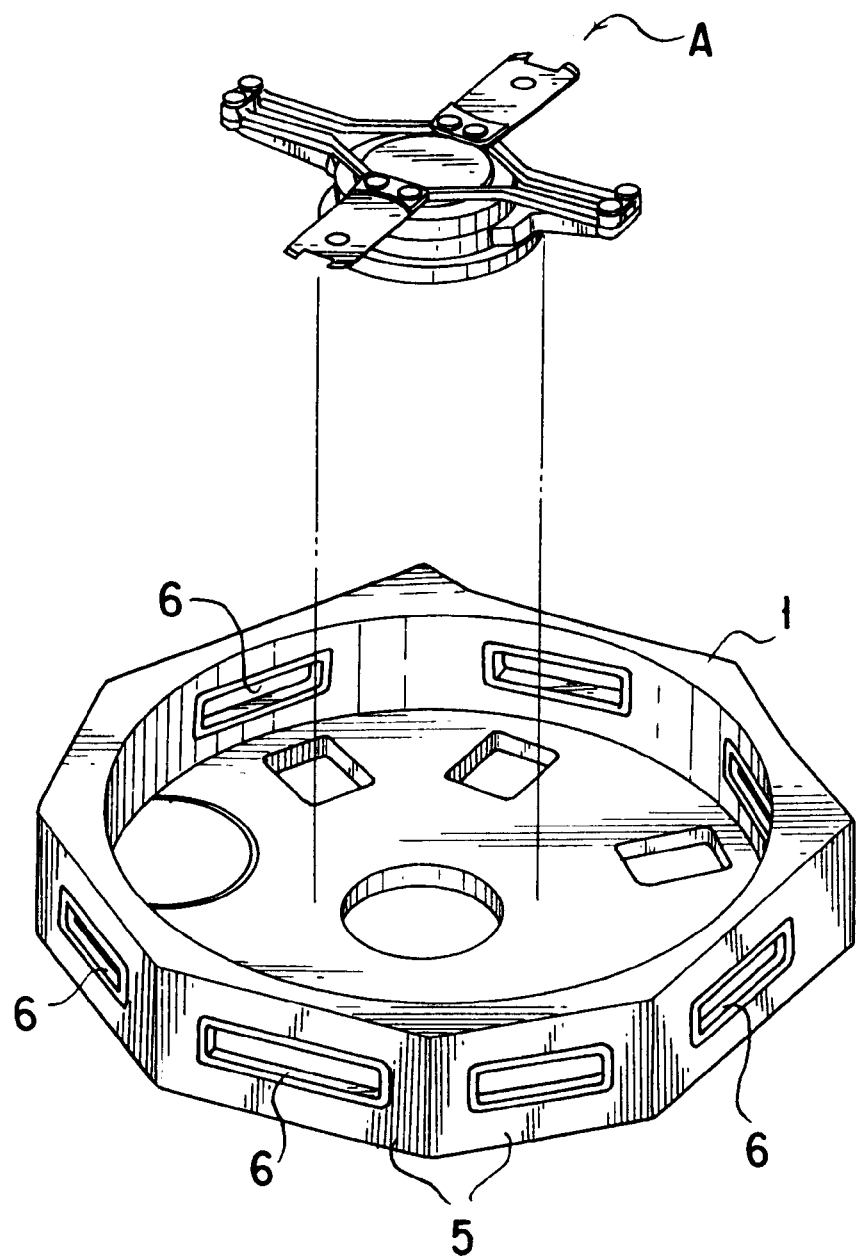
FIG. 2 is an exploded perspective view showing the relationship between a transfer chamber and a conventional handling robot.
Figure 3:
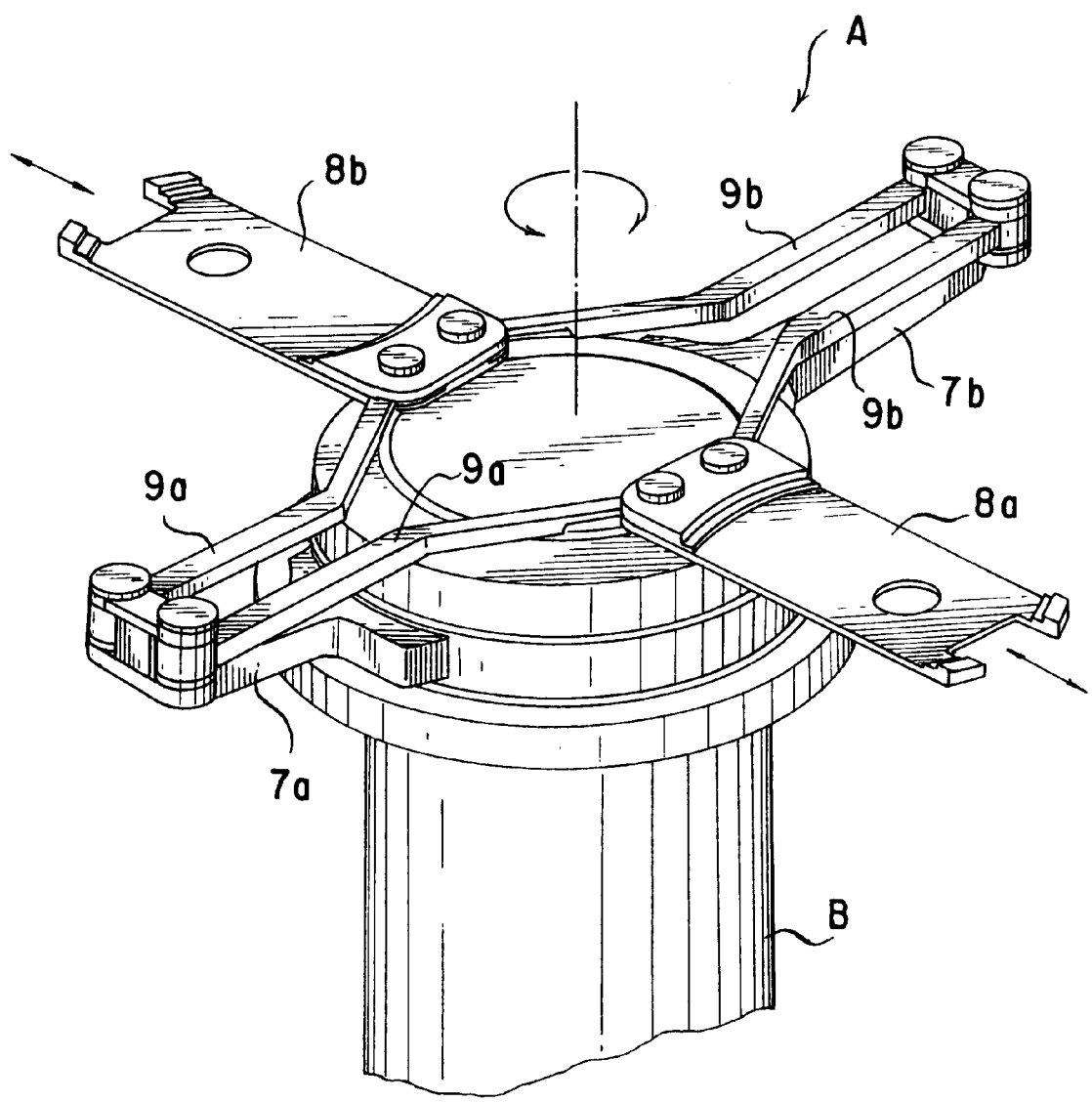
FIG. 3 is a perspective view showing a conventional handling robot.
Figure 4A:
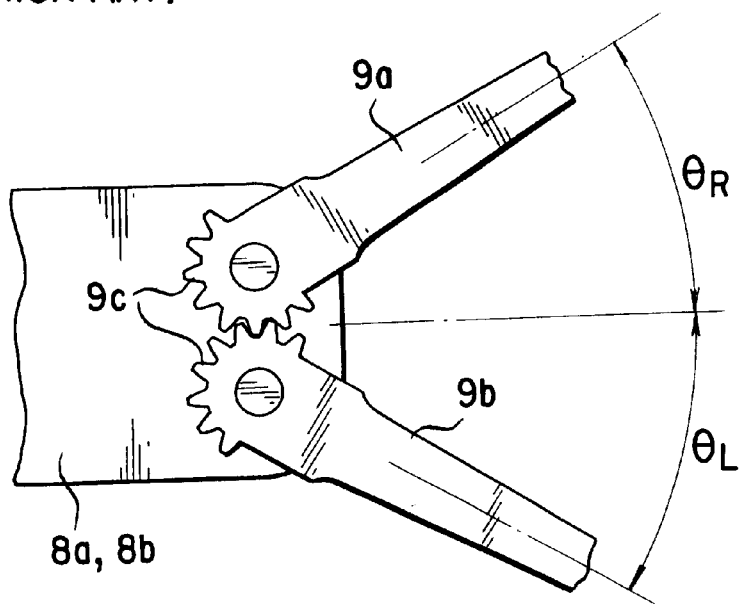
FIGS. 4A and 4B are explanatory views, each showing a transfer table attitude regulating mechanism.
Figure 4B:
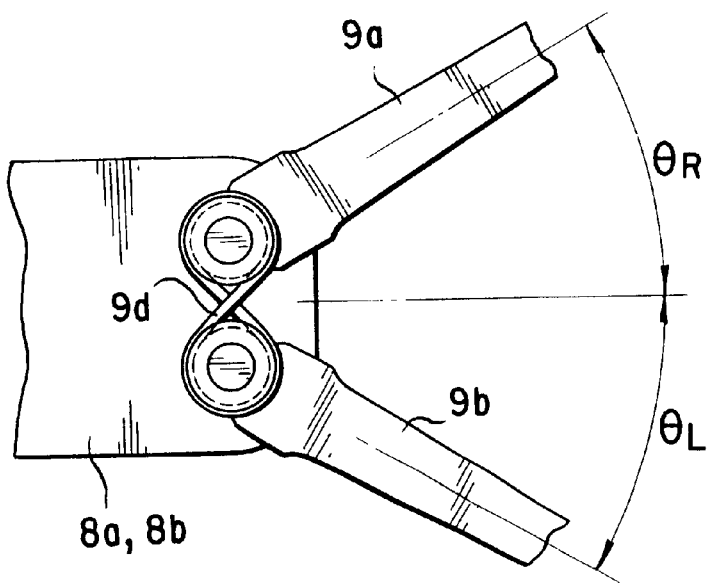
Figure 5:
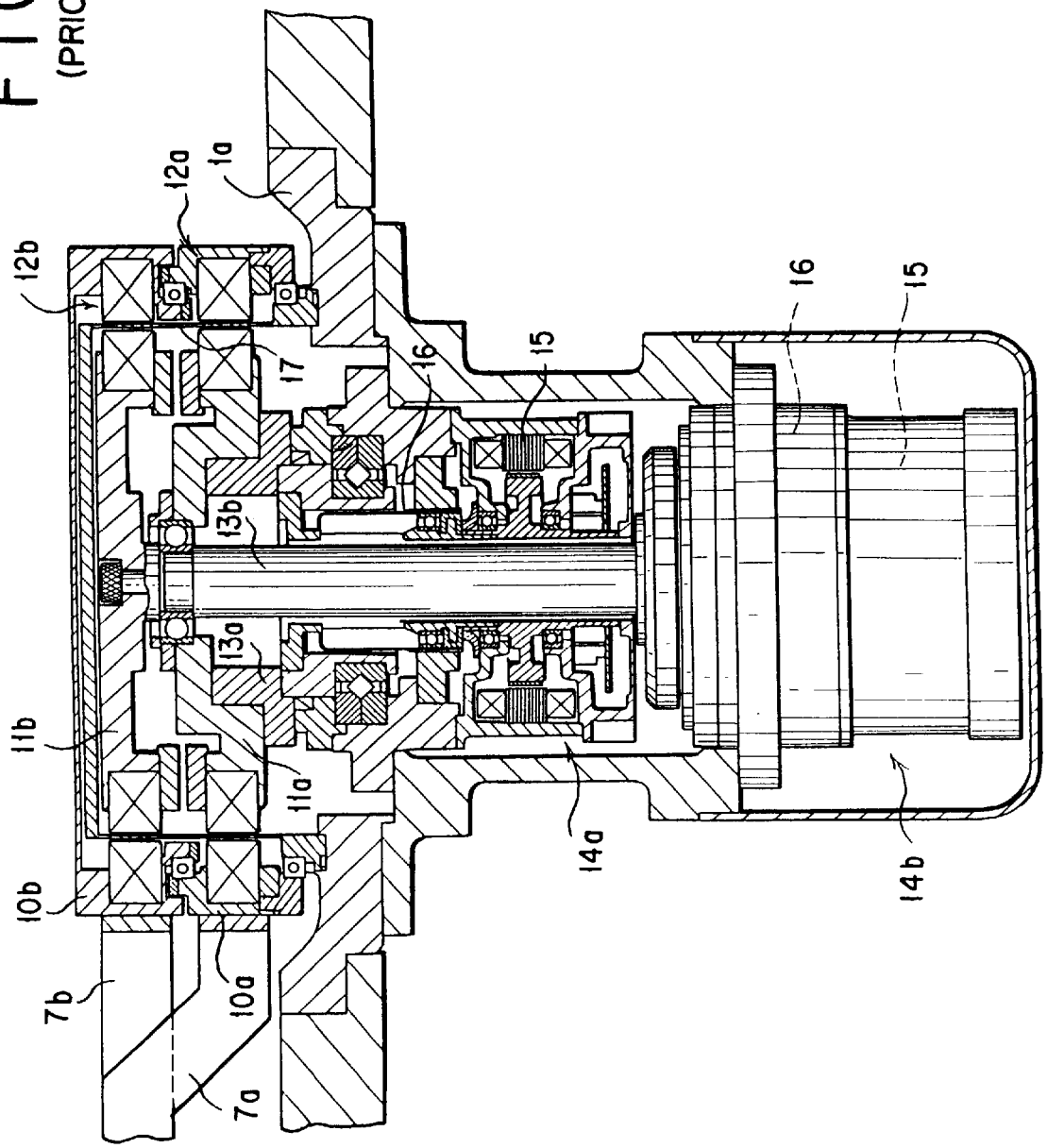
FIG. 5 is a cross sectional view showing a conventional arm rotating mechanism.
Figure 6A:
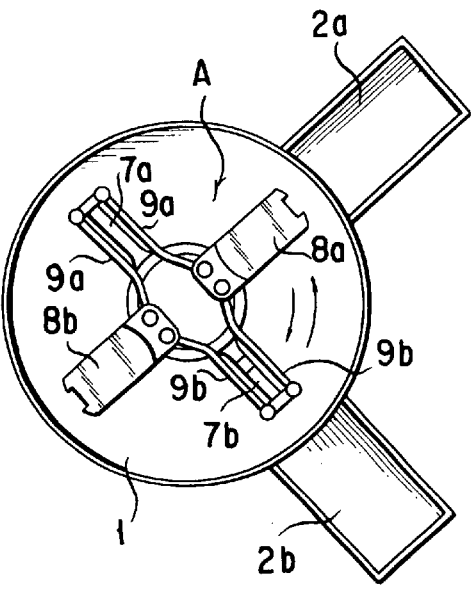
FIGS. 6A and 6B are operational explanatory views for a conventional handling robot.
Figure 6B:
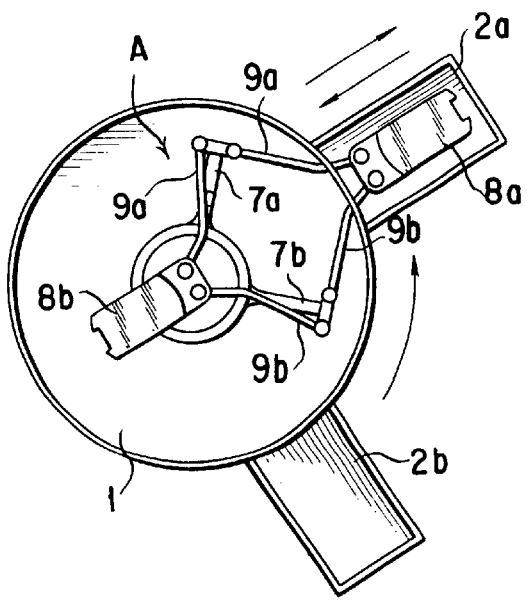
Figure 7:
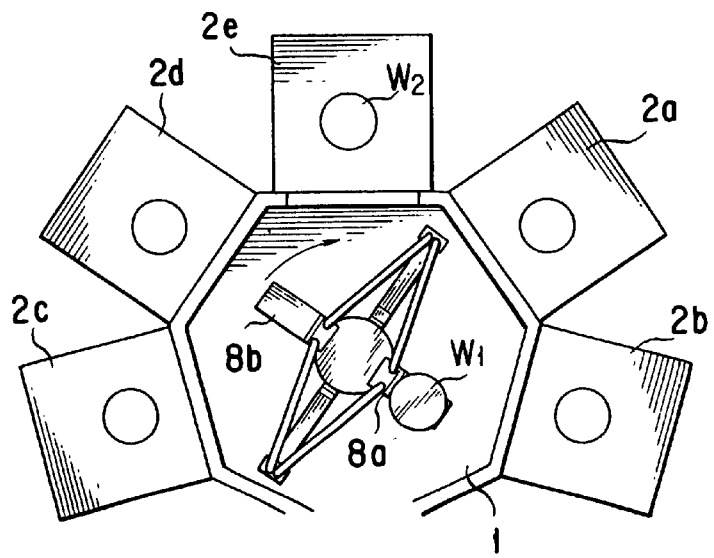
FIG. 7 is an operational explanatory view for a given station of a conventional handling robot.
Figure 8:
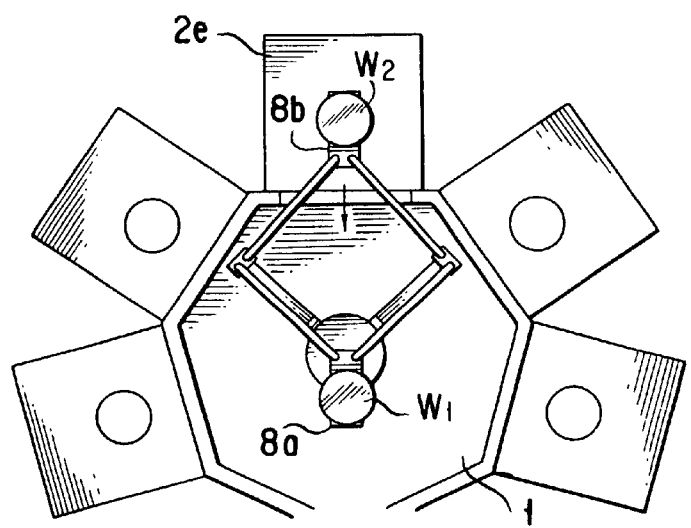
FIG. 8 is an operational explanatory view for a given station of a conventional handling robot.
Figure 9:
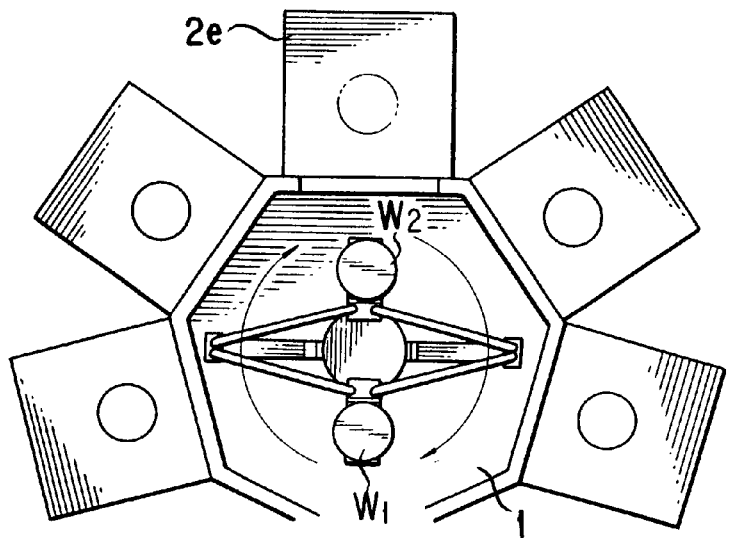
FIG. 9 is an operational explanatory view for a given station of a conventional handling robot.
Figure 10:
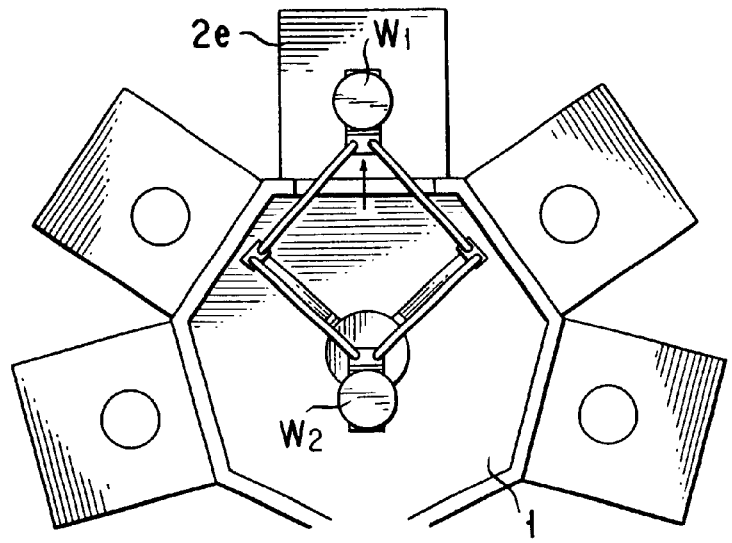
FIG. 10 is an operational explanatory view for a given station of a conventional handling robot.
Figure 11:
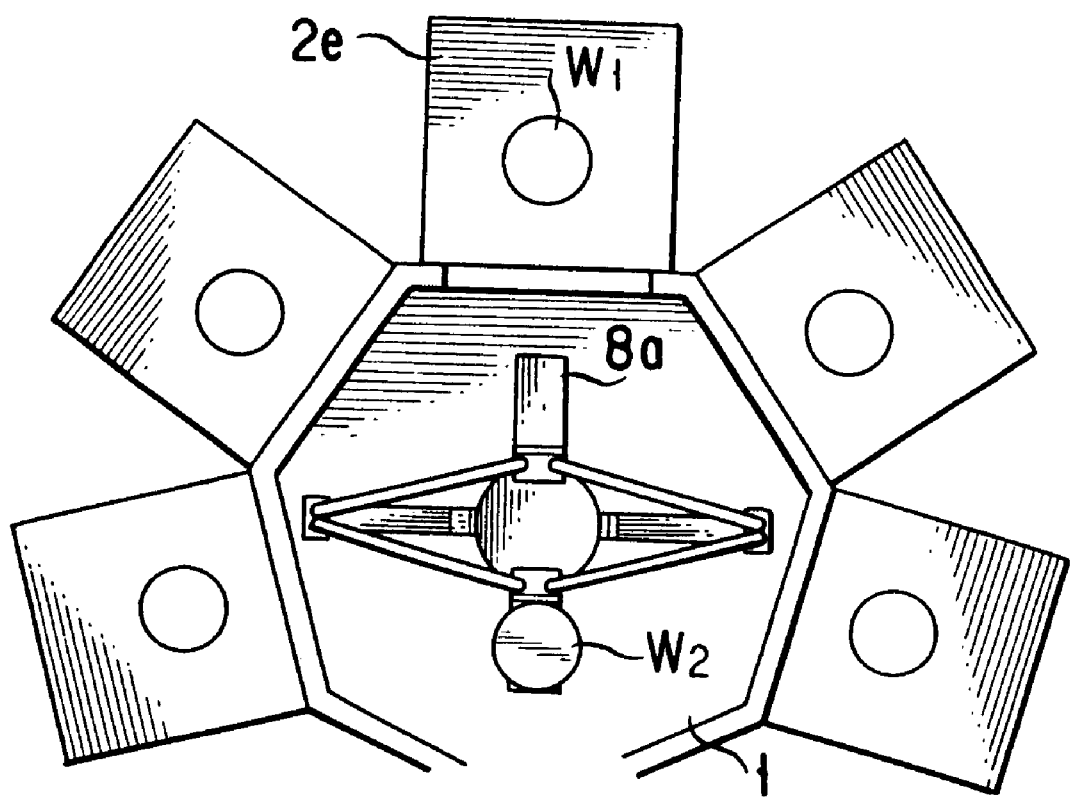
FIG. 11 is an operational explanatory view for a given station of a conventional handling robot.
Figure 12:
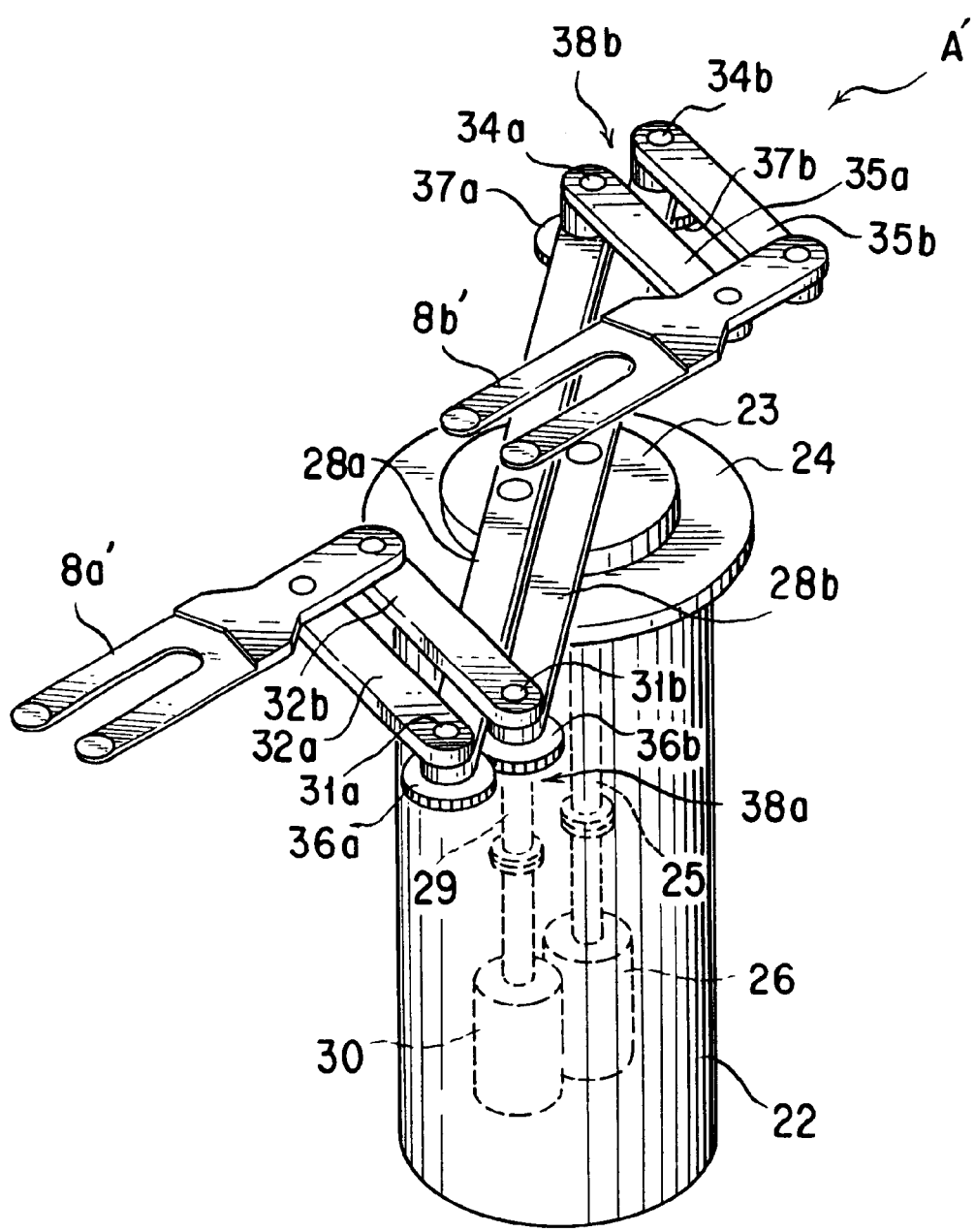
FIG. 12 is a perspective view of another conventional handling robot.
Figure 13A:
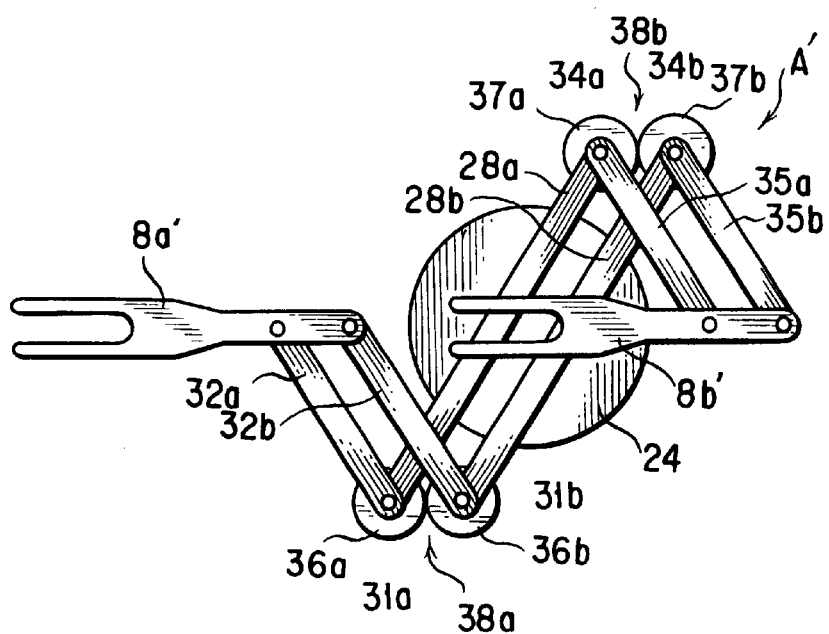
FIGS. 13A and 13B are operational explanatory views of the other conventional handling robot.
Figure 13B:
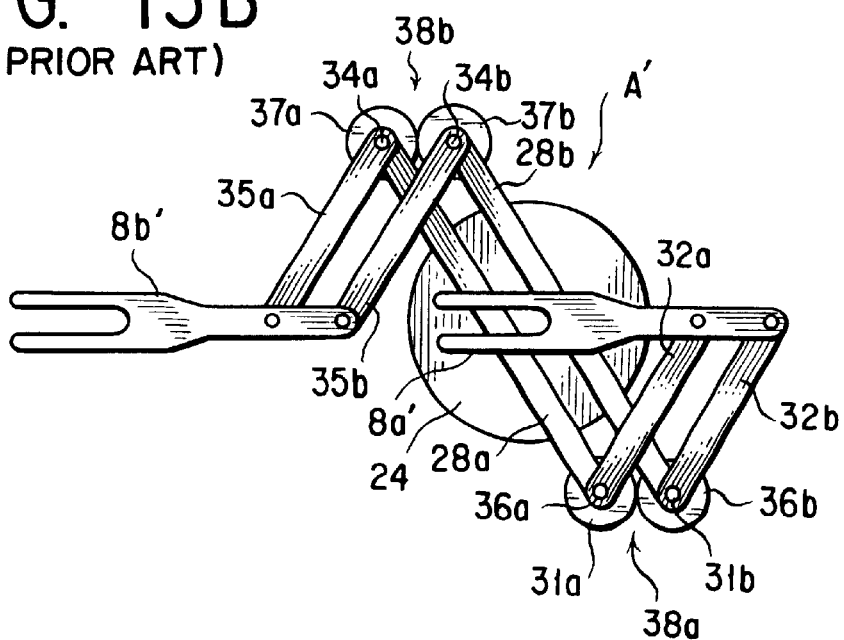
Figure 14:
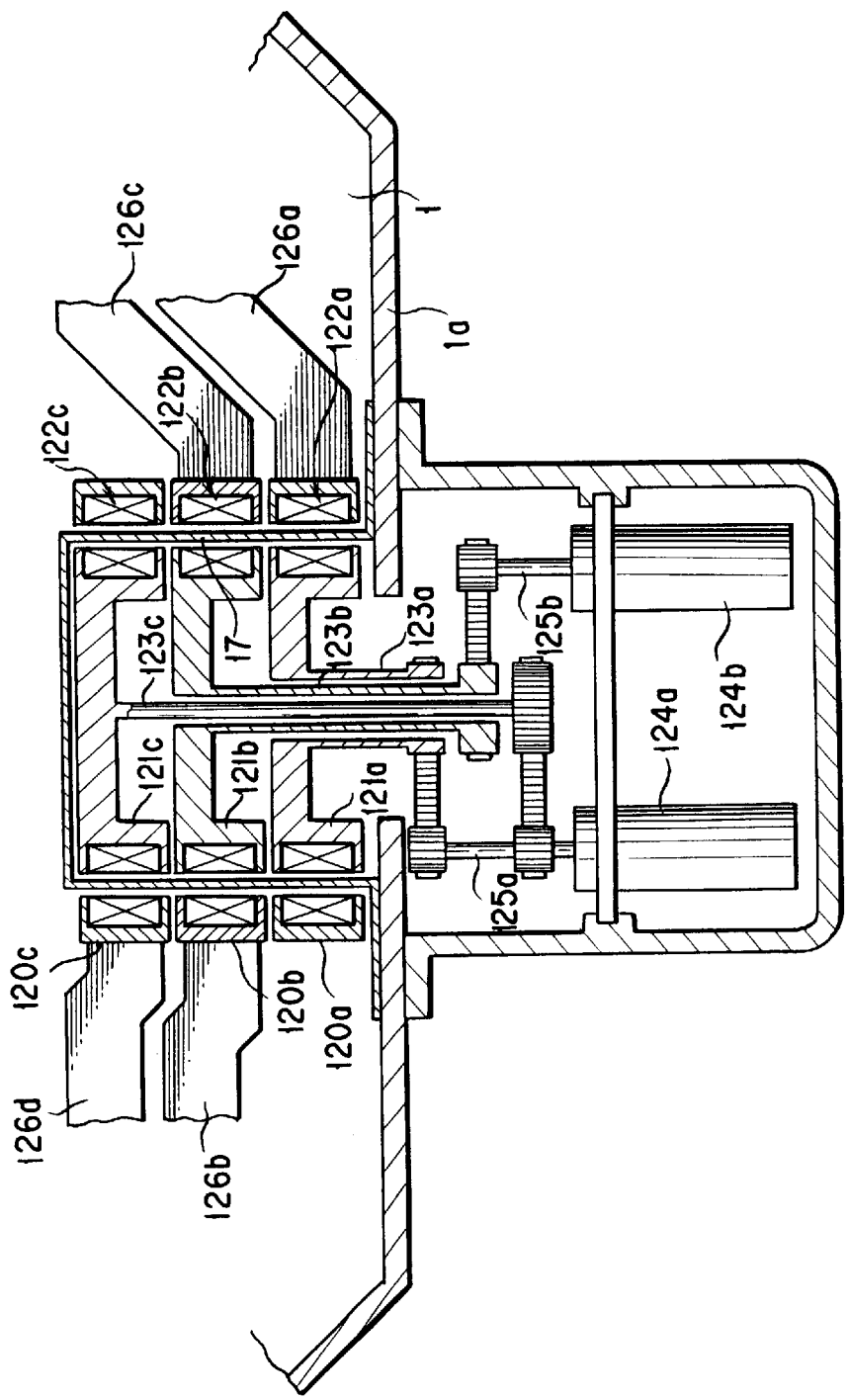
FIG. 14 is a cross sectional view showing a boss section of a first embodiment of the handling robot according to the present invention.
Figure 15:
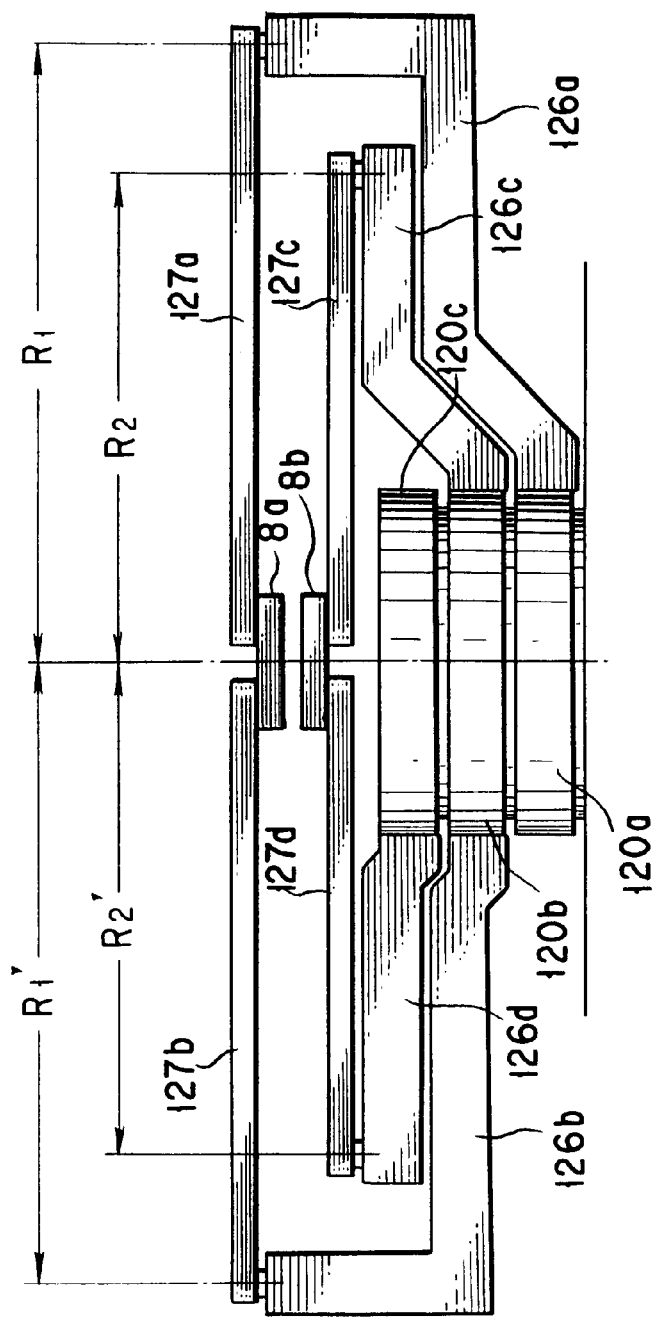
FIG. 15 is a front view showing the first embodiment of the present invention.

A detailed explanation will now be given to a certain embodiments of the present invention, i.e. with regard to the first embodiment thereof shown in FIGS. 14 to 18, the second embodiment thereof shown in FIGS. 19 to 23, the third embodiment thereof shown in FIGS. 24 to 27, the fourth embodiment thereof shown in FIGS. 32 to 35, the fifth embodiment thereof shown in FIGS. 36 to 39, the sixth embodiment thereof shown in FIGS. 40 to 43, the seventh embodiment thereof shown in FIGS. 49 to 51, and further the eighth embodiment thereof shown in FIGS. 52 to 71, and still further the ninth embodiment thereof shown in FIG. 72. In such explanation, it should be noted that the same components designated with the same reference numerals represent the same components used in up to FIG. 13 for the constructions in the prior art, and a repeated explanation thereof will be omitted.

(A First Embodiment)

A transfer chamber 1 has a central region in which the first, second and third, ring shaped bosses 120a, 120b and 120c are supported coaxially with one another via bearings (not shown) so as to be each individually rotatable in a state in which they are stacked one upon another successively from a lower side thereof.

And, inside of the above mentioned ring shaped bosses 120a, 120b and 120c, correspondingly three disk shaped bosses 121a, 121b and 121c are supported via bearings (not shown) coaxially with one another by a frame 1a side of the said transfer chamber 1 so as to be each individually rotatable.

A set of the said ring shaped bosses 120a, 120b and 120c and a set of the said disk shaped bosses 121a, 121b and 121c which respectively correspond thereto are magnetically connected together by three magnetic couplings 122a, 122b and 122c, in a rotary direction thereof. In this construction, it should be noted that in order to maintain the interior of the said transfer chamber 1 in an evacuated state, a sealing partition wall 17 is provided between the said ring shaped bosses 120a, 120b and 120c and the said disk shaped bosses 121a, 121b and 121c.

The above mentioned disk shaped bosses 121a, 121b and 121c are connected to rotary shafts 123a, 123b and 123c, respectively, which are disposed coaxially with one another in an axial center portion thereof. Of these rotary shafts, the first and second rotary shafts 123a and 123b are hollow, the second rotary shaft 123b is fittedly inserted into the first rotary shaft 123a, and the third rotary shaft 123c is fittedly inserted into the second rotary shaft 123b.

And, the said first and third rotary shafts 123a and 123c are coupled to the output shaft 125a of a first motor unit 124a via a coupling mechanism such as a timing belt. Also, the said second rotary shaft 123b is coupled to the output shaft 125b of a second motor unit 124b via a coupling mechanism such as a timing belt.

The above mentioned motor units 124a and 124b can each be a combination of a servo motor and a reduction gear such that the rotary speeds of their respective output shafts 125a and 125b may each be reduced with an extremely large speed reduction ratio and may each be accurately controlled with respect to a normal rotation as well as a reverse rotation thereof. Also, a pair of coupling mechanisms are provided for respectively coupling the said output shafts 125a and 125b together and the said rotary shafts 123a, 123b and 123c together and have an identical ratio of coupling rotation.

There are provided a first arm 126a for the said first ring shaped boss 120a, a second and a third arm 126b and 126b for the said second ring shaped boss 120b and further a fourth arm 126d for the said third ring shaped boss 120c so that these arms may each be radially projected, and their respective forward ends are each provided with a rotary joint.

The circumferential arrangement relationship of the said arms 126a, 126b, 126c and 126d and their respective lengths to the said joints provided at the said forward ends are set forth below. More specifically, the said second and third arms 126b and 126c are projected diametrically (180°) with respect to the said second ring shaped boss 120b.

And, it should be noted that the radii of the rotary joints of the said first and second arms 126a and 126b (which are each the length from the center of the boss section to the joint) are represented by $R_{1\ and\ R1}'$ and the radii of the rotary joints of the said third and fourth arms 126c and 126d are represented by $R_2$ and $R_2'$. In this embodiment, note also that $R_1 > R_2$, $R_1' > R_2'$, $R_1 = R_1'$ and $R_2 = R_2'$. And, the respective rotary joints of the said first and second arms 126a and 126b which are longer are configured to take an identical position in the axial direction of the center of rotation of the ring shaped boss whereas the respective joints of the said third and fourth arms 126c and 126d which are shorter are configured to take an identical position in the axial direction of the center of rotation of the ring shaped boss and that is a position which is inside of that of the said first and second arms and is lower than that.

Figure 16:
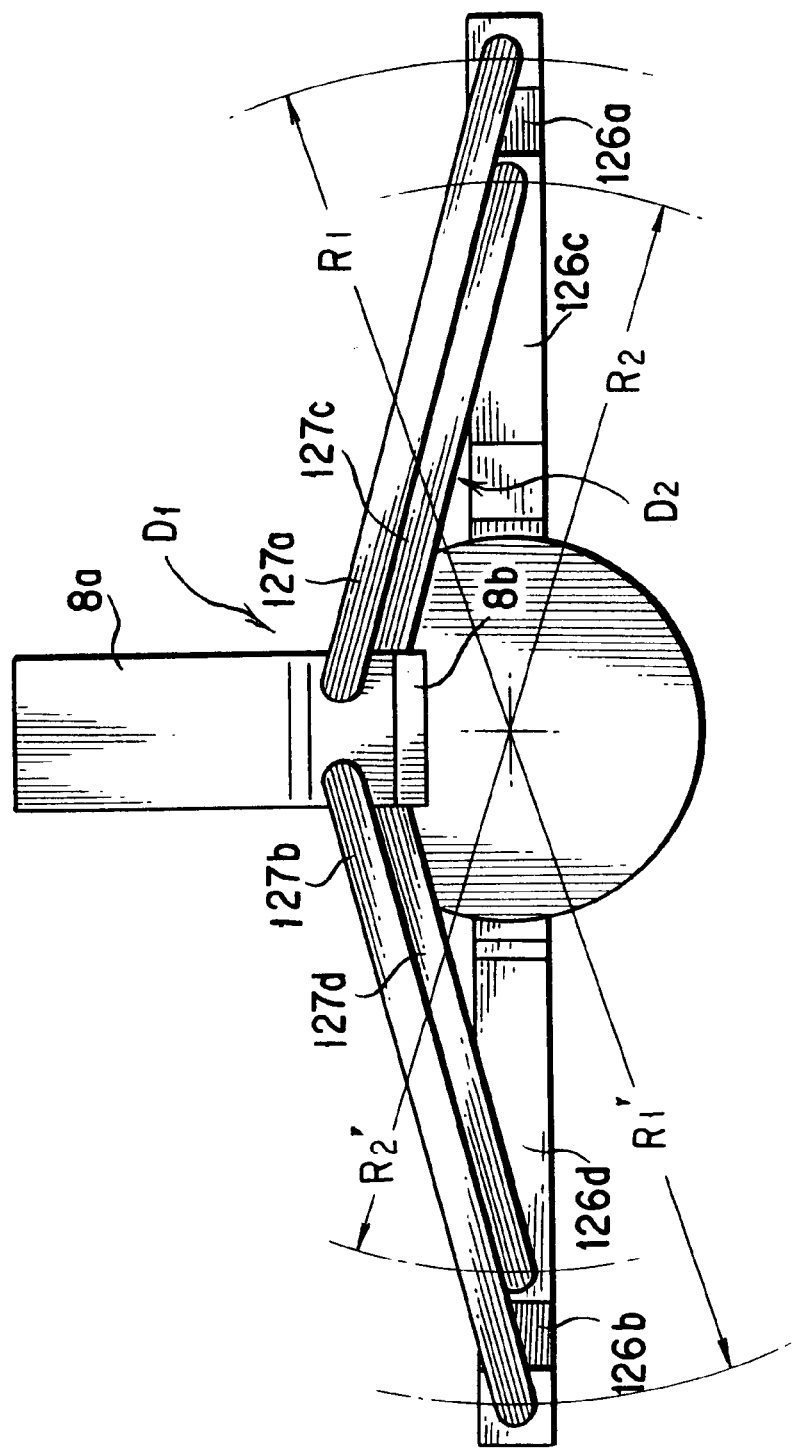
FIG. 16 is a top plan view showing the first embodiment of the present invention.

Each of the respective rotary joints of the said first and second arms 126a and 126b which are longer has coupled thereto one end of each of a first and a second link 127a and 127b, respectively, having an identical length, so as to be rotatable. The respective other ends of the said two links 127a and 127b have coupled thereto a said first transfer table 8a via a transfer table attitude regulating mechanism. In this regard it should be noted that the length of the said two links 127a and 127b is configured, as shown in FIG. 16, to be a length such that the point of coupling with the said first transfer table 8a in a state in which it is coupled therewith may, in a state in which the said two arms 126a and 126b are made linear diametrically with respect of the center of rotation of the said boss section, be deviated from the line which connects them towards the operative projecting direction of the said transfer table. It is these which constitutes a first robotic link mechanism $D_1$.

Also, each of the respective joints of the said third and fourth arms 126c and 126d which are shorter has coupled thereto one end of each of the said third and fourth links 127c and 127d, respectively, having an identical length, so as to be rotatable. The respective other ends of the said two links 127c and 127d have coupled thereto a said second transfer table 8b via a transfer attitude regulating mechanism. In this regards it should be noted that the length of the said two links 127c and 127d is configured as shown in FIG. 16 to be a length such that the point of coupling with the said second transfer table 8b in a state in which it is coupled therewith may, in a state in which the said two arms 126c and 126d are made linear diametrically with respect to the center of rotation of the said boss section, be deviated from the line which connects them towards the operatively projecting direction of the said transfer table and may take a substantially identical position below the above mentioned first transfer table 8a. It is these which constitutes a second robotic link mechanism $D_2$.

In this first embodiment of the present invention, with the said first motor unit 124a being rotationally driven, the said first and third ring shaped bosses 120a and 120c will be jointly rotated via the said first and third rotary shafts 123a and 123c, the said first and third disk shaped bosses 121a and 121c and the said magnetic couplings 122a and 122c. Also, with the said second motor unit 124b being rotated, the said second ring shaped boss 120b will likewise be rotated.

As shown in FIG. 16, a stand-by attitude is assumed to be in a state in which the said first and second arms 126a and 126b are made linear diametrically of the said boss section, and the said third and fourth arms 126c and 126d assume an identical position above the said first and second arms 126a and 126b.

Figure 17:
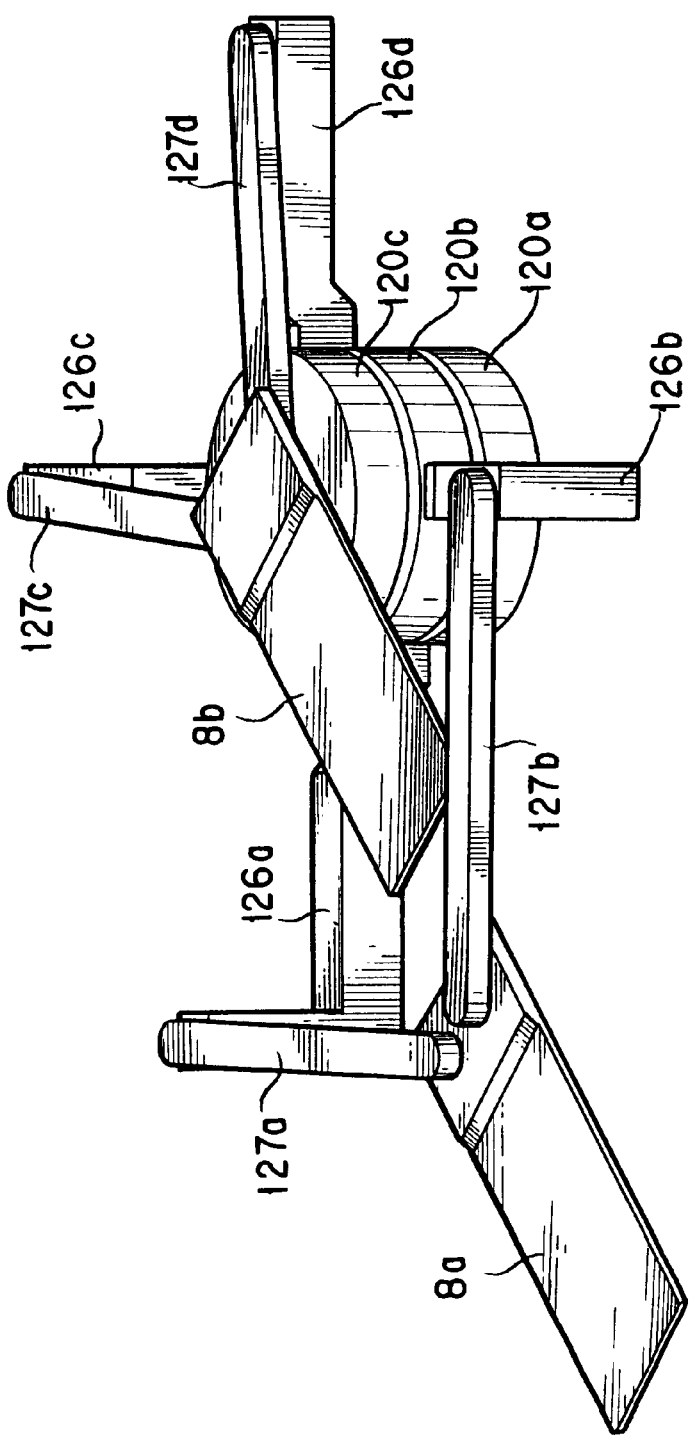
FIG. 17 is a perspective view showing the first embodiment of the present invention.

In this state, if the said first and second arms 126a and 126b are rotated jointly so that they may approach the said first transfer table 8a by rotating each of the said ring shaped bosses 120a, 120b and 120c, respectively, the said first transfer table 8a will then be operatively projected as shown in FIG. 17. On the other hand, the said third and fourth arms 126c and 126d will then be rotated jointly so that they may depart from the said second transfer table 8b, this causing the said second transfer table 8b to be operatively retracted slightly in the direction opposite to the direction in which the said first transfer table 8a is operatively projected.

Figure 18:
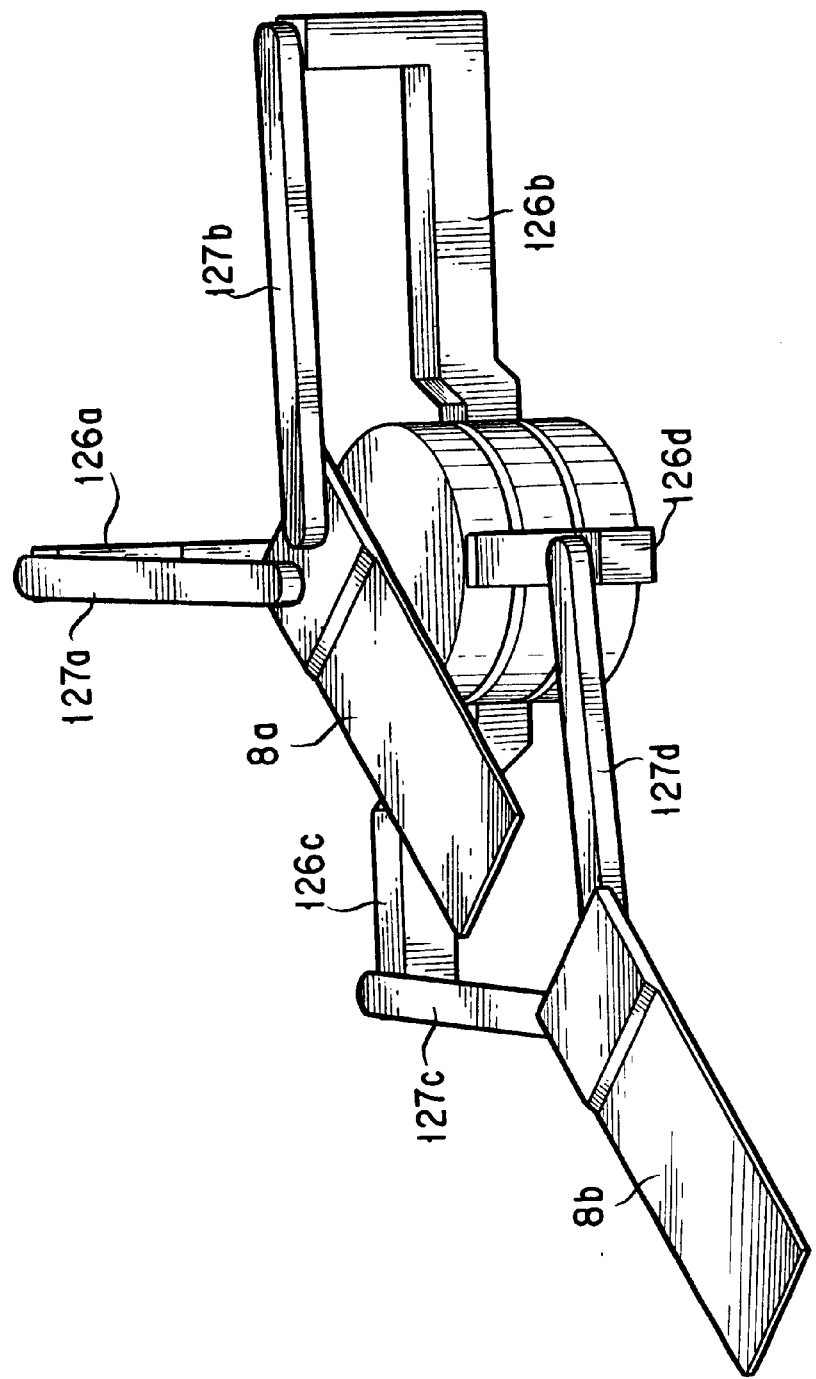
FIG. 18 is a perspective view showing the first embodiment of the present invention.
Figure 19:
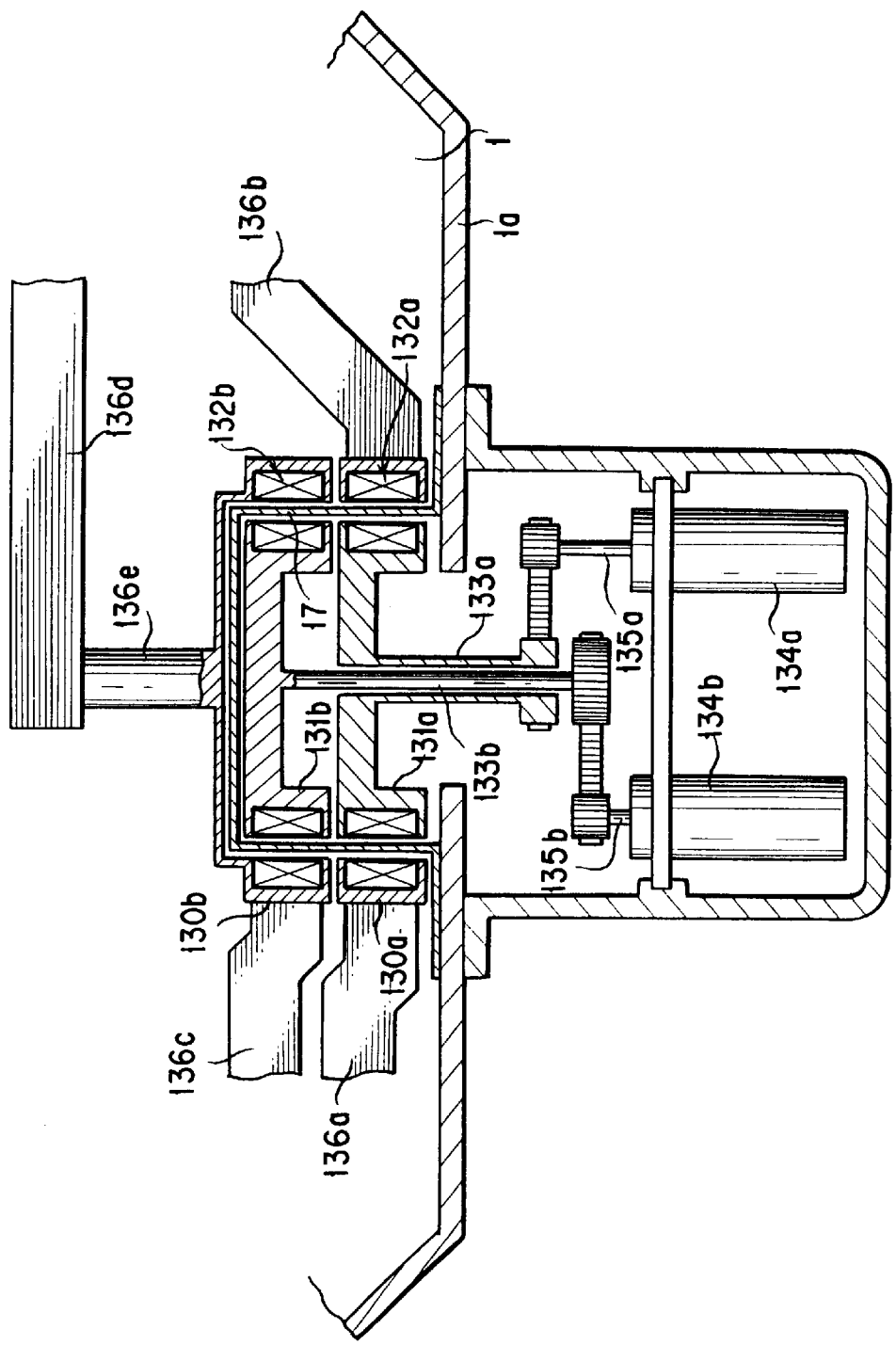
FIG. 19 is a cross sectional view showing a boss section in a second embodiment of the present invention.
Figure 20:
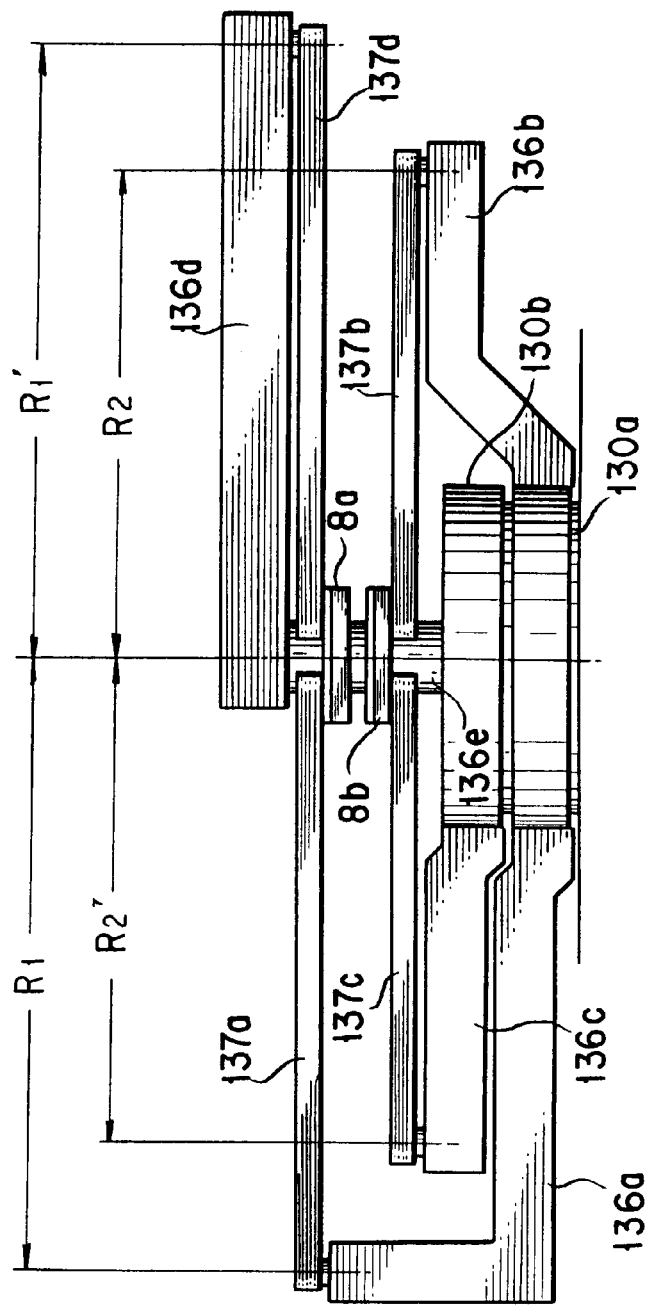
FIG. 20 is a front view showing the second embodiment of the present invention.

On the contrary, if the said third and fourth arms 126c and 126d are rotated jointly so that they may approach the said second transfer table 8b, the said second transfer table 8b will be operatively projected as shown in FIG. 18. On the other hand, the said first and second arms 126a and 126b will be rotated jointly so that they may depart from the said first transfer table 8a, this causing the said first transfer table 8a to be operatively retracted slightly in the direction opposite to the direction in which the said second transfer table 8b will be operatively projected.

Also, in a stand-by state as shown in FIG. 16, by rotating the said ring shaped bosses 120a, 120b and 120c in an identical direction, the said two transfer tables 8a and 8b will be turned within the said transfer chamber 1.

(A Second Embodiment)

The said transfer chamber 1 has a central region in which a first and a second ring shaped bosses 130a and 130b are supported coaxially with one another via bearings (not shown) so as to be each individually rotatable in a state in which they are stacked one upon another successively from a lower side thereof.

And, inside of the above mentioned ring shaped bosses 130a and 130b, correspondingly two disk shaped bosses 131a and 131b are supported via bearings (not shown) coaxially with one another by a frame 1a side of the said transfer chamber 1 so as to be each individually rotatable.

A set of the said ring shaped bosses 130a and 130b and a set of the said disk shaped bosses 131a and 131b which respectively correspond thereto are magnetically connected together by two magnetic couplings 132a and 132b, in a rotary direction thereof. In this construction, it should be noted that in order to maintain the interior of the said transfer chamber 1 in an evacuated state, a sealing partition wall 17 is provided between the said ring shaped bosses 130a and 130b and the said disk shaped bosses 131a and 131b.

The above mentioned disk shaped bosses 131a and 131b are connected to rotary shafts 133a and 133b, respectively, which are disposed coaxially with each other in an axial center portion thereof. Of these rotary shafts, the first rotary shaft 133a is hollow, and the second rotary shaft 133b is fittedly inserted into the first rotary shaft 133a.

And, the said first rotary shafts 133a is coupled to the output shaft 135a of a first motor unit 134a via a coupling mechanism such as a timing belt. Also, the said second rotary shaft 133b is coupled to the output shaft 135b of a second motor unit 134b via a coupling mechanism such as a timing belt.

The above mentioned motor units 134a and 134b can each be a combination of a servo motor and a reduction gear such that the rotary speeds of their respective output shafts 135a and 135b may each be reduced with an extremely large speed reduction ratio and may each be accurately controlled with respect to a normal rotation as well as a reverse rotation thereof. Also, a pair of coupling mechanisms are provided for respectively coupling the said output shafts 135a and 135b together and the said rotary shafts 133a and 133b together and have an identical ratio of coupling rotation.

The above mentioned first ring shaped boss 130a has on side surfaces thereof a first and a second arm 136a and 136b which are protrudingly mounted thereat towards diametrically opposite sides thereof. Also, the said second ring shaped boss 130a is provided on a side surface thereof with a third arm 136c and the said ring shaped boss 130a is provided at an axial center portion on a top surface thereof with a fourth arm 136d via a leg column 136e, the said arms 136c and 136d being protrudingly mounted thereat towards diametrically opposite sides thereof.

The circumferential arrangement relationship of the said arms 136a, 136b, 136c and 136d and their respective lengths to the rotary Joints that is provided at the said forward ends are set forth below.

More specifically, the lengths $R_1$ and $R_2$ from the centers of the respective boss sections to the respective rotary joints of the said first and second arms 136a and 136b which are protrudingly mounted at the said first ring shaped boss 130a are made different with $R_1 > R_2$.

Also, the lengths $R_2'$ and $R_1'$ from the respective boss section centers of the said third and fourth arms 136c and 136d which are protrudingly mounted at the said second ring shaped boss 130b to their rotary joints are here adapted to satisfy the relationship: $R_1' > R_2'$. Also, in this embodiments, note that the relationships: $R_1 = R_1'$ and $R_2 = R_2'$. And, the rotary joint of the said first arm 136a that is longer is provided on a forward end upper surface of the said first arm 136a, the rotary joint of the said fourth arm 136d is provided on a forward end lower surface of the said fourth arm 136d, and the said two rotary joints assume an identical position in an axial direction of the center of rotation of a said ring shaped boss.

The respective rotary joints of the said second arms 136b and the said third arms 136c which are shorter are provided on their respective arm forward end upper surfaces and assume an identical position in their axial directions.

Figure 21:
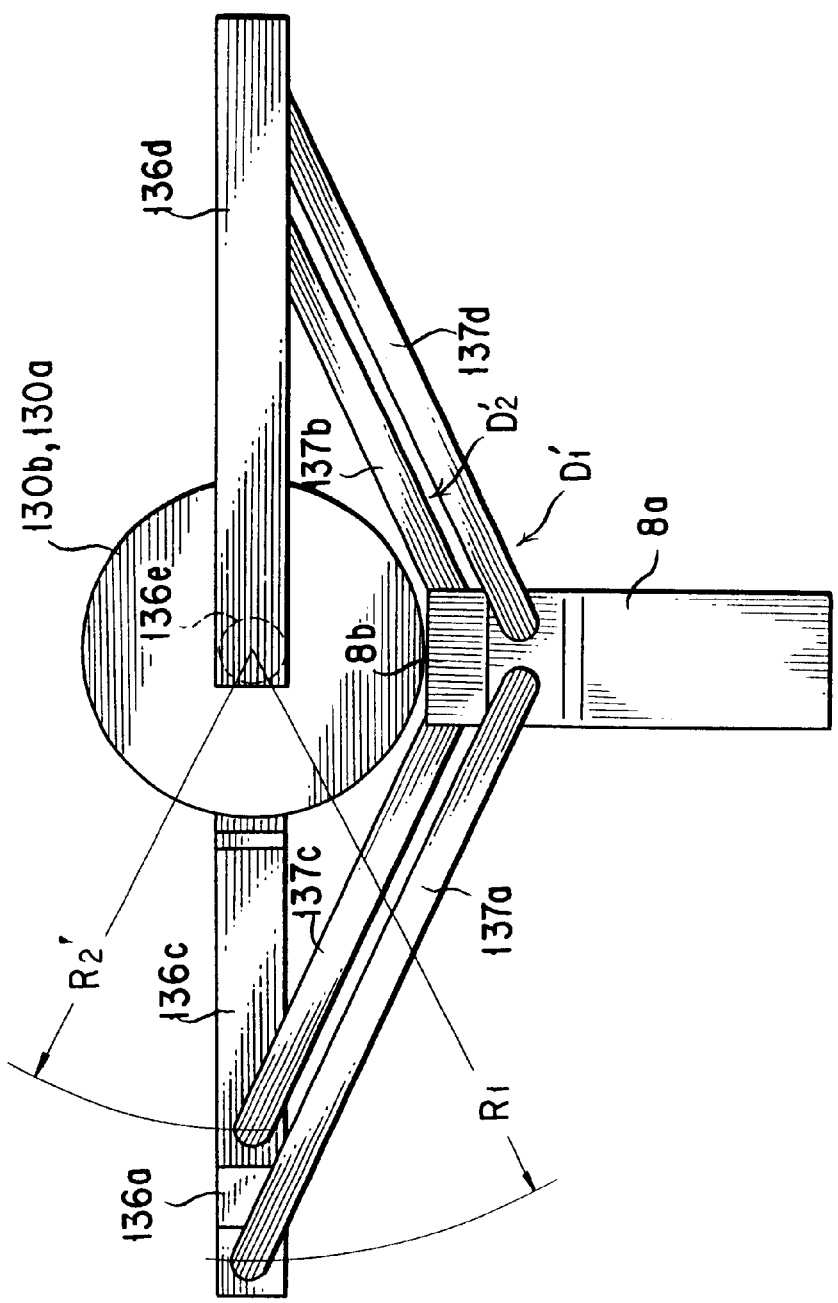
FIG. 21 is a top plan view showing the second embodiment of the present invention.

Each of the respective rotary joints of the said first and fourth arms 136a and 136d which are longer has one end of each of a first and a fourth link 137a and 137d, respectively, having an identical length, so as to be rotatable. The respective other ends of the said two links 137a and 137d have coupled thereto a said first transfer table 8a via a transfer table attitude regulating mechanism. In this regard it should be noted that the length of these two links 137a and 137d is configured, as shown in FIG. 21, to be a length such that the point of coupling with the said first transfer table 8a in a state in which it is coupled therewith may, in a state in which the said two arms 136a and 136d are made linear diametrically with respect to the center of rotation of the said boss section, be deviated from the line which connects them towards the operatively projecting direction of the said first transfer table 8a. It is these which constitutes a first robotic link mechanism $D_1'$.

Also, each of the respective joints of the said second and third arms 136b and 136c which are shorter has coupled thereto one end of each of a second and a third link 137b and 137c, respectively, having an identical length, so as to be rotatable. The respective other ends of the said two links 137b and 137c have coupled thereto a said second transfer table 8b via a transfer attitude regulating mechanism. In this regards it should be noted that the length of the said two links 137b and 137c is configured, as shown in FIG. 21, to be a length such that the point of coupling with the said second transfer table 8b in a state in which it is coupled therewith may, in a state in which the said two arms 136b and 136c are made linear diametrically with respect to the center of rotation of the said boss section, be deviated from the line which connects them towards the operatively projecting direction of the said transfer table and may take a substantially identical position below the above mentioned first transfer table 8a. It is these which constitutes a second robotic link mechanism $D_2'$.

In this second embodiment of the present invention, with the said first motor unit 134a being rotationally driven, the said first ring shaped boss 130a will be jointly rotated via the said first rotary shaft 133a, the said first disk shaped boss 131a and the said magnetic coupling 132a. Also, with the said second motor unit 134b being rotated, the said second ring shaped boss 130b will likewise be rotated.

As shown in FIG. 21, a stand-by attitude is assumed to be in a state in which the said first and fourth arms 136a and 136d are made linear diametrically of the said boss section, and the said second and third arms 136b and 136c are made linear diametrically of the said boss section at the same position as the said first and fourth arms 136a and 136d in the turning direction.

Figure 22:
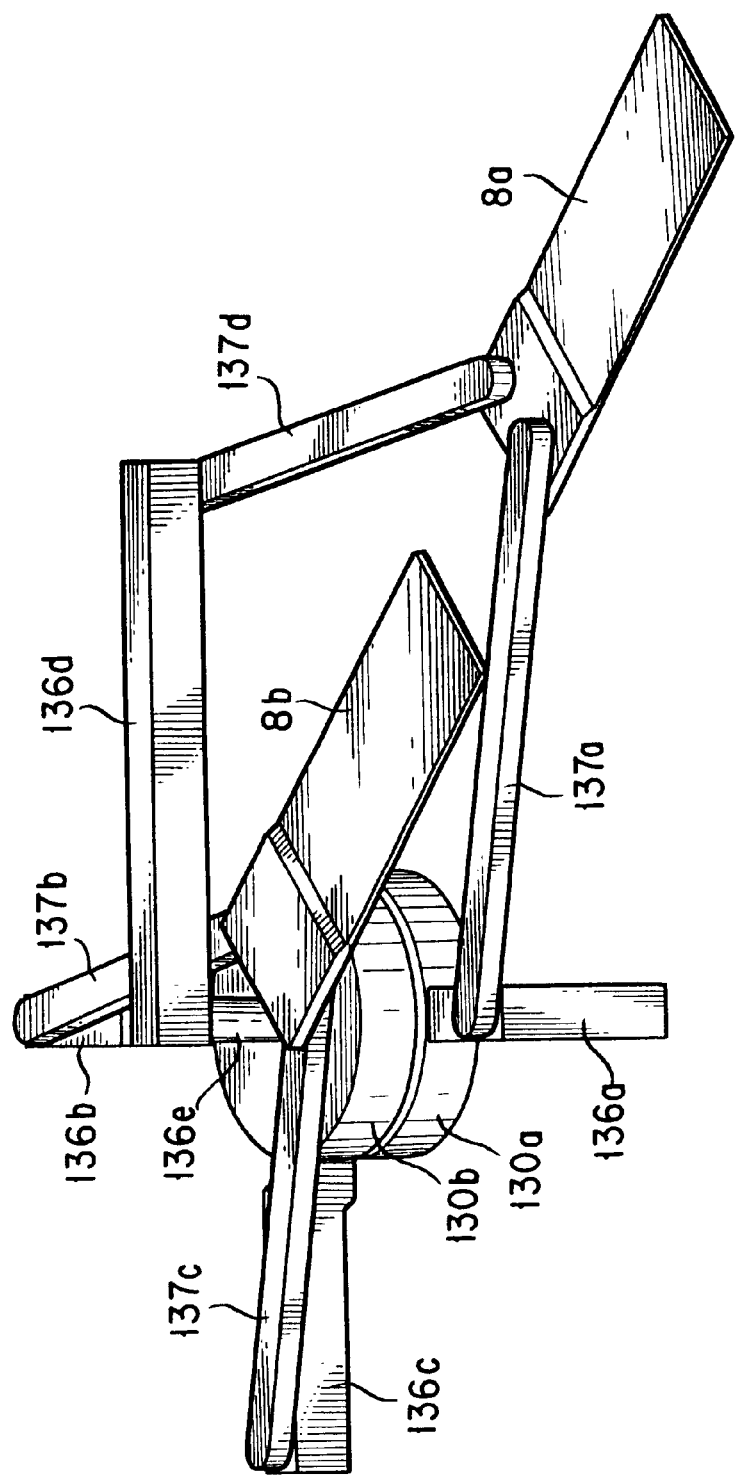
FIG. 22 is a perspective view showing the second embodiment of the present invention.

In this state, if the said first and fourth arms 136a and 136d are rotated jointly so that they may approach the said first transfer table 8a by rotating each of the said ring shaped bosses 130a and 130c, respectively, the said first transfer table 8a will then be operatively projected as shown in FIG. 22. On the other hand, the said second and third arms 136b and 136c will then be rotated jointly so that they may depart from the said second transfer table 8b, this causing the said second transfer table 8b to be operatively retracted slightly in the direction opposite to the direction in which the said first transfer table 8a is operatively projected. The retracting operation should then be within a range in which the said second transfer table 8b may not contact the said leg column 136e.

Figure 23:
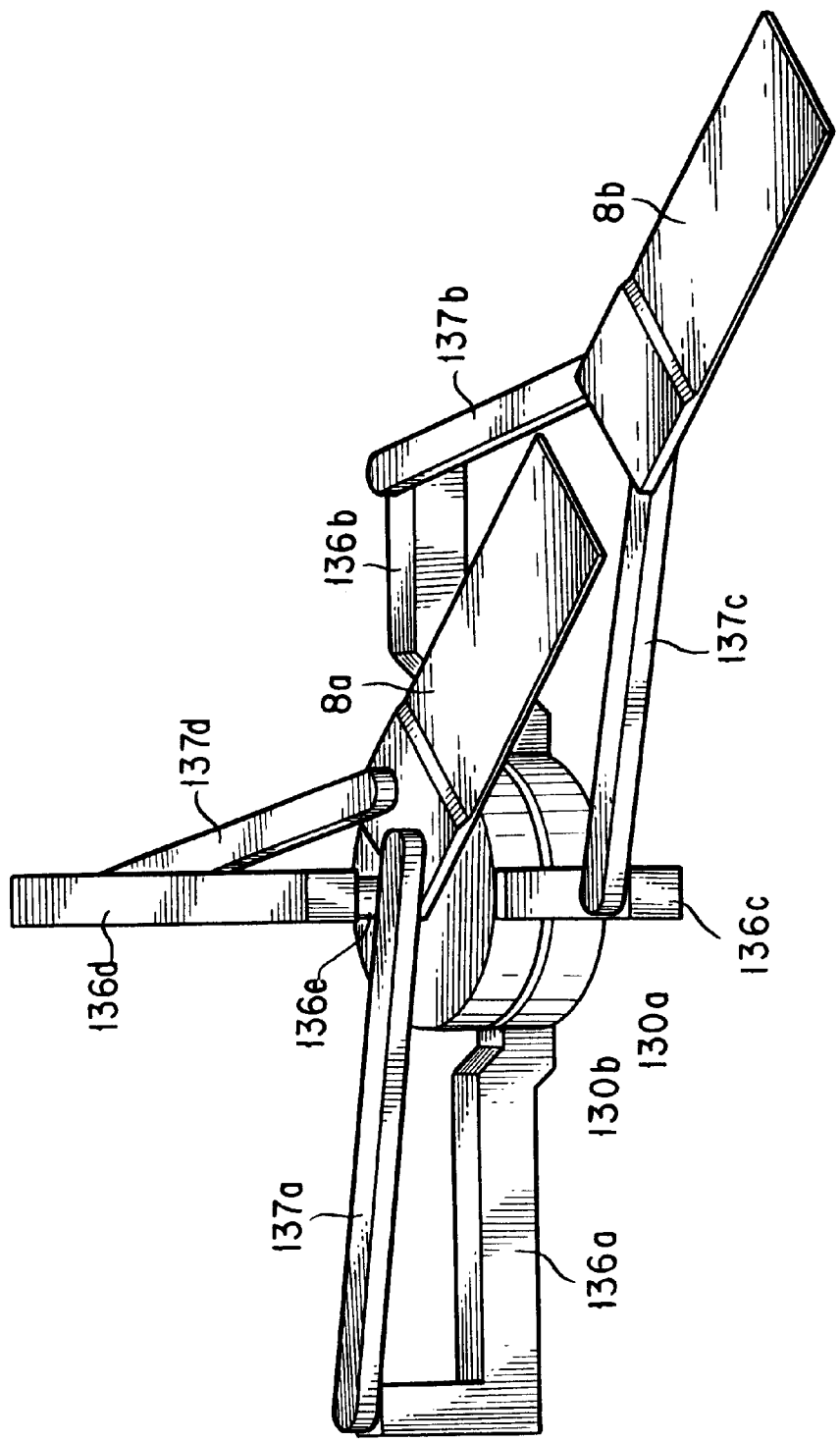
FIG. 23 is a perspective view showing the second embodiment of the present invention.
Figure 24:
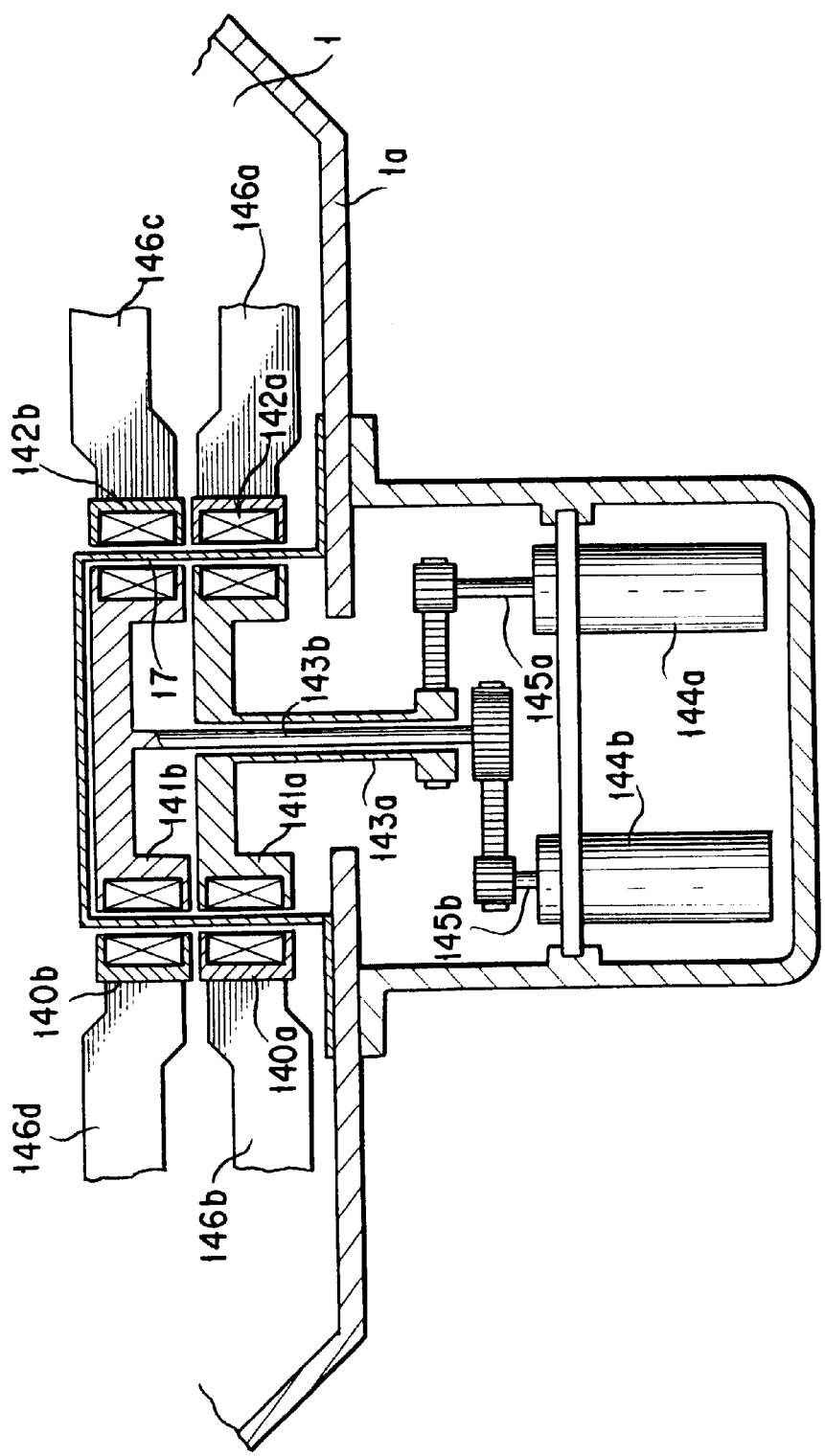
FIG. 24 is a cross sectional view showing a boss section in a third embodiment of the present invention.

On the contrary, if the said second and third arms 136b and 136c are rotated jointly so that they may approach the said second transfer table 8b, the said second transfer table 8b will be operatively projected as shown in FIG. 23. On the other hand, the said first and fourth arms 136a and 136d will be rotated jointly so that they may depart from the said first transfer table 8a, this causing the said first transfer table 8a to be operatively retracted slightly in the direction opposite to the direction in which the said second transfer table 8b will be operatively projected. The retracting operation should then be within a range in which the said transfer table 8b may not contact the said leg column 136e.

Also, in the stand-by state, by rotating the said ring shaped bosses 130a and 130b in an identical direction, the said two transfer tables 8a and 8b will be operatively turned within the said transfer chamber 1.

(A Third Embodiment)

The said transfer chamber 1 has a central region in which a first and a second ring shaped bosses 140a and 140b are supported coaxially with one another via bearings (not shown) so as to be each individually rotatable in a state in which they are stacked one upon another successively from a lower side thereof.

And, inside of the above mentioned ring shaped bosses 140a and 140b, correspondingly two disk shaped bosses 141a and 141b are supported via bearings (not shown) coaxially with one another by a frame 1a side of the said transfer chamber 1 so as to be each individually rotatable.

A set of the said ring shaped bosses 140a and 140b and a set of the said disk shaped bosses 141a and 141b which respectively correspond thereto are magnetically connected together by two magnetic couplings 142a and 142b, in a rotary direction thereof. In this construction, it should be noted that in order to maintain the interior of the said transfer chamber 1 in an evacuated state, a sealing partition wall 17 is provided between the said ring shaped bosses 140a and 140b and the said disk shaped bosses 141a and 141b.

The above mentioned disk shaped bosses 141a and 141b are connected to rotary shafts 143a and 143b, respectively, which are disposed coaxially with one another in an axial center portion thereof. Of these rotary shafts, the first rotary shaft 143a is hollow, and the second rotary shaft 143b is fittedly inserted into the first rotary shaft 143a.

And, the said first rotary shafts 143a is coupled to the output shaft 145a of a first motor unit 144a via a coupling mechanism such as a timing belt. Also, the said second rotary shaft 143b is coupled to the output shaft 145b of a second motor unit 144b via a coupling mechanism such as a timing belt.

The above mentioned motor units 144a and 144b can each be a combination of a servo motor and a reduction gear such that the rotary speeds of their respective output shafts 145a and 145b may each be reduced with an extremely large speed reduction ratio and may each be accurately controlled with respect to a normal rotation as well as a reverse rotation thereof. Also, a pair of coupling mechanisms are provided for respectively coupling the said output shafts 145a and 145b together and the said rotary shafts 143a and 143b together and have an identical ratio of coupling rotation.

The above mentioned first ring shaped boss 140a has on side surfaces thereof a first and a second arm 146a and 146b which are protrudingly mounted thereat towards diametrically opposite sides thereof. Also, the said second ring shaped boss 140b is provided on a side surface thereof with a third arm 146c and fourth arm 146d which are protrudingly mounted thereat towards diametrically opposite sides thereof.

The circumferential arrangement relationship of the said arms 146a, 146b, 146c and 146d and their respective lengths to the rotary joints that is provided at the said forward ends are set forth below.

Figure 25:
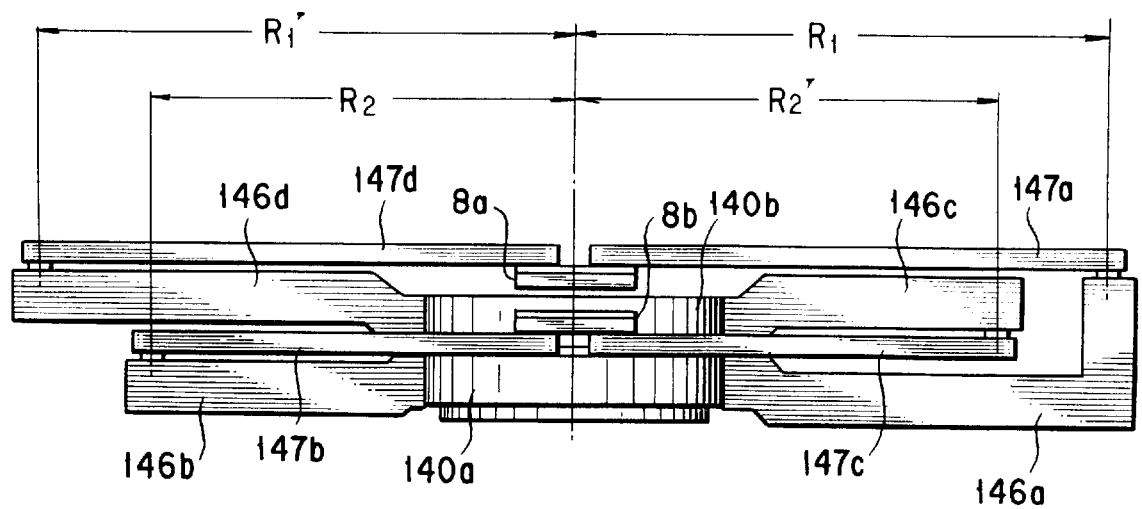
FIG. 25 is a front view showing the third embodiment of the present invention.

More specifically, the lengths $R_1$ and $R_2$ from the centers of the respective boss sections to the respective rotary joints of the said first and second arms 146a and 146b which are protrudingly mounted at the said first ring shaped boss 140a are made different with $R_1 > R_2$ as shown in FIG. 25.

Also, the lengths $R_2'$ and $R_1'$ from the respective boss section centers to the respective rotary joints of the said third and fourth arms 146c and 146d which are protrudingly mounted at the said second ring shaped boss 140b are here adapted to satisfy the relationship: $R_1' > R_2'$ as shown in FIG. 25. Also, in this embodiments, note that the relationships: $R_1 = R_1'$ and $R_2 = R_2'$. The said fourth arm 146d that is longer is protrudingly mounted to orient in a diametrically opposite direction to the said arm 146a and the said boss section whereas the said third arm 146c that is shorter is protrudingly mounted to orient in a diametrically opposite direction to the said second arm 146b and the said boss section.

And, the rotary joint of the said first arm 146a that is longer is provided to take an identical position on the respective forward end upper surfaces of the said first and fourth arms 146a and 146d in an axial direction. Also, the said second and third arms 146b and 146c which are shorter, the said second arm 146b has its rotary joint that is provided on a forward end upper surface thereof and the said third arm 146c has its rotary joint that is provided on a forward end lower surface thereof so that they may assume an identical position in their respective axial directions. It is these which constitutes a first robotic link mechanism $D_1$.

The above mentioned first and fourth arms 146a and 146d which are longer are, as noted above, protrudingly mounted at diametrically opposite sides of the said boss section, and each of the respective rotary joints of the said arms 146a and 146d has coupled thereof one end of the each of said first and fourth links 147a and 147d, respectively, having an identical length, so as to be rotatable. The respective other ends of the said links 147a and 147d has coupled thereto a said first transfer table 8a via a transfer attitude regulating mechanism. In this regard it should be noted that the length of the said two links 147a and 147d is configured to be a length such that the point of coupling with the said first transfer table 8a in a state in which it is coupled therewith may, in a state in which the said two arms 146a and 146d are made linear diametrically with respect to the center of rotation of the said boss section, be deviated from the line which connects them to the operatively projecting direction of the said first transfer table 8a.

Also, each of the respective joints of the said second and third arms 146b and 146c which are shorter has coupled thereto each of one end of a second and a third link 147b and 147c, respectively, having an identical length, so as to be rotatable. The respective other ends of the said two links 147b and 147c have coupled thereto a second transfer table 8b via a transfer attitude regulating mechanism. In this regards it should be noted that the length of the said two links 147b and 147c is configured, to be a length such that the point of coupling with the said transfer table 8b in a state in which it is coupled therewith may, in a state in which the said two arms 146b and 146c are made linear diametrically with respect to the center of rotation of the said boss section, be deviated from the line which connects them towards the operatively projecting direction of the said transfer table and may take a substantially identical position below the above mentioned first transfer table 8a. It is these which constitutes a second robotic link mechanism $D_2''$.

Figure 26:
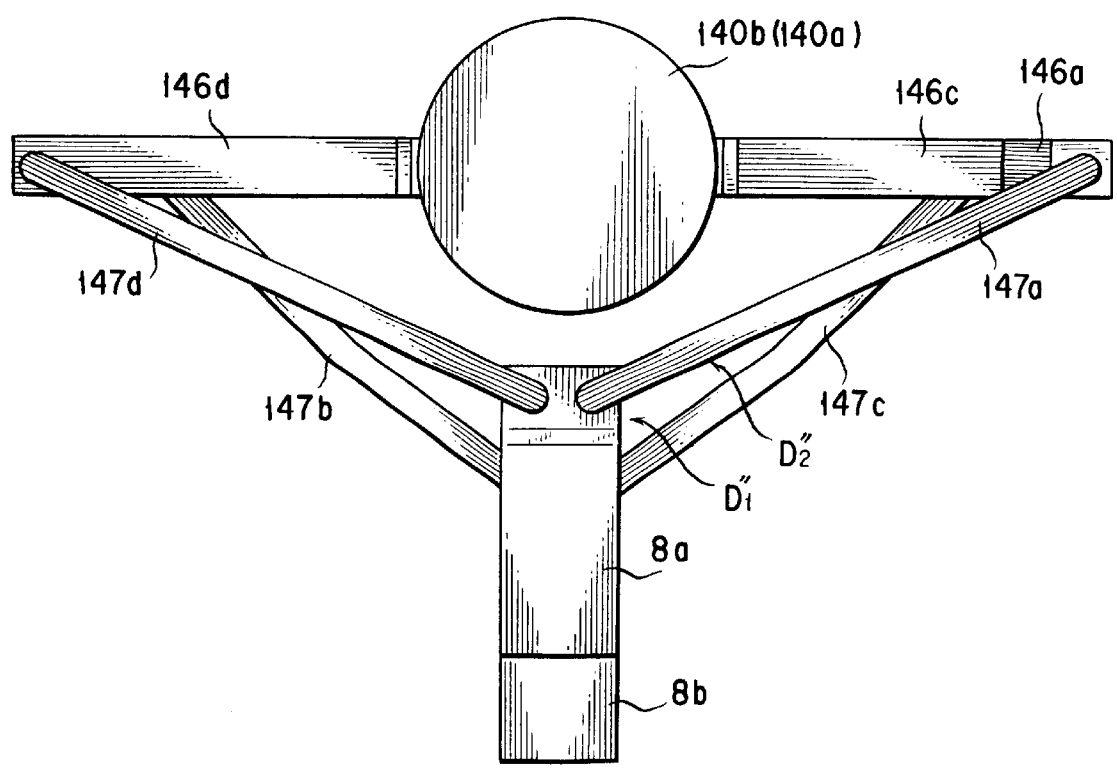
FIG. 26 is a top plan view showing the third embodiment of the present invention.
Figure 27:
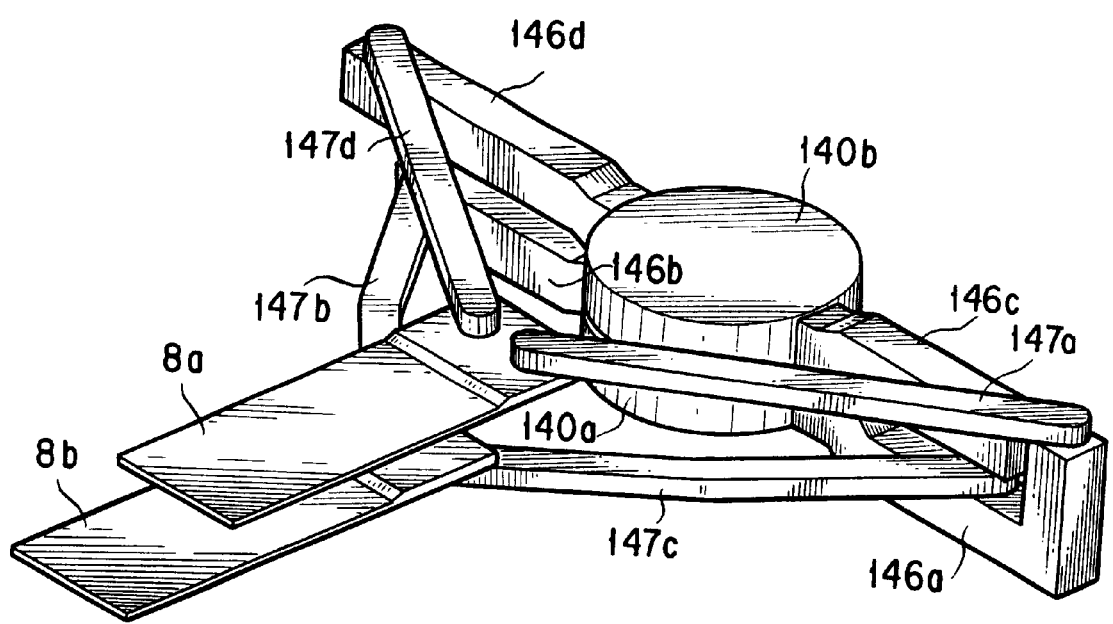
FIG. 27 is a perspective view showing the third embodiment of the present invention.

In this third embodiment of the present invention, it can be seen, as shown in FIG. 26, that if the said first and second motor units 144a and 146b are rotated simultaneously and in their respective directions which are opposite to each other from the stand-by state in which the said arms are linearly arranged diametrically of the said boss station over an identical angle so that, for example, the said first and fourth arms 146a and 146d may be jointly rotated to reach the side of the said first transfer table 8a coupled therewith, the said first transfer table 8a will be operatively projected via the said links 147a and 147d. Then, the said second and third arms 146a and 146c will be operated so that they may depart from the said second transfer table 8b, and as a result the said second transfer table 8b will be retracted towards the axial center side of the said boss section.

It can also be noted that by rotating the said drive sources 144a and 144b reversely, the said second transfer table 8b will be operatively projected whereas the said first transfer table 8b will be operatively retracted.

In each of the embodiments mentioned above, the said motor units are driven controlledly with respect to their angle of rotation so that each of the said transfer tables 8a and 8b may be displaced from the inside of the said transfer chamber 1 to a predetermined position in a given process chamber, i. e. a workpiece attracting position and vice versa.

Figure 28:
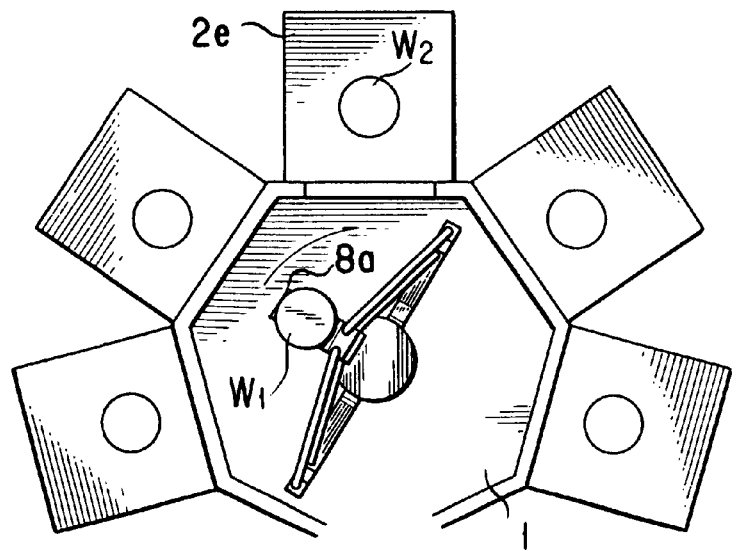
FIG. 28 is an operational explanatory view of each of the above mentioned embodiments for a given station.
Figure 29:
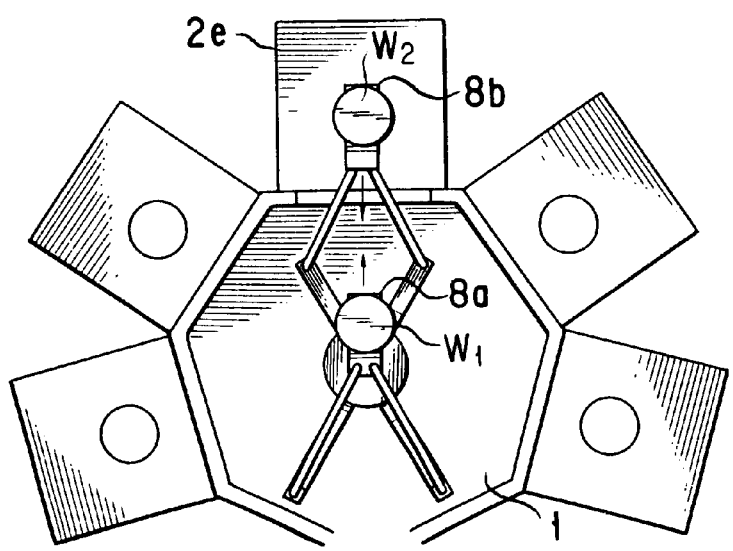
FIG. 29 is an operational explanatory view of each of the above mentioned embodiments for a given station.
Figure 30:
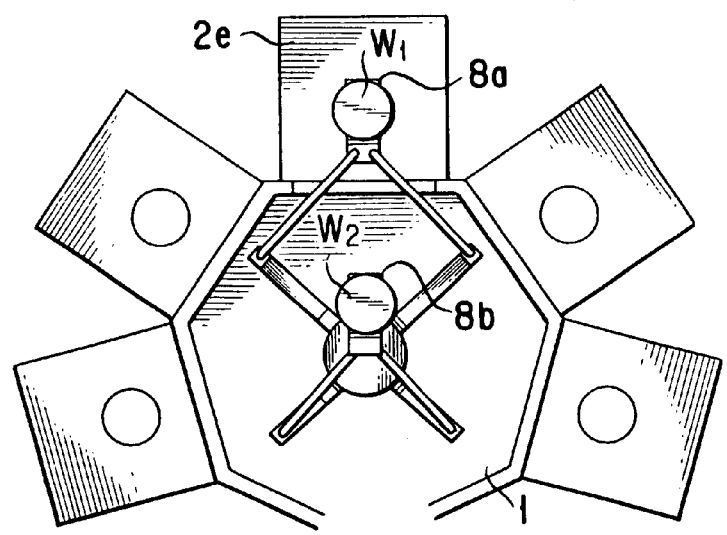
FIG. 30 is an operational explanatory view for a given station in each of the embodiments of the present invention.

And, according to each of the embodiments mentioned above, it can be seen that where a wafer that has been processed in a given station is transferred successively to the other stations, as shown in FIGS. 28 to 31, the method will involve a series of steps to be carried out. Thus, firstly, an unprocessed wafer $W_1$ will be mounted on the one transfer table 8a and thereafter it will be opposed to a station 2e where it is to be exchanged with another wafer, by turning the handling robot A (FIG. 28).

Figure 31:
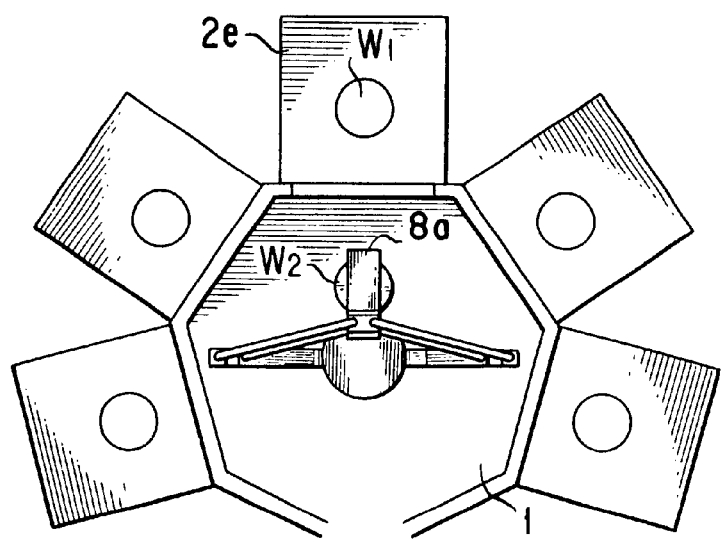
FIG. 31 is an operational explanatory view for a given station in each of the embodiments of the present invention.
Figure 32:
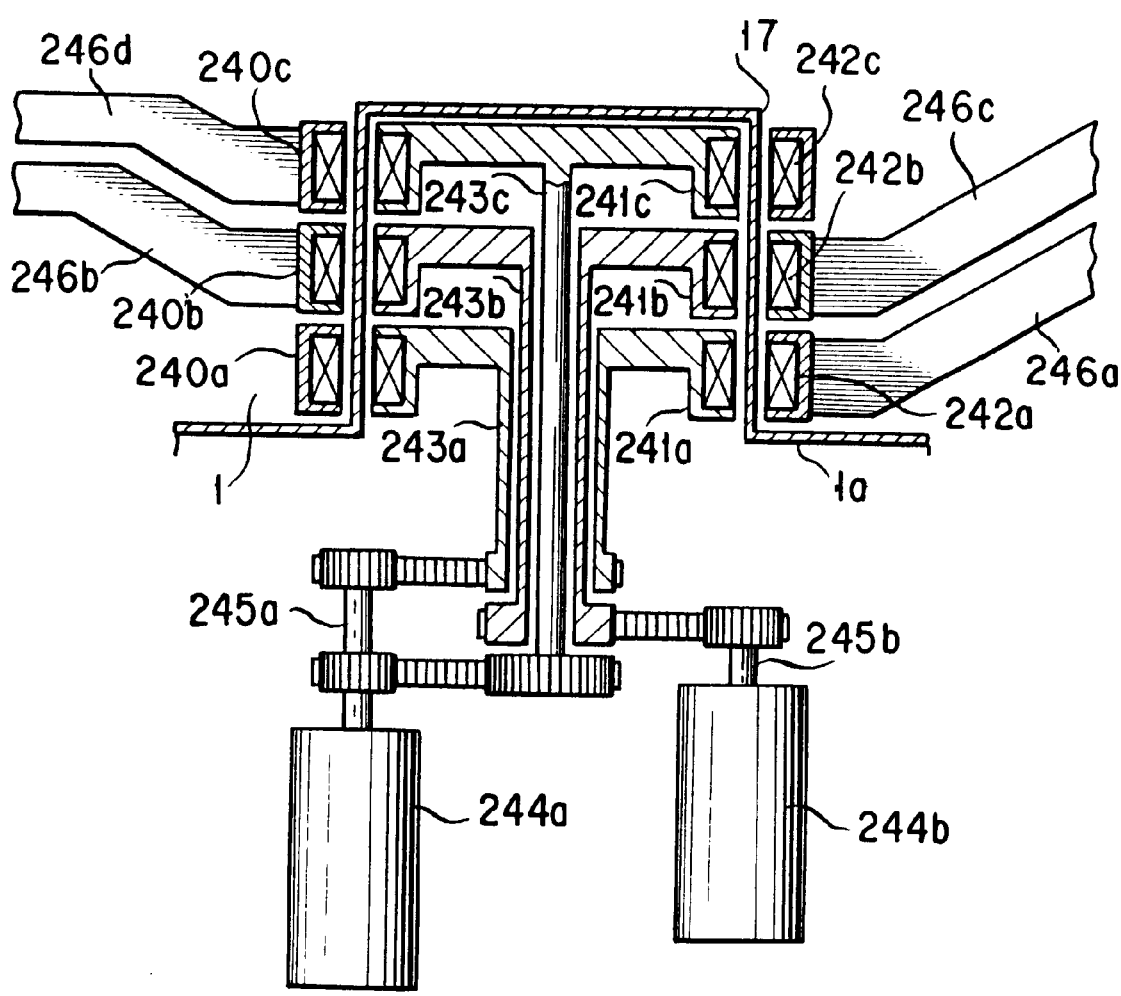
FIG. 32 is a cross sectional view showing a boss section in a fourth embodiment of the present invention.

Subsequently, the vacant transfer table 8b will be operatively projected into the said station 2e to receive a processed wafer $W_2$ (FIG. 29) and then to convey it into the said transfer chamber 1. Thereafter, the said first transfer table 8a having the said unprocessed wafer $W_1$ mounted thereon will be operatively projected into the said station 2e (FIG. 30) to deliver the said unprocessed wafer $W_1$ into the said station 2e whilst operatively retracting the transfer table 8a that becomes vacant into the said transfer chamber 1 so as to be ready for a next process step (FIG. 31).

In this manner, the handling robot in each of the embodiments of the present invention enables a processed wafer and an unprocessed wafer to be exchanged for a given station without turning the handling robot.

(A Fourth Embodiment)

Referring to FIGS. 32 to 35, a said transfer chamber 1 has a central region in which three ring shaped bosses 240a, 240b and 240c are supported coaxially with one another via bearings (not shown) so as to be each individually rotatable in a state in which they are stacked one upon another successively from a lower side thereof.

And, inside of the above mentioned ring shaped bosses 240a, 240b and 240c, correspondingly three disk shaped bosses 241a, 241b and 241c are supported via bearings (not shown) coaxially with one another by a said frame la side of the said transfer chamber 1 so as to be each individually rotatable.

A set of the said ring shaped bosses 240a, 240b and 240c and a set of the said disk shaped bosses 241a, 241b and 241c which respectively correspond thereto are magnetically connected together by three magnetic couplings 242a, 242b and 242c, in a rotary direction thereof. And, in order to maintain the interior of the said transfer chamber 1 in an evacuated state, a sealing partition wall 17 is provided between the said ring shaped bosses 240a, 240b and 240c and the said disk shaped bosses 241a, 241b and 241c.

The above mentioned disk shaped bosses 241a, 241b and 241c are connected to rotary shafts 243a, 243b and 243c, respectively, which are disposed coaxially with one another in an axial center portion thereof. Of these rotary shafts, the first and second rotary shafts 243a and 243b are hollow, the second rotary shaft 243b is fittedly inserted into the first rotary shaft 243a, and the third rotary shaft 243c is fittedly inserted into the second rotary shaft 243b.

And, the said first and third rotary shafts 243a and 243c are coupled to the output shaft 245a of a first motor unit 244a via a coupling mechanism such as a timing belt. Also, the said second rotary shaft 243b is coupled to the output shaft 245b of a second motor unit 244b via a coupling mechanism such as a timing belt.

The above mentioned motor units 244a and 244b can each be a combination of a servo motor and a reduction gear such that the rotary speeds of their respective output shafts 245a and 245b may each be reduced with an extremely large speed reduction ratio and may each be accurately controlled with respect to a normal rotation as well as a reverse rotation thereof. Also, a pair of coupling mechanisms are provided for respectively coupling the said output shafts 245a and 245b together and the said rotary shafts 243a, 243b and 243c together and have an identical ratio of coupling rotation.

There are provided a first arm 246a for the said first ring shaped boss 240a, a second and a third arm 246b and 246b for the said second ring shaped boss 240b and further a fourth arm 246d for the said third ring shaped boss 240c so that these arms may each be radially projected, and their respective forward ends are each provided with a rotary joint.

The respective rotary joint radii of the above mentioned arms 246a, 246b, 246c and 246d (i. e. the length from the boss section center to the rotary joint which is hereinafter identically referred to) R are made an identical size. And, the respective rotary joints of the said first and second arms 246a and 246b are configured to take an identical position in the axial direction of the center of rotation of a said ring shaped boss whereas the respective joints of the said third and fourth arms 246c and 246d are configured to take an identical position in the axial direction of the center of rotation of a said ring shaped boss, which is lower than that for the said first and second arms 246a and 246b.

Each of the respective rotary joints of the said arms 246a, 246b, 246c and 246d has coupled thereto one end of each of a first, a second, a third and a fourth link 247a, 247b, 247c and 247d, respectively, which have an identical length but is longer than the length R of the said arms, so as to be rotatable. And, there is coupled a said first transfer table 8a to the forward end lower surfaces of the above mentioned first and second links 247a and 247b via a transfer table attitude regulating mechanism and a first robotic link mechanism B1 is thereby constituted. Also, there is coupled a said second transfer table 8b to the forward end upper surfaces of the said third and fourth links 247c and 247d via a transfer table attitude regulating mechanism and a second robotic link mechanism $B_2$ is thereby constituted.

Then, the said transfer table 8a of the first robotic link mechanism $B_1$ is configured to be in a state in which, for example, the said first and second arms 246a and 246b are made linear diametrically of the said boss section and the said transfer table 8a is operatively retracted into a ring shaped boss side and hence in a so called stand-by state. Also, the said transfer table 8b of the second robotic link mechanism $B_2$ is likewise configured to be in a stand-by state when the said third and fourth arms 246c and 246d are made diametrically linear. And, the respective transfer tables 8a and 8b of the said first and second robotic link mechanisms $B_1$ and $B_2$ each in a stand-by state are positionally deviated in the rotary direction of a said ring shaped boss (FIG. 34), and this state constitutes a stand-by state of the handling robot. And, each of the said transfer tables 8a and 8b may be operatively projected and retracted radially of a said ring shaped boss by a rotation thereof, from the said stand-by state of the handling robot. Also, it is in this stand-by state that the handling robot can be rotated. And, if one of the said transfer tables is then operatively projected, the other transfer table can be operatively retracted further interiorly from the said stand-by state.

The amount of the said positional deviation in a rotary direction of each of the respective transfer tables 8a and 8b of the above mentioned two robotic link mechanisms $B_1$ and $B_2$ is such that at least the said two transfer tables 8a and 8b may not interfere in a rotary direction and should preferably be an amount of deviation within a range in which two wafers do not interfere with each other when the wafers are mounted on the said transfer tables 8a and 8b, respectively.

Figure 33:
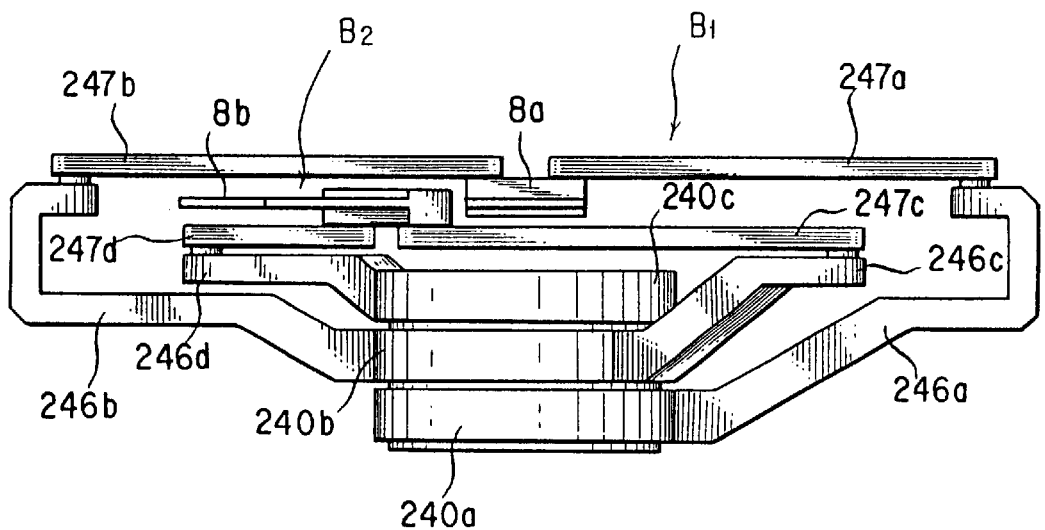
FIG. 33 is a front view showing the fourth embodiment of the present invention.

Since the respective transfer tables 8a and 8b of the said two robotic link mechanisms $B_1$ and $B_2$ do not then interfere in a rotary direction, they assume an identical position in an axial direction of the center of rotation (i. e. in a vertical direction) of a said ring shaped boss as shown in FIG. 33. In this connection it should be noted that the respective forward end portions of the said first and second arms 246*a* and 246*b* are each curved outwards so that the respective forward end portions of the said third and fourth arms 246*c* and 246*d* may not interfere with each other.

Figure 35:
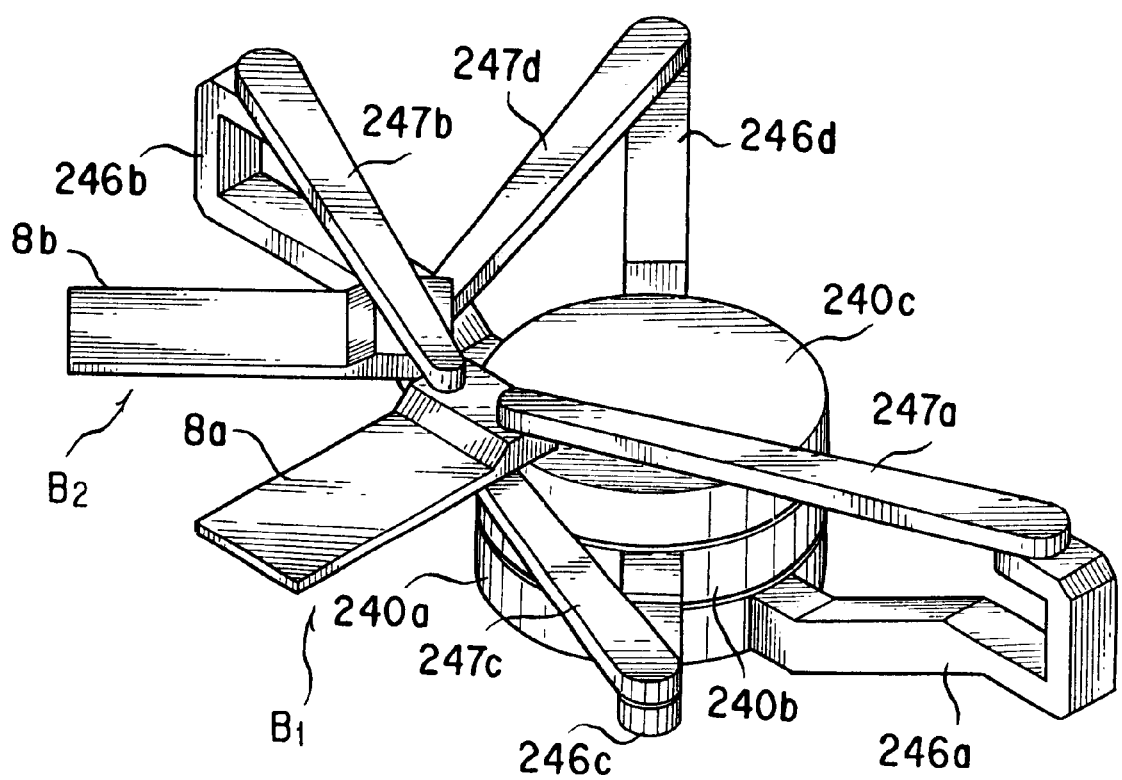
FIG. 35 is a perspective view showing the fourth embodiment of the present invention.
Figure 36:
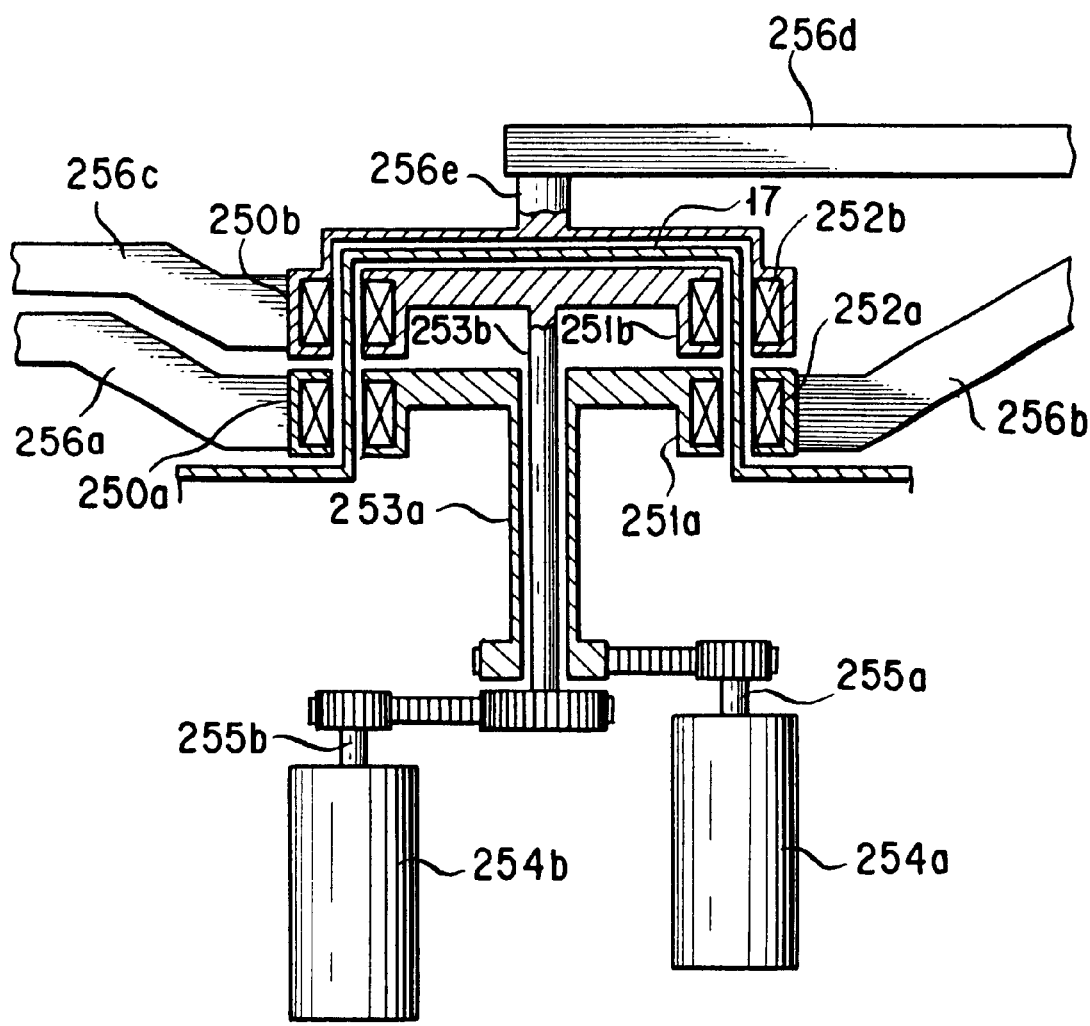
FIG. 36 is a cross sectional view showing a boss section in a fifth embodiment of the present invention.

In this fourth embodiment of the present invention, by individually rotating the said ring shaped bosses 240*a*, 240*b* and 240*c*, it can be seen that one of the said first and second transfer tables 8*a* and 8*b* will be operatively projected and the other will be operatively retracted, from a stand-by state as shown in FIG. 35. Then, the respective forward end portions of the said third and fourth arms 246*c* and 246*d* are allowed to pass through the inside of the said first and second arms 246*a* and 246*b* and hence there should be no interference with one another.

Figure 34:
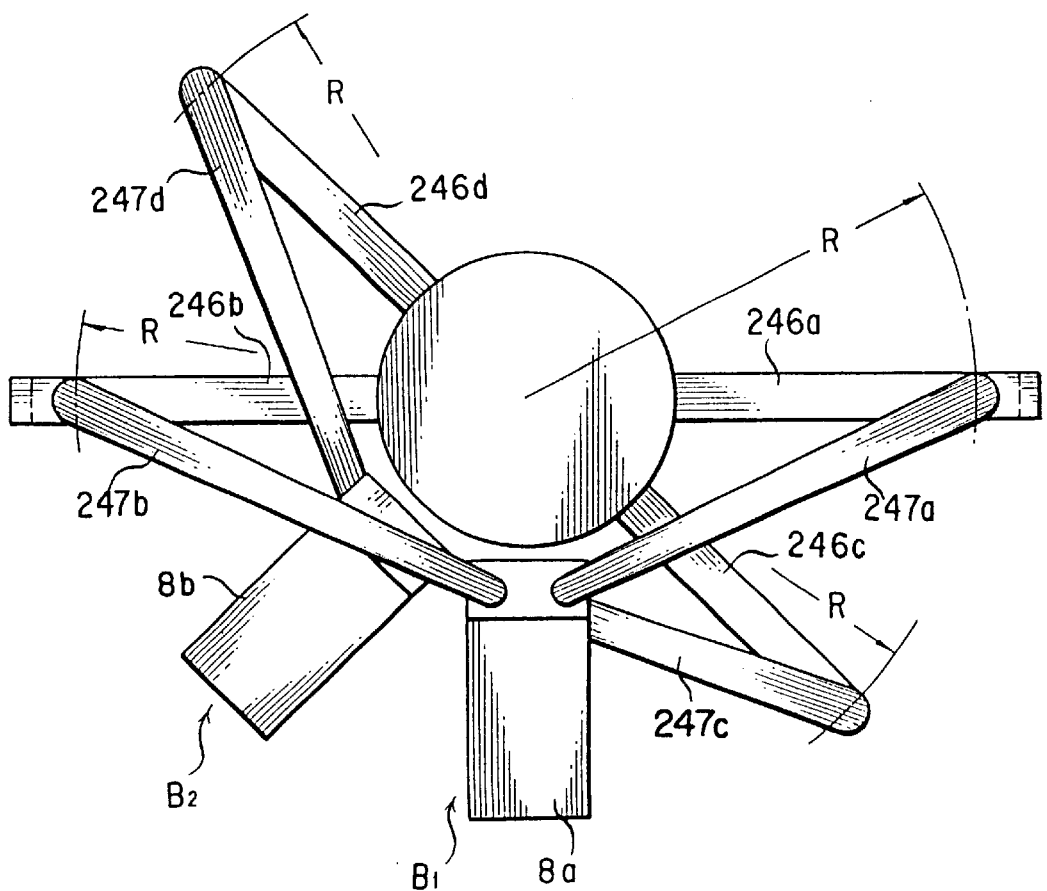
FIG. 34 is a top plan view showing the fourth embodiment of the present invention.

By rotating the said ring shaped bosses 240*a*, 240*b* and 240*c* in an identical rotary direction in a stand-by state as shown in FIG. 34, it can be seen that the handling robot will be rotated within the said transfer chamber 1.

Figure 44:
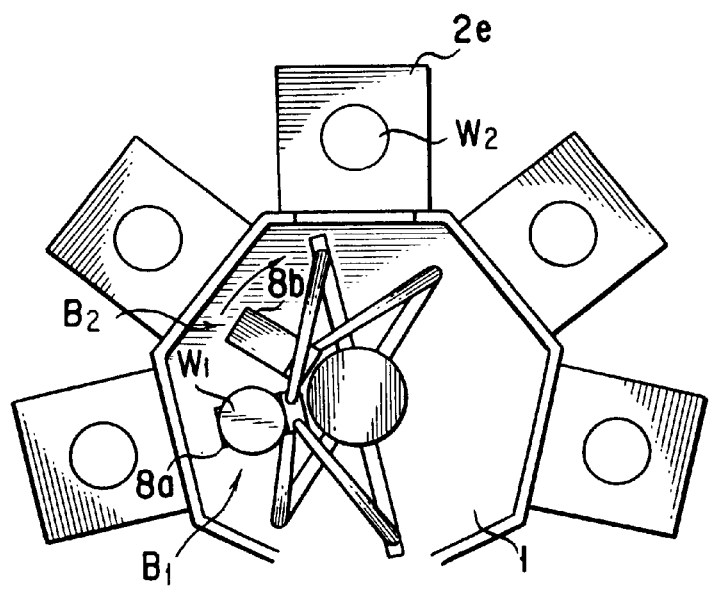
FIG. 44 is an operational explanatory view for a given station in the fourth embodiment of the present invention.

FIGS. 44 to 48 show a series of operational steps in this fourth embodiment of the present invention. First, the entire handling robot in the stand-by state will be rotated so that in a state in which the transfer table 8*a* of one robotic link mechanism B1 has an unprocessed wafer $W_1$ mounted thereon, the one having a wafer mounted thereon, i. e. the vacant transfer table 8*b* of the other robotic link mechanism B2 may be opposed to a process chamber station 2*e* in which a processed wafer $W_2$ is present (FIG. 44).

Figure 45:
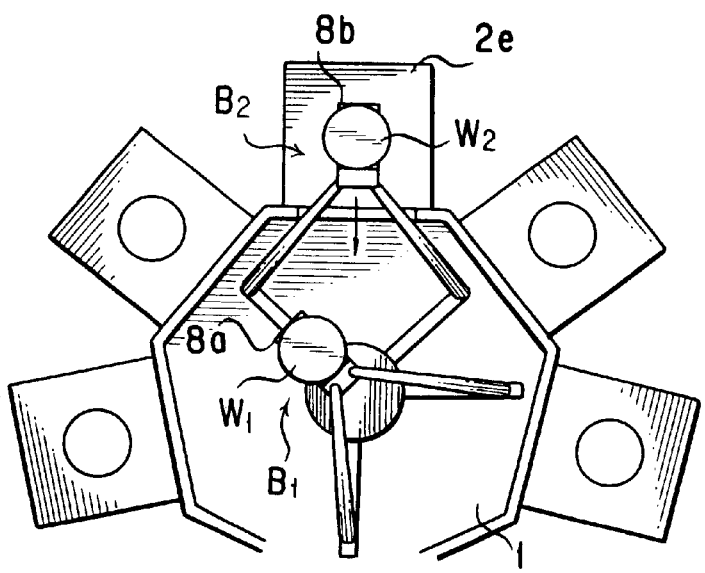
FIG. 45 is an operational explanatory view for a given station in the fourth embodiment of the present invention.
Figure 46:
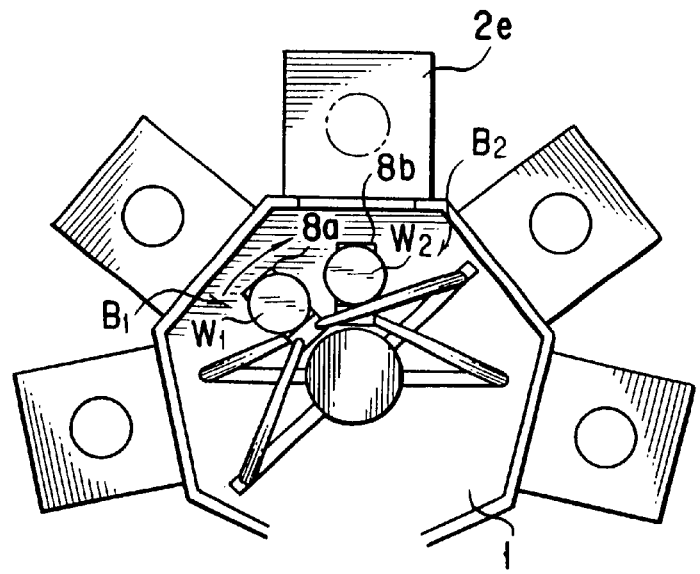
FIG. 46 is an operational explanatory view for a given station in the fourth embodiment of the present invention.

Then, the said vacant transfer table 8*b* of the said other robotic link mechanism B2 will be projected into the above mentioned process chamber station 2*e* whereupon with the said processed wafer $W_2$ mounted thereon it will be conveyed out (FIG. 45). Thereafter, the entire handling robot will be rotated until the said transfer table 8*a* of the robotic link mechanism B1 having the said unprocessed wafer $W_1$ mounted thereon is opposed to the said process chamber station 2*e* where it is to be processed (FIG. 46). The angle of rotation in this state can sufficiently be for an amount of deviation of the said two transfer tables 8*a* and 8*b* in their rotary directions and may be, for example, not more than 90°.

Figure 47:
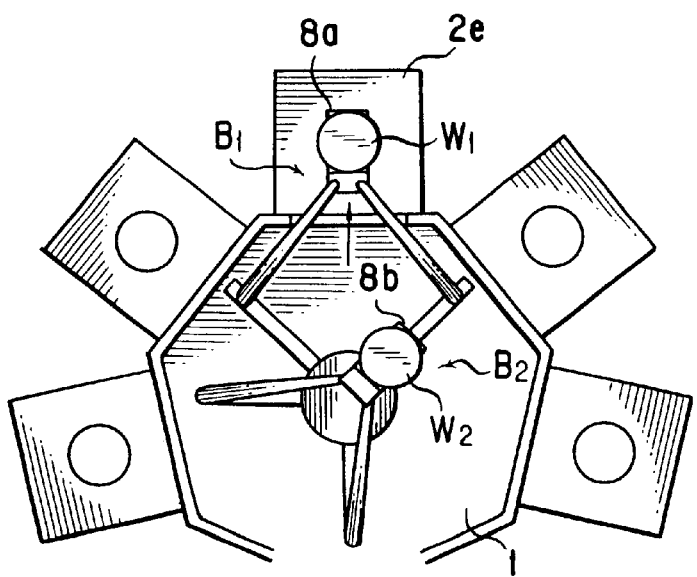
FIG. 47 is an operational explanatory view for a given station in the fourth embodiment of the present invention.
Figure 48:
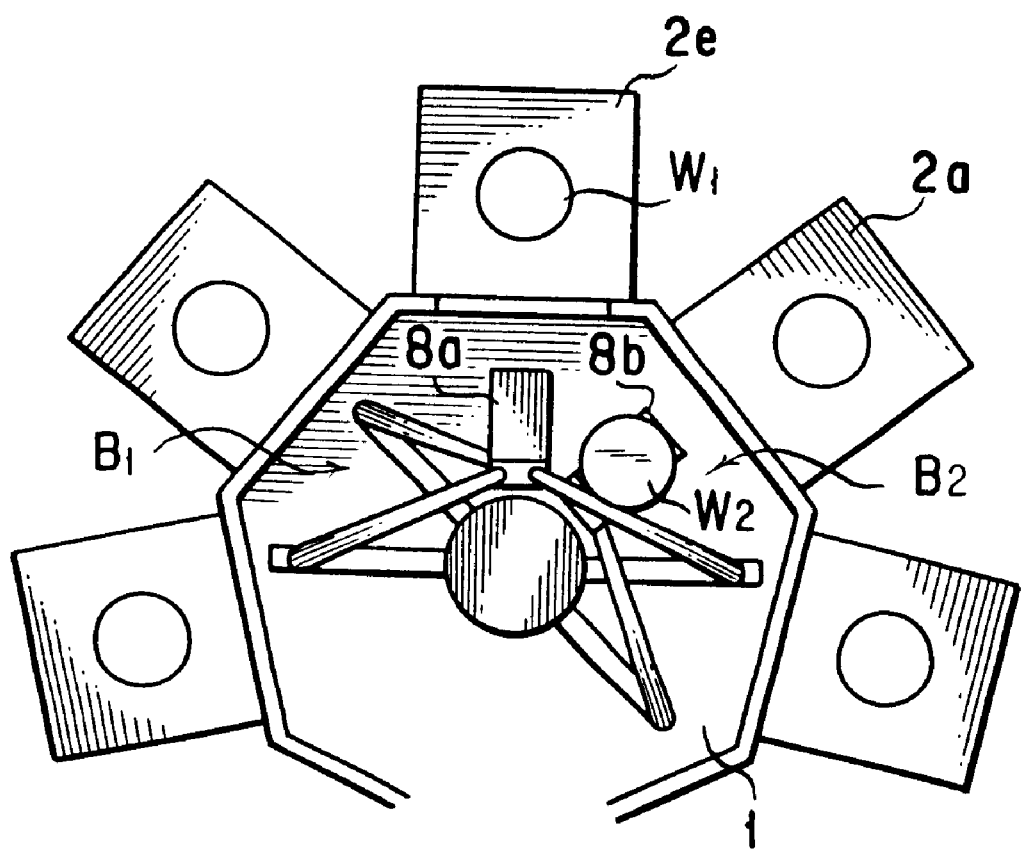
FIG. 48 is an operational explanatory view for a given station in the fourth embodiment of the present invention.

In this state, the said transfer table 8*a* of the robotic link mechanism B1 having the said unprocessed wafer $W_1$ mounted thereon will be projected into the said process chamber station 2*e* to set this wafer $W_1$ within this process chamber station 2*e* (FIG. 47). Then, the said vacant transfer table 8*a* will be retracted towards the side of the said transfer chamber 1 (FIG. 48).

Thereafter, the entire handling robot will be rotated until the said vacant transfer table 8*a* is opposed to a process chamber station 2*a* where a next processing operation is to be carried out. By repeating similar process steps to the above, a next processing operation for the said processed wafer $W_2$ on the other transfer table 8*b* will be carried out in the process chamber station 2. It may be noted, however, that for opposing the other transfer table 8*b* to the said process chamber station 2*e*, it is necessary to rotate the handling robot oppositely to the above.

In this manner, the handling robot according to the present embodiment of the invention enables a processed wafer and an unprocessed wafer to be exchanged for a given station only by turning the handling robot over a small angle, for example, not more than 90°.

Furthermore, since the said two transfer tables 8*a* and 8*b* do not overlap one upon another, it can be seen that if a dust falls from one transfer table side, this will never contaminate the upper surface of the other transfer table. Also, since the said two transfer tables 8*a* and 8*b* assume an identical position in an axial direction of the center of rotation (i. e. in a vertical direction) of a said ring shaped boss, it will be noted that each of the said transfer tables can be projected and retracted for a given gate without moving the handling robot vertically. Also a vertical dimension of the gate 6 for each of the process chamber stations into which these transfer tables 8*a*, 8*b* may be thrusted into is such a size that only one of the transfer tables can be thrusted into, thus the vertical dimension can be minimized. And those in this embodiment is the same as in the below mentioned embodiment.

[A Fifth Embodiment)

FIGS. 36 to 39 show a fifth embodiment of the present invention. There are protrudingly mounted radially a first and a second arm 256*a* and 256*b* to side surfaces of a first ring shaped boss 250*a*, a third arm 256*c* to a side surface of a second ring shaped boss 250*b* and a fourth arm 256*d* to an axial center portion on the top surface of the said second ring shaped boss 250*b* via an upstanding leg column 256*e*, respectively, and a rotary joint is provided on the forward end upper surface of each of the said arms.

The respective rotary joints radii R of the above mentioned arms 256*a*, 256*b*, 256*c* and 256*d* are an identical size. And, the respective rotary joints of the above mentioned first and fourth arms 256*a* and 256*d* assume an identical position in a vertical direction whereas the respective rotary joints of the said second and third arms 256*b* and 256*c* assume an identical position in a vertical direction and are lower than those of the said first and fourth arms 256*a* and 256*d*.

Each of the respective rotary joints of the above mentioned arms 256*a*, 256*b*, 256*c* and 256*d* has one end of each of a first, a second, a third and a fourth link 257*a*, 257*b*, 257*c* and 257*d* which have an identical length but are longer than the length R of each of the above mentioned arms, so as to be rotatable. And, there is coupled a said first transfer table 8*a* to the respective forward end lower surfaces of the said first and fourth links 257*a* and 257*d* via a transfer table attitude regulating mechanism and a first robotic link mechanism $B_1'$ is thereby constructed. Also, there is coupled a said second transfer table 8*b* to the respective forward end upper surfaces of the said second and third links 257*b* and 257*c* via a transfer table attitude regulating mechanism and a second robotic link mechanism $B_2'$ is constructed thereby.

Figure 38:
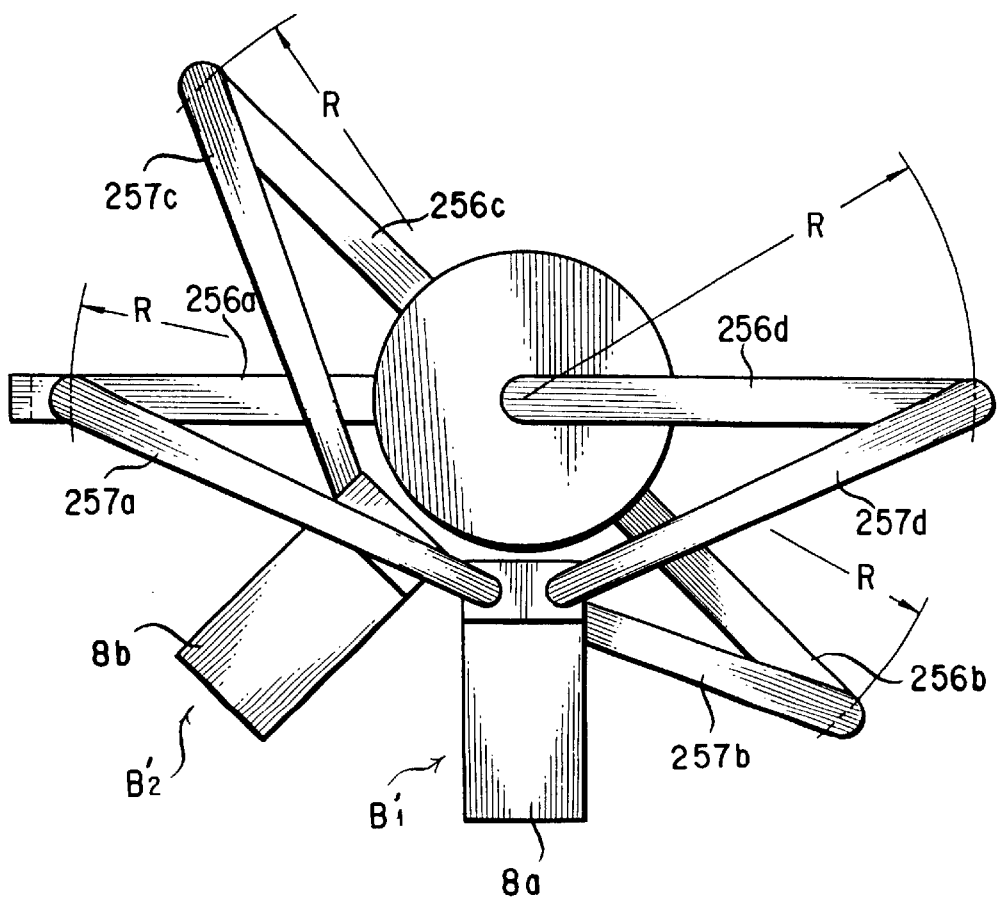
FIG. 38 is a top plan view showing the fifth embodiment of the present invention.
Figure 39:
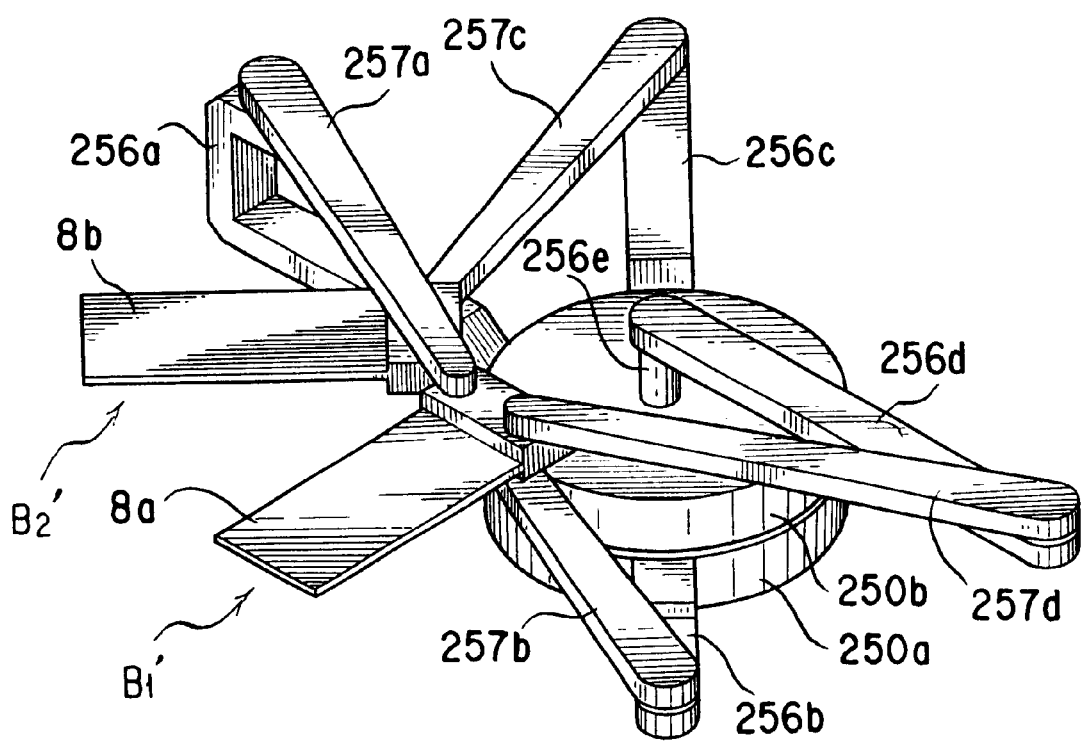
FIG. 39 is a perspective view showing the fifth embodiment of the present invention.
Figure 40:
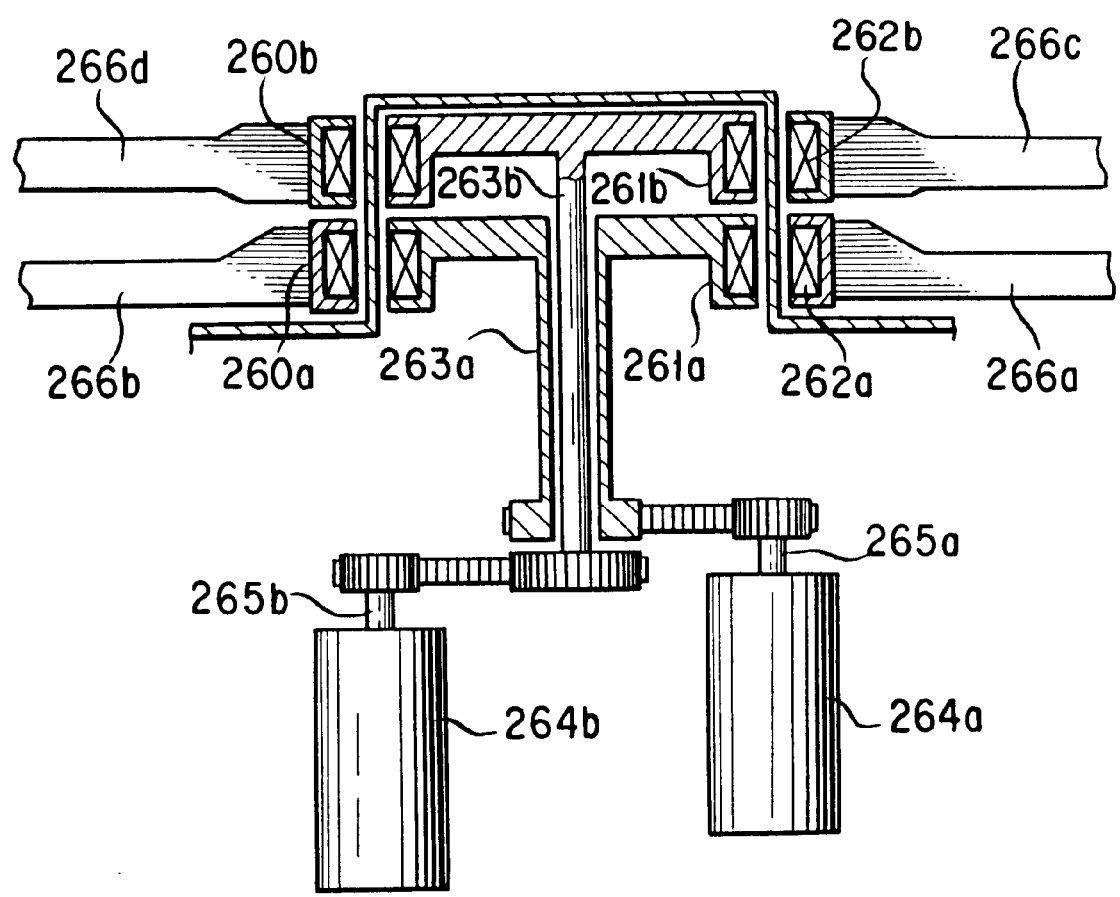
FIG. 40 is a cross sectional view showing a boss section in a sixth embodiment of the present invention.

In this case, the said transfer table 8*a* of the first robotic link mechanism $B_1'$ is configured to be in a state in which it is retracted towards the ring shaped boss side and thus in a so called stand-by state, for example when the said first and fourth arms 256*a* and 256*d* are made linear diametrically. Also, the said transfer table 8*b* of the second robotic $B_2'$ is likewise configured to be in a stand-by state when the said second and third arms 256*b* and 256*c* are made linear diametrically. And, the said two transfer tables 8*a* and 8*b* in such a stand-by state are then positionally deviated in a rotary direction of a said ring shaped boss by a rotation thereof, and it is this state which constitutes a stand-by state of the handling robot (FIG. 38). And, from this state each of the said transfer tables 8*a* and 8*b* is, likewise the above mentioned fourth embodiment, projected and retracted in a radial direction of a ring shaped boss, and also in this state the handling robot is designed to be rotated. In this regard it should also be noted that the amount of deviation of the said two transfer tables 8*a* and 8*b* each in their respective rotary directions is likewise the case of the above mentioned fourth embodiment.

Figure 37:
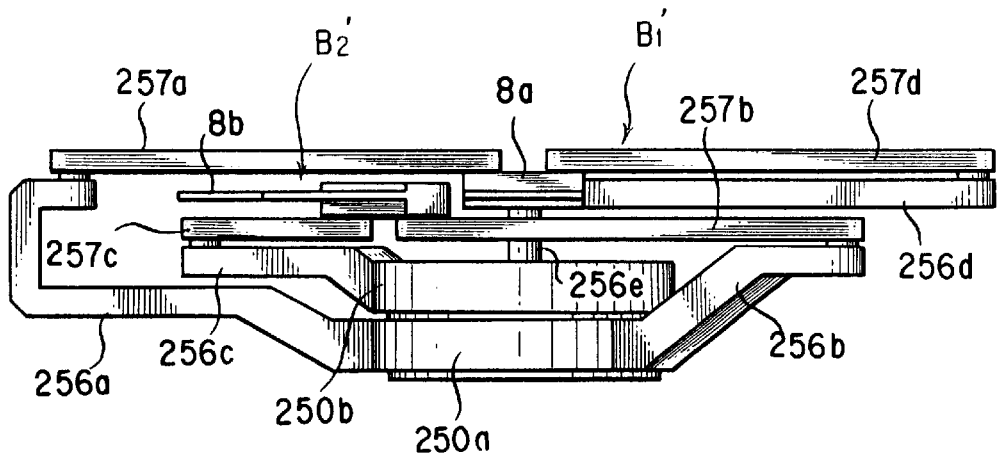
FIG. 37 is a front view showing the fifth embodiment of the present invention.

Since the said two transfer tables 8*a* and 8*b* do not then overlap in a rotary direction, they assume an identical position in a vertical direction as shown FIG. 37. Also, the forward end portion of the said first arm 256a is curved outwards so that the forward end portion of the said third arm 256c may not interfere therewith. And, the process steps in this fifth embodiment are substantially the same as those in the above mentioned fourth embodiment.

(A Sixth Embodiment)

FIGS. 40 to 43 show a sixth embodiment of the present invention. There are protrudingly mounted radially a first and a second arm 266a and 266b to side surfaces of a first ring shaped boss 260a, and a third and a fourth arm 266c and 266d to side surfaces of a second ring shaped boss 260b, respectively, and their respective rotary joints are provided on the respective forward end lower surfaces of the said first and third arms 266a and 266c and the respective forward end upper surfaces of the said second and fourth arms 266b and 266d.

The respective rotary joints radii R of the above mentioned arms 266a, 266b, 266c and 266d are an identical size. And, there are provided the respective rotary joints of the said first and third arms 266a and 266c on their lower surfaces and the respective rotary joints of the said second and fourth arms 266b and 266d on their upper surfaces. And, the respective rotary joints of the said first and fourth arms 266a and 266d assume an identical position in a vertical direction whereas the respective rotary joints of the said second and third arms 266b and 266c assume an identical position in a vertical direction and are lower than those of the said first and fourth arms 266a and 266d.

Each of the respective rotary joints of the above mentioned arms 266a, 266b, 266c and 266d has one end of each of a first, a second, a third and a fourth link 267a, 267b, 267c and 267d which have an identical length but are longer than the length R of each of the above mentioned arms, so as to be rotatable. And, there is coupled a said first transfer table 8a to the respective forward end lower surfaces of the said first and fourth links 267a and 267d via a transfer table attitude regulating mechanism and a first robotic link mechanism $B_1''$ is thereby constructed. Also, there is coupled a said second transfer table 8b to the respective forward end upper surfaces of the said second and third links 267b and 267c via a transfer table attitude regulating mechanism and a second robotic link mechanism $B_2''$ is constructed thereby.

In this case, the said transfer table 8a of the first robotic link mechanism $B_1''$ is configured to be in a state in which it is most retracted towards the ring shaped boss side and thus in a so called stand-by state, when the said first and fourth arms 266a and 266d are made linear diametrically. Also, the said transfer table 8b of the second robotic $B_2''$ is likewise configured to be in a stand-by state when the said second and third arms 266b and 266c are made linear diametrically. And, the said two transfer tables 8a and 8b in such a stand-by state are then positionally deviated in a rotary direction of a said ring shaped boss (FIG. 42), and it is this state which constitutes a stand-by state of the handling robot. And, from this state each of the said transfer tables 8a and 8b is, likewise the above mentioned fourth embodiment, projected and retracted in a radial direction of a ring shaped boss by a rotation thereof, and also in this state the handling robot is designed to be rotated. And, the amount of deviation of the said two transfer tables 8a and 8b in their respective rotary directions is substantially the same as the case of the above mentioned fourth embodiment.

Figure 41:
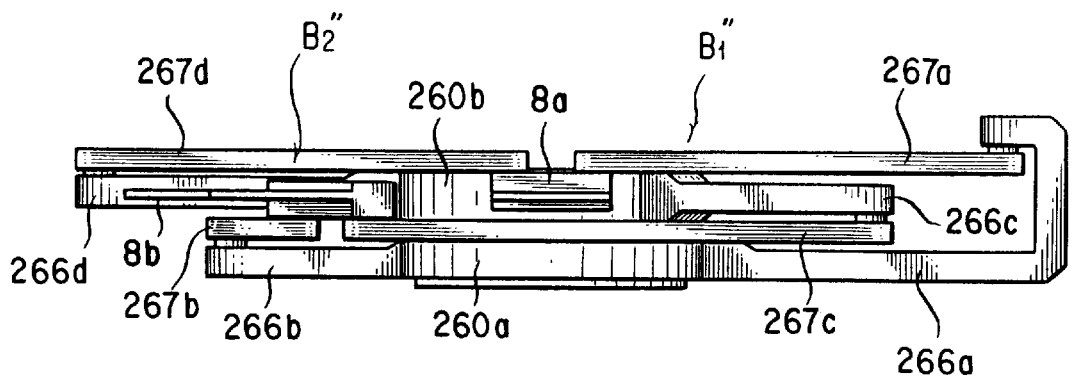
FIG. 41 is a front view showing the sixth embodiment of the present invention.
Figure 42:
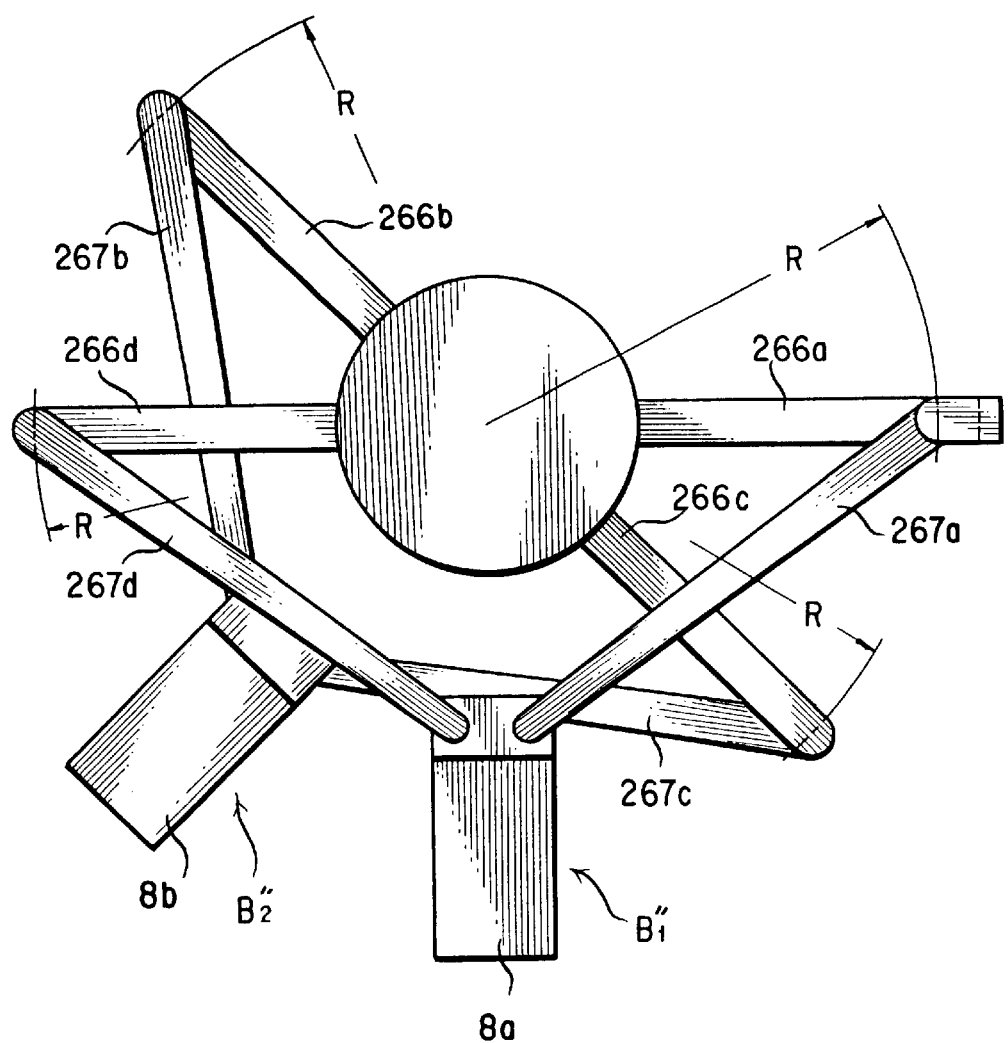
FIG. 42 is a top plan view showing the sixth embodiment of the present invention.
Figure 43:
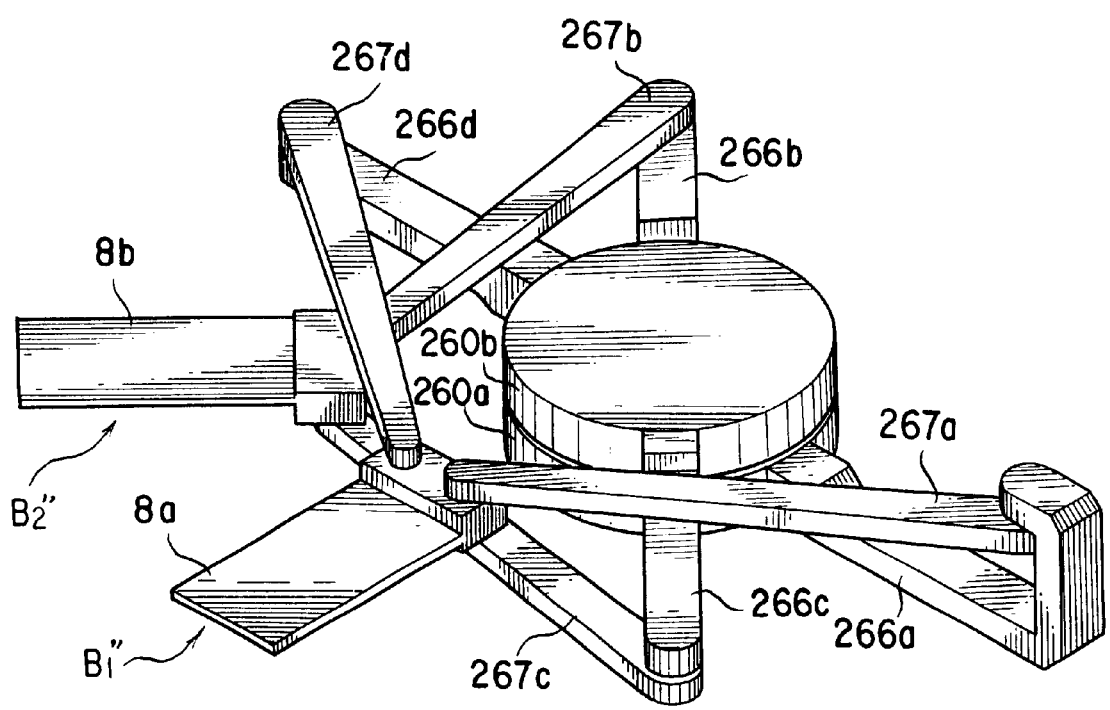
FIG. 43 is a perspective view showing the sixth embodiment of the present invention.

Since the said two transfer tables 8a and 8b do not then overlap in a rotary direction, they assume an identical position in a vertical direction as shown FIG. 41. Also, the forward end portion of the said first arm 266a is curved outwards so that the forward end portion of the said third arm 266c may not interfere therewith. And, the process steps in this sixth embodiment is substantially the same as those in the above mentioned fourth embodiment.

(A Seventh Embodiment)

Figure 49:
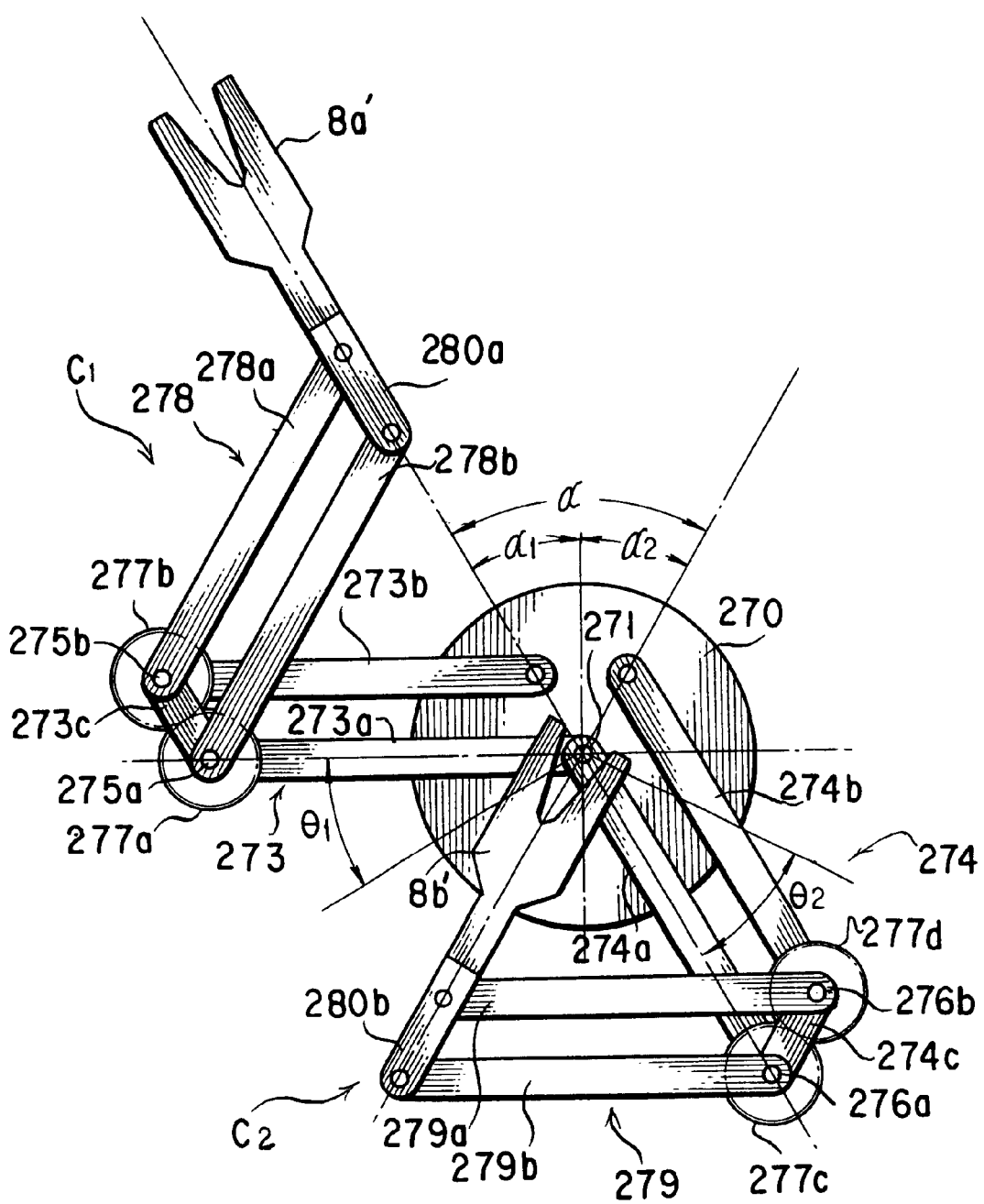
FIG. 49 is a top plan view showing an operating state of a seventh embodiment of the present invention.
Figure 50:
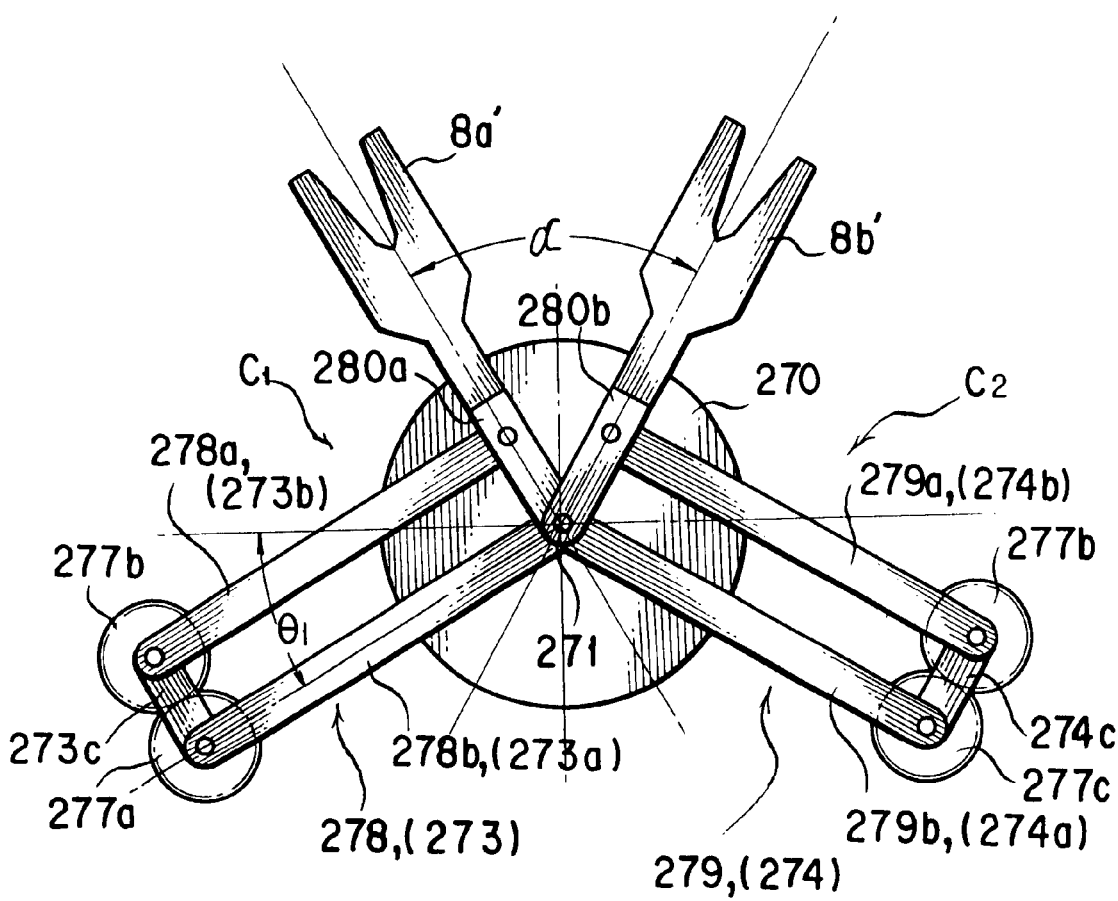
FIG. 50 is a top plan view showing a stand-by state in the seventh embodiment of the present invention.
Figure 51:
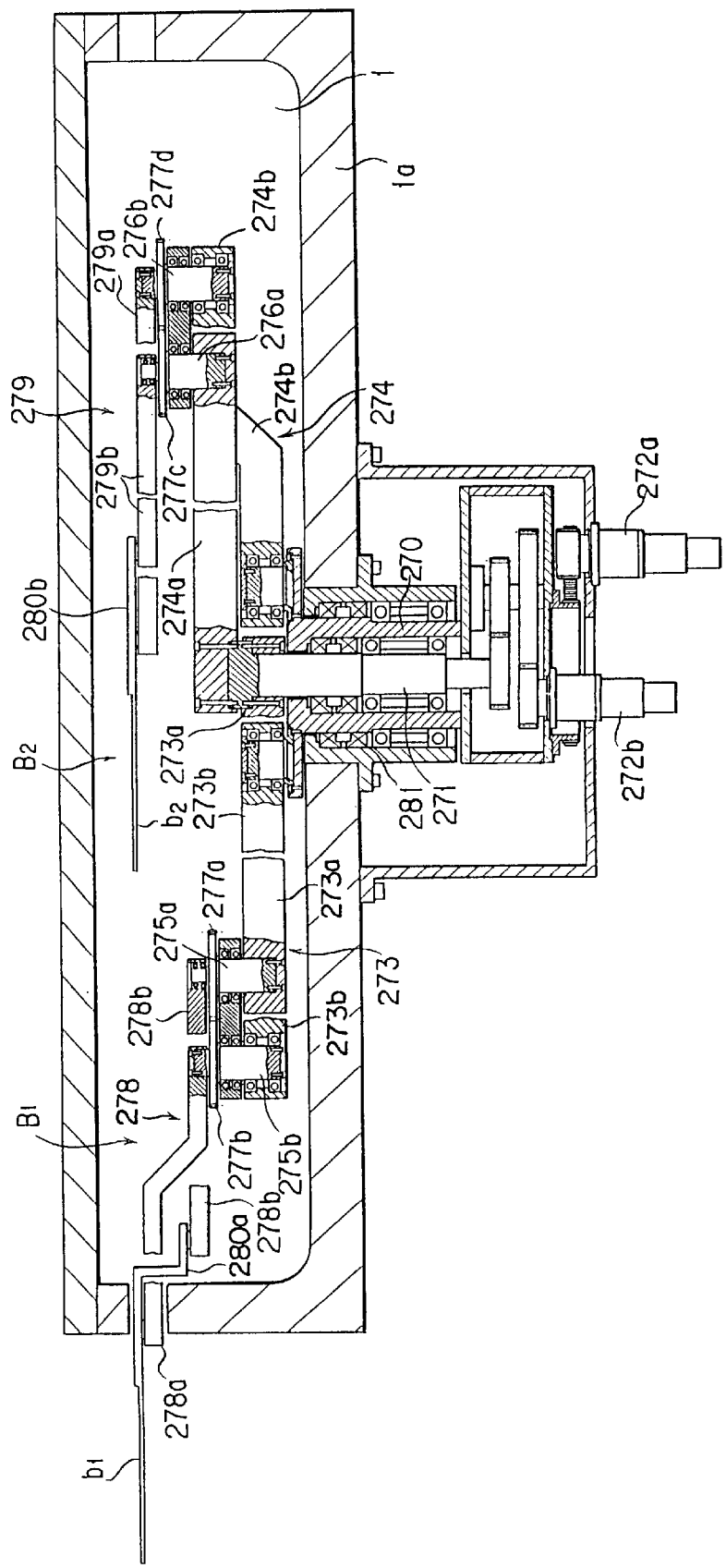
FIG. 51 is a cross sectional view showing the construction of the seventh embodiment of the present invention.

FIGS. 49 to 51 show a seventh embodiment of the present invention. In this seventh embodiment, too, like the above mentioned fourth to sixth embodiments, two transfer tables 8a' and 8b' are positionally deviated in a rotary direction of the robot and assume an identical position in a direction of the axis of a center of rotation.

FIGS. 49 and 50 diagrammatically show the construction and operation of the seventh embodiment and a specific construction thereof is illustrated in FIG. 51. As shown, it includes a rotary table 270 which is rotatably supported by a said frame la of a said transfer chamber 1 and a drive shaft 271 which is supported at the center of rotation of the said rotary table 270 rotatably with respect thereto. And, the above mentioned rotary table 270 is so arranged as to be driven normally and reversely by a first motor unit 272a that is fastened to the frame la side of the said transfer table 1. Also, the said drive shaft 271 is so arranged as to be driven normally and reversely by a second motor unit 272b that is fastened to the said rotary table 270 side.

A first and a second robotic link mechanism $C_1$ and $C_2$ which are disposed at both sides of the above mentioned drive shaft 271 include a pair of drive link mechanisms 273 and 274, respectively, which are constituted by a parallel link mechanism. The said first drive link mechanism 273 is constituted of a drive link 273a and a driven link 273b which are arranged in parallel to each other and a coupling link 273c that is adapted to couple the respective forward ends of the said links 273a and 273b together. Also, the said second drive link mechanism 274 is constituted of a drive link 274a and a driven link 274b which are arranged in parallel to each other and a coupling link 274c that is adapted to couple the respective forward ends of the said links 274a and 274b together.

And, the respective drive links 273a and 274a of the above mentioned drive link mechanisms 273 and 274 have their base section that is fastened and coupled to the above mentioned drive shaft 271. Also, the respective base ends of the said driven links 273b and 274b are journaled on the said rotary table 270 so that they may be spaced apart from each other with an angle α with respect to the center of rotation of the said rotary table 270.

The said coupling links 273c and 274c for their respective drive link mechanisms 273 and 274 have at their respective both ends a pair of supporting shafts 275a and 275b; and a pair of supporting shafts 276a and 276b, respectively, which are in turn provided for the said coupling links 273c and 274c with a pair of gears 277a and 277b which mesh with each other and a pair of gears 277c and 277d which mesh with each other, respectively, the said gears 277a, 277b, 277c and 277d having an identical number of teeth. Of these supporting shafts, the said shafts 275a and 276a located at the respective forward ends of the said drive links 273a and 274a are integrally coupled therewith, respectively, whereas the said supporting shafts 275b and 276b are adapted to be rotatable with respect to the said driven links 273b and 274b, respectively.

There are provided a first and a second driven link mechanism 278 and 279 which are coupled with the drive link mechanisms 273 and 274 at their forward end sides, respectively, of the said first and second robotic link mechanisms $C_1$ and $C_2$ and are each constituted by a parallel link configuration. The said first driven link mechanism 278 is comprised of a pair of drive link 278a and driven link 278b extending in parallel to each other and a coupling link 280a that is coupled with the said links 278a and 278b. Also, the said second driven link mechanism 279 is comprised of a pair of drive link 279a and driven link 279b extending in parallel to each other and a coupling link 280b that is coupled with the said links 279a and 279b.

Of the base ends of these links, the respective base ends of the said drive links 278a and 279a are integrally coupled with the said supporting shafts 275b and 276b at the respective sides of the said driven links 273b and 274b for the above mentioned first and second drive link mechanisms 273 and 274, respectively, whereas the respective base ends of the said driven links 278b and 279b are coupled with the said supporting shafts 275a and 276a, respectively, so as to be rotatable.

Figure 52:
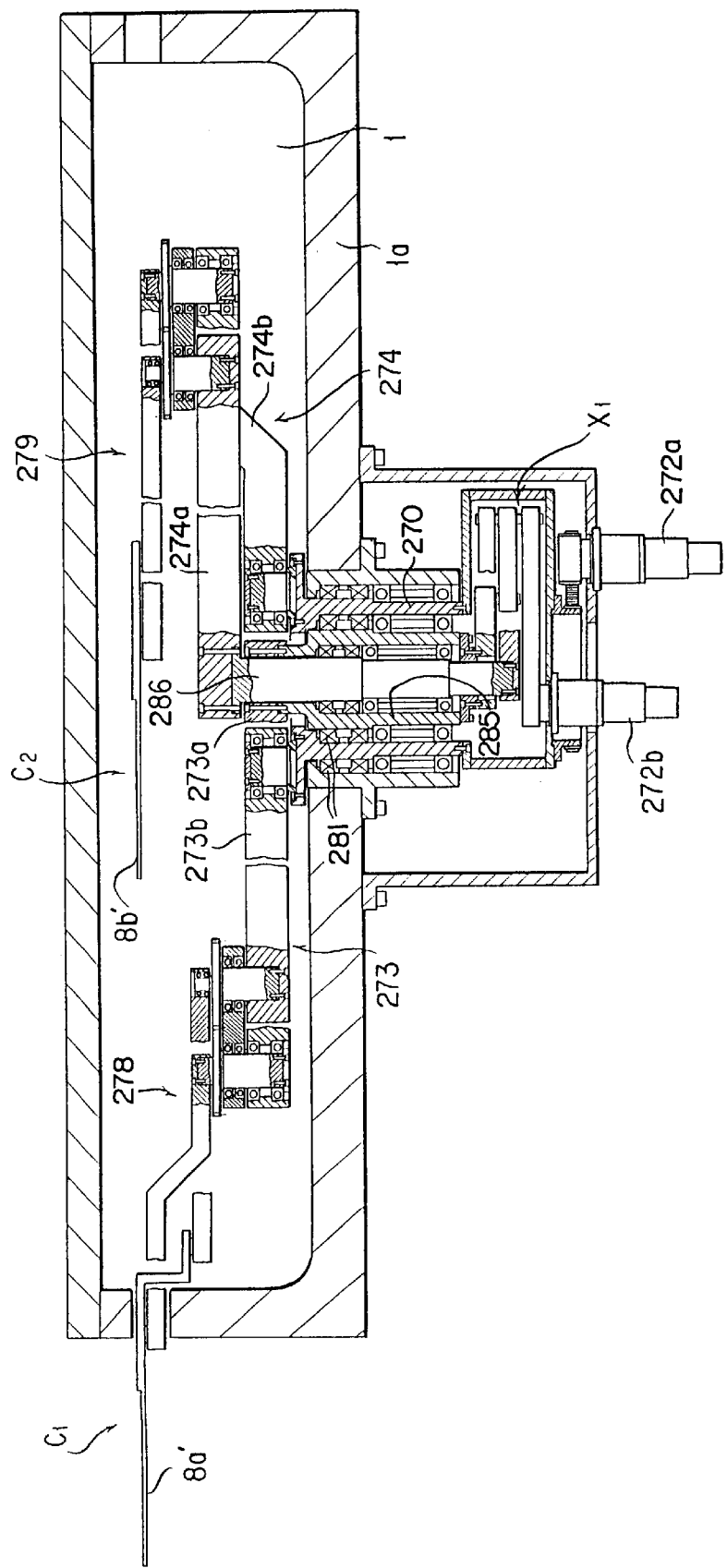
FIG. 52 is a cross sectional view showing the construction of an eighth embodiment of the present invention.

And, the said transfer tables 8a' and 8b' are integrally coupled with the said coupling links 280a and 280b at the respective forward end sides of the said driven link mechanisms 278 and 279, respectively. From the respective link configurations of the said driven link mechanisms 278 and 279 and the respective configurations of the said transfer tables 8a' and 8b', it can be seen that the said two transfer tables 8a' and 8b' assume an identical position vertically as shown in FIG. 52. Also, the base end sections of the said transfer tables 8a' and 8b' are configured so that they may not interfere with each other.

Furthermore, the said two transfer tables 8a' and 8b' in this case are disposed on the respective extensions of the said coupling links 280a and 280b at the respective forward end sides of the said two driven link mechanisms 278 and 279. Consequently, the said two transfer tables 8a' and 8b' are positionally deviated in a rotary direction by the above mentioned spaced-apart angle α with respect to the center of rotation of the said rotary table 270. At this point it should also be noted that there is shown a ferrofluidic seal 281 in FIG. 52.

An explanation will now be given with respect to the operation of this seventh embodiment of the invention.

If the said second motor unit 272b is normally or reversely rotated in a stand-by state as shown in FIG. 50 to rotate the said drive shaft 271, for example, rightwards, the respective drive links 273a and 274a of the respective drive link mechanisms 273 and 274 of the said first and second robotic link mechanisms $C_1$ and $C_2$ will be jointly rotated rightwards.

Since this causes the said first and second driven link mechanisms 278 and 279 to be jointly rotated leftwards when operated by the said gears 277a, 277b, 277c and 277d as shown in FIG. 49, the transfer table 8a' of the said first robotic link mechanism $C_1$ will be operatively projected and the transfer table 8b' of the said second robotic mechanism $C_2$ will be operatively retracted. Then, the said transfer tables 8a' and 8b' will be operatively projected and retracted in the directions of angles $\alpha_1$ and $\alpha_2$, respectively, of the spaced-apart angle α of each of the said driven links 273b and 274b of the respective drive link mechanisms 273 and 274 of the respective drive link mechanisms 273 and 274.

If the said drive shaft 271 is rotated reversely, i. e. leftwards, the above mentioned operation will be reversed in a way that the transfer table 8a' of the said first robotic link mechanism $C_1$ will be operatively retracted along the direction of the said angle $\alpha_1$ and the transfer table 8b' of the said second robotic link mechanism $C_2$ will be operatively projected along the direction of the said angle $\alpha_2$.

With the said first motor unit 272a being driven in the state of a stand-by attitude of FIG. 50, the said rotary table 270 will be rotated so that the said first and second robotic link mechanisms $C_1$ and $C_2$ may be jointly rotated.

(An Eighth Embodiment)

FIGS. 52 to 60 show an eighth embodiment of the present invention. This eighth embodiment makes use of the construction which is identical to that of the said seventh embodiment and in which the respective drive links 273a and 274a of the said drive link mechanisms 273 and 274 are made coaxial with each other and arranged so as to be driven by drive shafts which are separately attached to the said rotary table 270. It is characterized by a large link action on the operative projection side and a small link action on the operative retraction side.

As shown in FIGS. 52 to 60, the construction ahead of the respective drive link mechanisms 273 and 274 of the said first and second robotic link mechanisms $C_1$ and $C_2$ is made identical to the construction of the said seventh embodiment, and the said rotary table 270 is arranged so as to be rotated by the said first motor unit 272a as in the said seventh embodiment.

The said rotary table 270 has its central region in which a first and second drive shaft 285 and 286 are supported coaxially with each other so as to be independently rotatable. And, the said first drive shaft 285 has fastened thereto at its forward end one end of the drive link 273a of the link mechanism 273 of the said first robotic link mechanism $C_1$ whereas the said second drive shaft 286 has fastened thereto at its forward end one end of the drive link 274a of the drive link mechanism 274 of the said second robotic link mechanism $C_2$.

The respective base ends of the said first and second drive shafts 285 and 286 are coupled via a first bidirectional rotary link mechanism $X_1$ to the said single second motor unit 272b that is supported by the said rotary table 270, and are so configured that when the said second motor unit 272b is rotated unidirectionally, the drive link mechanism 273 of the said first robotic link mechanism $C_1$ and the drive link mechanism 274 of the said second robotic link mechanism $C_2$ may be rotated in an identical direction and with different angles of rotation.

Figure 53:
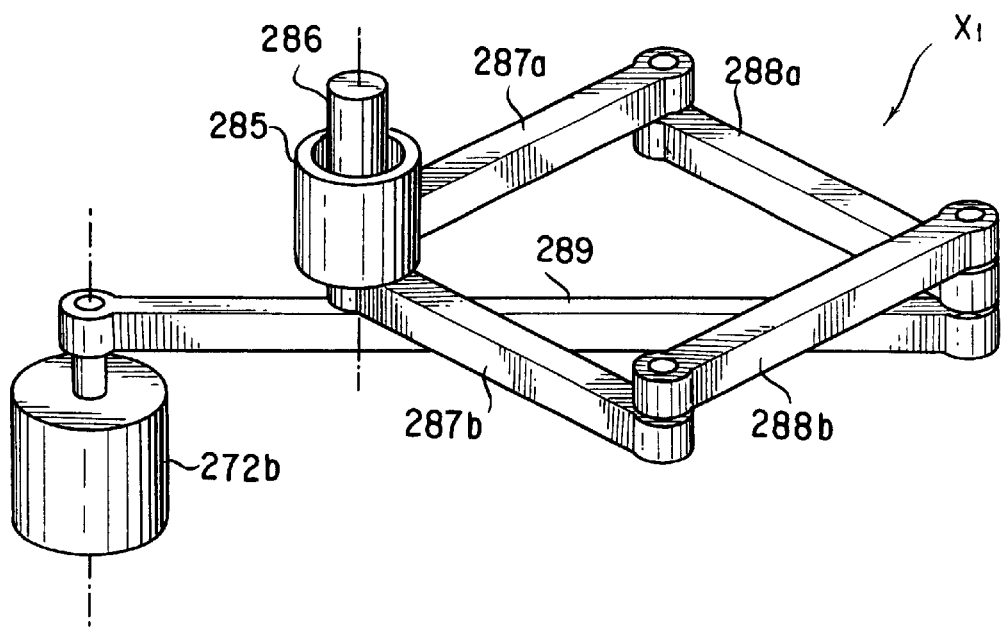
FIG. 53 is a perspective view showing a first bidirectional rotary link mechanism.
Figure 54:
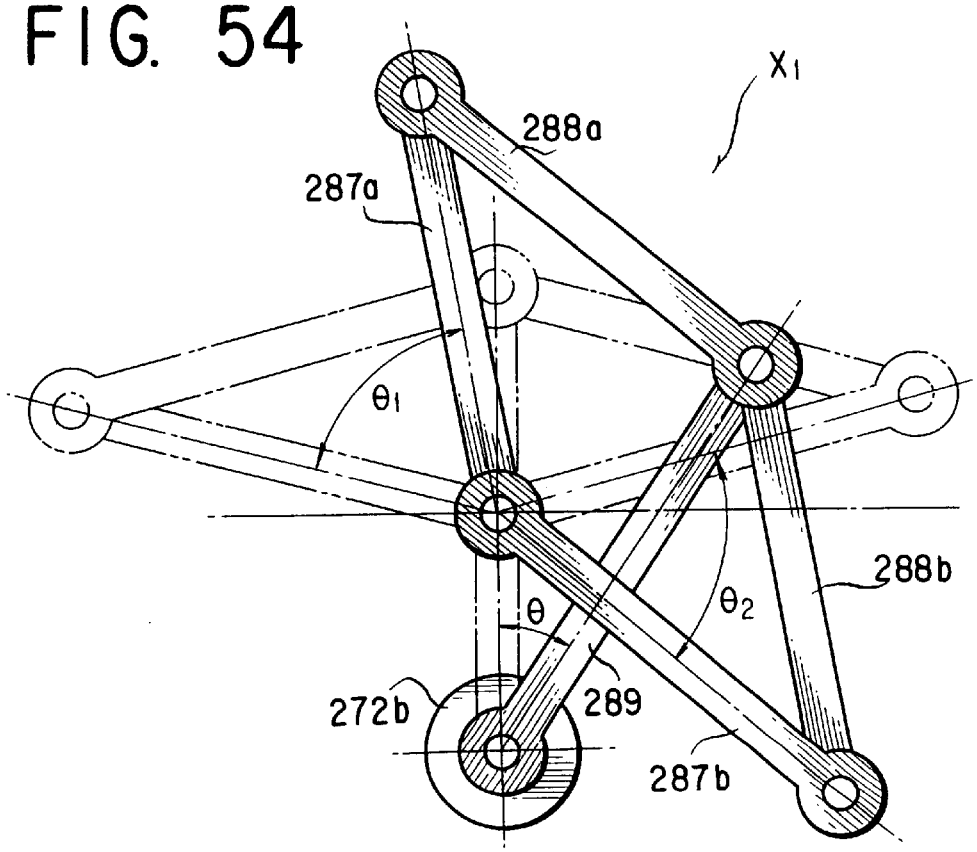
FIG. 54 is an operational explanatory view showing the first bidirectional rotary link mechanism.
Figure 55:
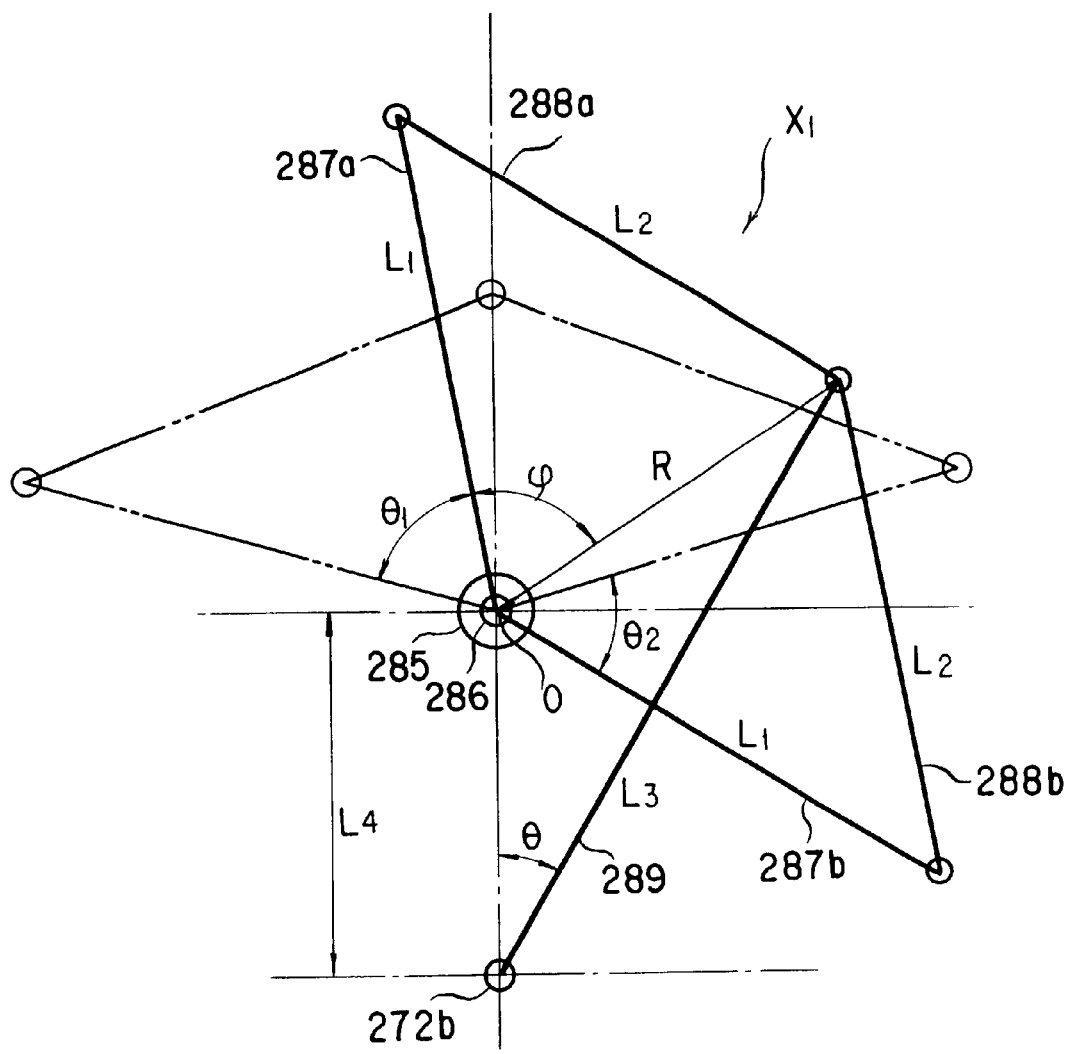

The said bidirectional rotary link mechanism $X_1$, as shown in FIGS. 53 to 55, comprises a first driven link 287a having one end coupled to the said first drive shaft 285, a second driven link 287b having one end coupled to the said second drive shaft 286, and a first and a second drive links 288a and 288b coupled to the respective forward ends of the said links 287a and 287b, respectively. The said two drive links 288a and 288b constitute a link construction in which their respective forwards ends are coupled together. And, the said respective forward ends of the said two links 288a and 288b have coupled to their coupling portion the forward end of a motor link 289 having one end fastened to the drive shaft of the said second motor unit 272b that is supported by the above mentioned rotary table 270. The said motor link 289 is disposed inside of the above mentioned link mechanism.

FIGS. 54 and 55 diagrammatically show the above mentioned first bidirectional rotary link mechanism $X_1$. If the said second motor unit 272b is driven to rotate the said motor link 289 with a predetermined angle θ rightwards as viewed from the above, the said bidirectional rotary link mechanism $X_1$ will be rotated as distorted rightwards as shown in FIGS. 54 and 55. Assuming that the angle of rotation of the said first driven link 287a that is located at an upstream side in the rotary direction is $\theta_1$ and that the angle of rotation of the said second driven link 287b that is located at a down stream side is $\theta_2$, it will follow that $\theta_1 > \theta_2$. Also, the said motor link 289 is rotated reversely (i. e. leftwards), the relationship that $\theta_1 < \theta_2$ will apply.

If the above mentioned operation is performed from a stand-by state of the said two transfer tables 8a' and 8b' as shown in FIG. 50, the angle $\theta_1$ in the direction of a projection of the said first drive link mechanism 273 will be greater than the angle of rotation $\theta_2$ in the direction of a retraction of the second drive link mechanism 274. As a result, the amount of movement in the direction of a retraction of the said second transfer table 8b' when the said first transfer table 8a' is operatively projected up to a predetermined position, will become relatively small as compared with the amount of a projecting movement of the above mentioned first transfer table 8a'.

Figure 56:
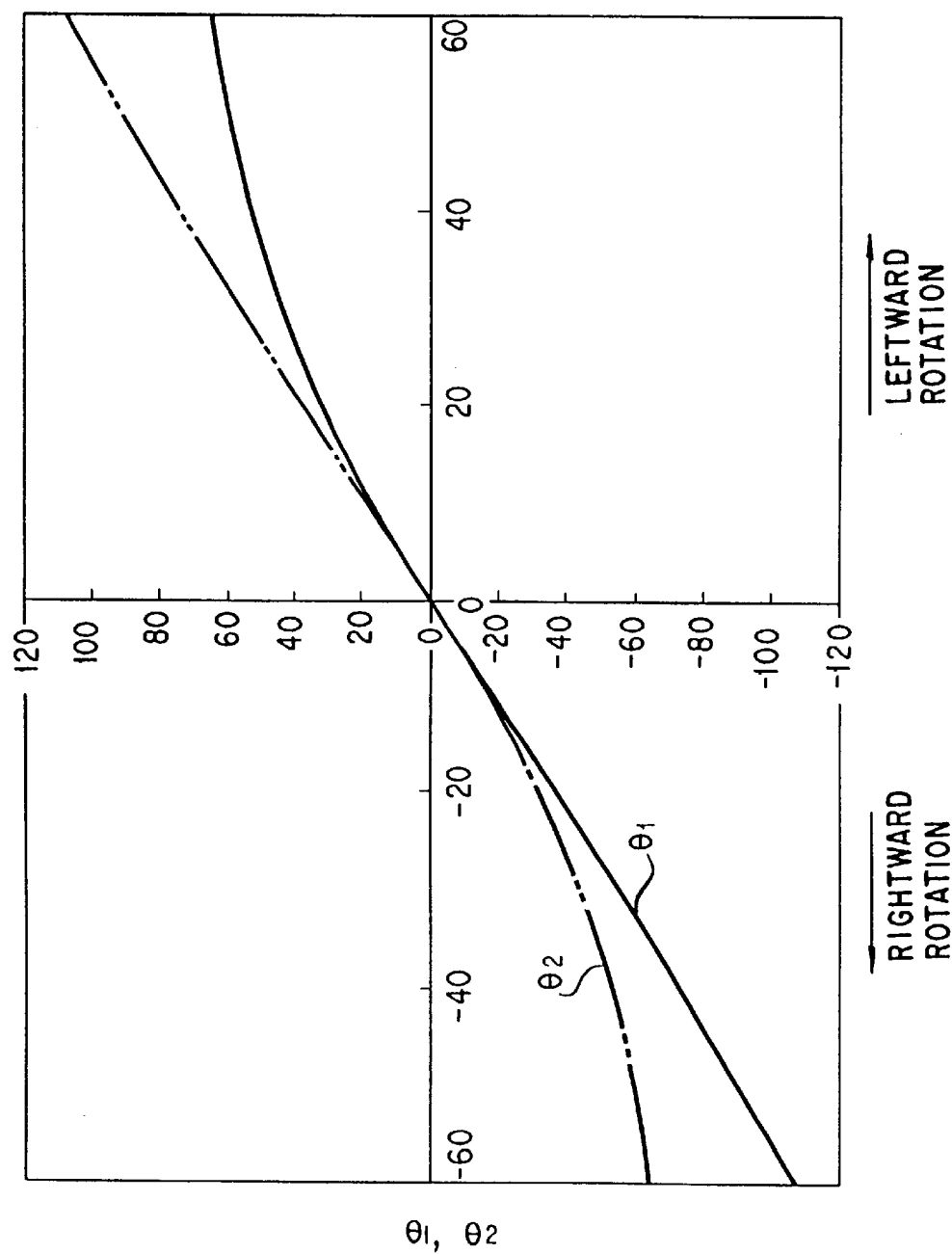
FIG. 56 is a graph showing the changing rotary angles of the first and second drive shafts with respect to the rotary angle of a motor link of the first bidirectional rotary link mechanism.

Now, with reference to FIGS. 55 and 56, an explanation will be given with respect to the fact that if the said bidirectional rotary link mechanism $X_1$ is constructed as shown in FIGS. 53 and 54, the angle of rotation $\theta_1$ ($\theta_2$) of a said link at an upstream side in the rotary direction of the said motor link 289 will be greater than the angle of rotation $\theta_2$ ($\theta_1$) at a downstream side. It is assumed here that the length of the said first and second driven links 287a and 287b is $L_1$, the length of the said first and second drive links 288a and 288b is $L_2$, the length of the said motor link 289 is $L_3$, the distance between the joint of coupling the said first and second drive links 288a and 288b together and the axial center O of the said first and second drive shafts 285 and 286 is R, the angle of rotation of the said motor link is $\theta$, the angle of rotation of the said first driven link 287a is $\theta_1$, the angle of rotation of the said second driven link 287b is $\theta_2$ and the angle made by the said first and second driven links 287a and 287b is $2\phi$. Then, it will follow that $\theta_1$ and $\theta_2$ are expressed by the following equations (1) and (2) and indicated as shown in Table 1 below. They can also be graphed as shown in FIG. 56. In this connection it should be noted that the rightward rotations of the said motor link 289 are assumed to be in the minus in FIG. 56 and Table 1.

$$\theta_1(\theta) = \tan^{-1}\frac{L_3\sin\theta}{L_3\cos\theta - L_4} - (\varphi(0) - \varphi(\theta)) \quad (1)$$

$$= \tan^{-1}\frac{L_3\sin\theta}{L_3\cos\theta - L_4} - \cos^{-1}\frac{L_1^2 - L_2^2 + (L_3 - L_4)^2}{2L_1(L_3 - L_4)} +$$

$$\cos^{-1}\frac{L_1^2 - L_2^2 + L_3^2 + L_4^2 - 2L_3L_4\cos\theta}{2L_1\sqrt{L_3^2 + L_4^2 - 2L_3L_4\cos\theta}}$$

$$\theta_2(\theta) = \tan^{-1}\frac{L_3\sin\theta}{L_3\cos\theta - L_4} + (\varphi(0) - \varphi(\theta)) \quad (2)$$

$$= \tan^{-1}\frac{L_3\sin\theta}{L_3\cos\theta - L_4} + \cos^{-1}\frac{L_1^2 - L_2^2 + (L_3 - L_4)^2}{2L_1(L_3 - L_4)} -$$

$$\cos^{-1}\frac{L_1^2 - L_2^2 + L_3^2 + L_4^2 - 2L_3L_4\cos\theta}{2L_1\sqrt{L_3^2 + L_4^2 - 2L_3L_4\cos\theta}}$$

TABLE 1

| $\theta$ | $\theta 1$ | $\theta 2$ |
| --- | --- | --- |
| −60 | −107.684 | −64.975 |
| −30 | −55.9221 | −43.8053 |
| 0 | 0 | 0 |
| 30 | 43.80526 | 55.92212 |
| 60 | 64.97499 | 107.684 |

(unit in degree)

As will be apparent from the above equations (1) and (2), the graph in FIG. 56 and the able 1 above, the said first and second drive link mechanisms 273 and 274 that are rotated by the said first and second driven links 287a and 287b which are driven by a rotation of the said motor link 289 will each be rotated by $\theta_1$ in a projecting operation and by $\theta_2$ in a retracting operation, reducing the angle of action in a retracting operation compared with a projecting operation. It should be noted here that the diagram of FIG. 55 is presented applying where $L_1:L_2:L_3:L_4=1:1:1.8:0.8$.

FIGS. 57 to 60 show a second bidirectional rotary link mechanism $X_2$ as another example. This makes use a construction in which a motor link 289 that is rotated by the said second motor unit 272b is coupled to an outside of a link mechanism that is identical in structure to the said first bidirectional rotary link mechanism $X_1$ shown in the above mentioned FIG. 53.

Figure 57:
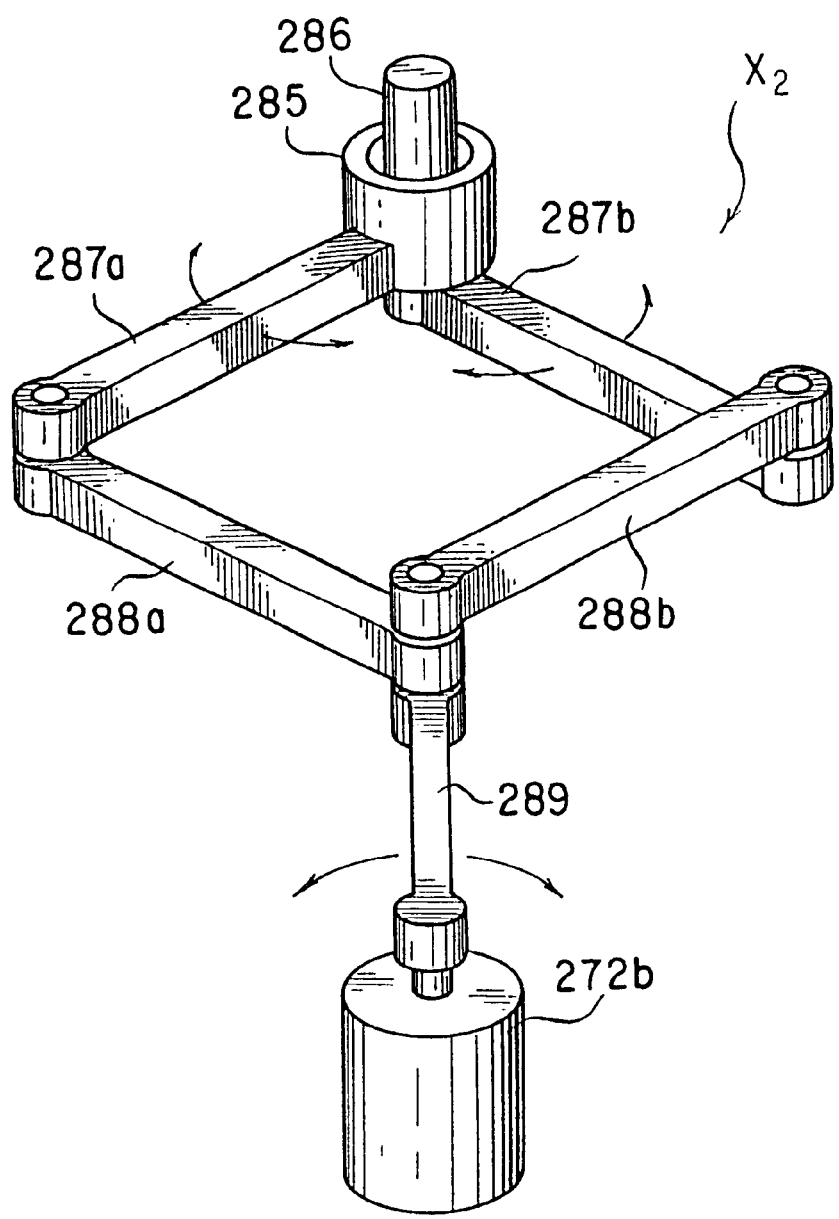
FIG. 57 is a perspective view showing a second bidirectional rotary link mechanism.
Figure 58:
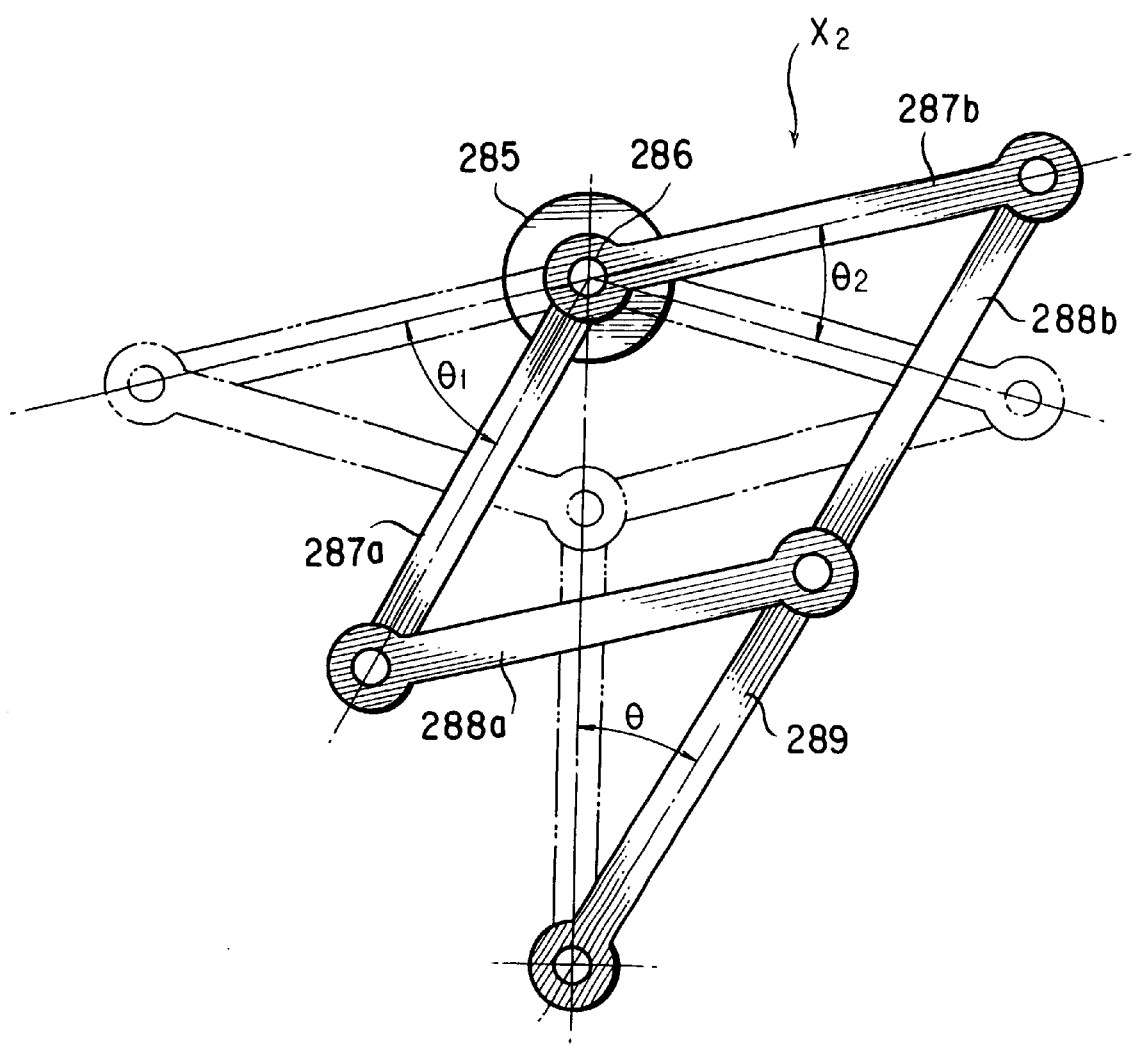
FIG. 58 is an operational explanatory view of the second bidirectional rotary link mechanism.

If this second bidirectional rotary link mechanism $X_2$ is adopted, it can be seen that when the said motor link 289 is rotated rightwards by a predetermined angle $\theta$ in FIGS. 57 and 58, the said bidirectional rotary link mechanism $X_2$ will, contrary to the above mentioned first case, be rotated as distorted leftwards. If it is then assumed that the angle of rotation of the said first driven link 287a that is located at an upstream side in the direction of rotation of the said motor link 289 in this case is $\theta_1$ and the angle of rotation of the said second driven link 287b that is located at a downstream is $\theta_2$, it will follow that $\theta_1 > \theta_2$. In this connection it should be noted that the direction of rotation of each of the above mentioned angles $\theta_1$ and $\theta_2$ of the said second bidirectional rotary link mechanism $X_2$ is opposite to the direction for the said first bidirectional rotary link mechanism $X_1$. From this, it will be seen that the said drive shafts 285 and 286 of this second bidirectional rotary mechanism $X_2$ can be coupled with the first and second drive link mechanisms 273 and 274 shown in FIGS. 49 and 50 oppositely to the case where the said first bidirectional rotary link mechanism $X_1$ is adopted. Thus, the said drive shaft 285 that is fastened to the said driven link 287a at an upstream side in the rotary direction towards rightwards of the said motor link 289 is coupled to the said second drive link mechanism 274 of the second robotic link mechanism $C_2$ whereas the said drive shaft 286b that is fastened to the said driven link 287b at a downstream side is coupled to the said first drive link mechanism 273 of the first robotic link mechanism $C_1$.

Figure 59:
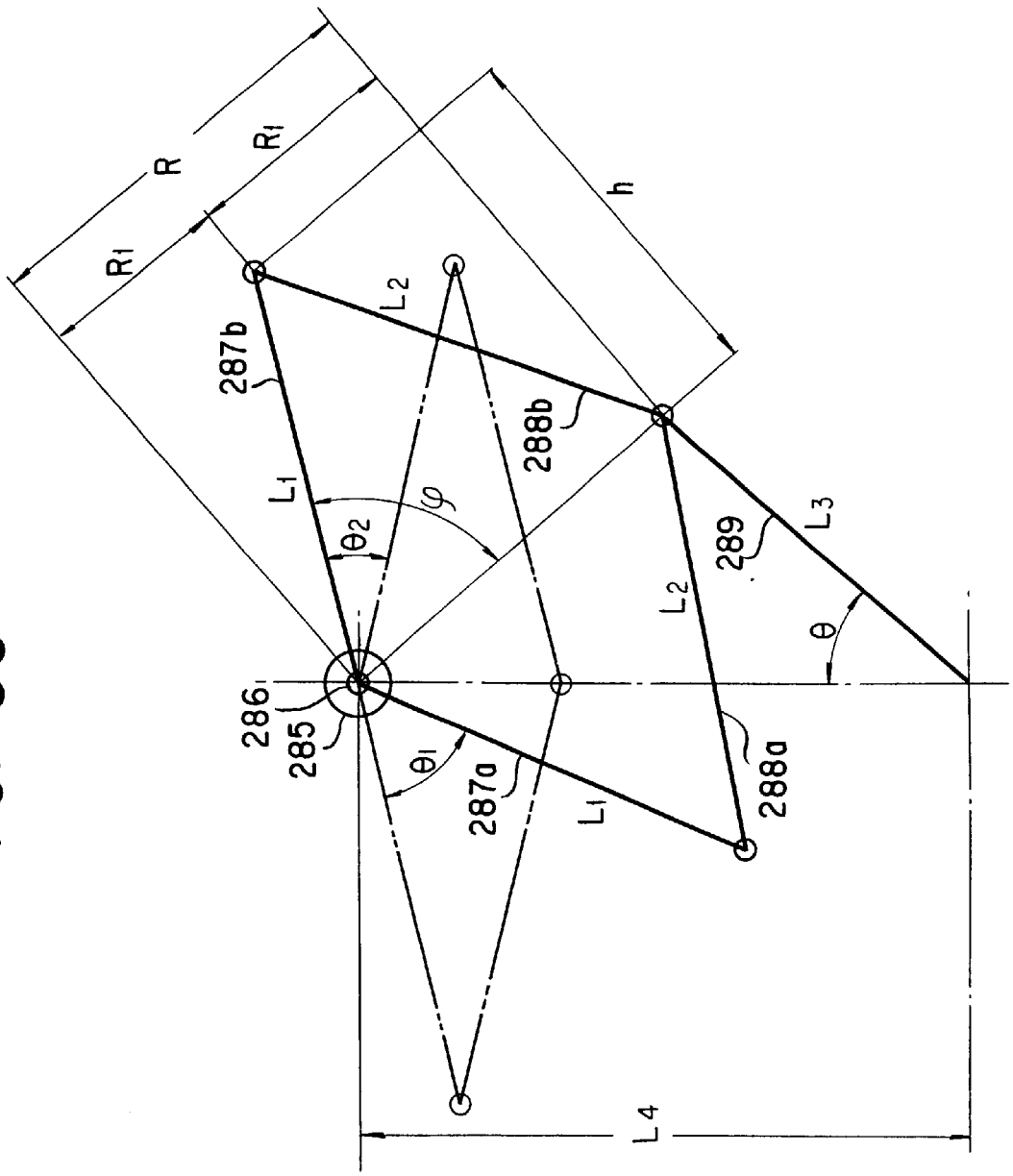

With respect to the said bidirectional rotary link mechanism $X_2$ of the construction shown in FIGS. 57 and 58, an explanation will be given with reference to FIGS. 59 and 60 of the fact that the angle of rotation $\theta_1$ ($\theta_2$) of a said link at an upstream side in the rotary direction is greater than the angle of rotation $\theta_2$ ($\theta_1$) of a said link at a downstream side.

Assuming here that the dimensions of the various constituent members of the said second bidirectional rotary link mechanism $X_2$ are the same as those of the said first bidirectional link mechanism $X_1$, it will follow that the angles $\theta_1$ and $\theta_2$ are expressed by the following equations (3) and (4) and indicated as shown by Table 2 below. It can also be graphed as shown in FIG. 60. In FIG. 60 and Table 2, it is assumed that the rightward rotation of the said motor link 289 is in the plus.

$$\theta_1(\theta) = -\tan^{-1}\frac{L_3\sin\theta}{L_4 - L_3\cos\theta} - (\varphi(0) - \varphi(\theta)) \quad (3)$$

$$= -\tan^{-1}\frac{L_3\sin\theta}{L_4 - L_3\cos\theta} - \cos^{-1}\frac{L_1^2 - L_2^2 + (L_4 - L_3)^2}{2L_1(L_4 - L_3)} +$$

$$\cos^{-1}\frac{L_1^2 - L_2^2 + L_3^2 + L_4^2 - 2L_3L_4\cos\theta}{2L_1\sqrt{L_3^2 + L_4^2 - 2L_3L_4\cos\theta}}$$

-continued $$\theta_2(\theta) = -\tan^{-1}\frac{L_3\sin\theta}{L_4 - L_3\cos\theta} + (\varphi(0) - \varphi(\theta)) \quad (4)$$

$$= -\tan^{-1}\frac{L_3\sin\theta}{L_4 - L_3\cos\theta} + \cos^{-1}\frac{L_1^2 - L_2^2 + (L_4 - L_3)^2}{2L_1(L_4 - L_3)} -$$

$$\cos^{-1}\frac{L_1^2 - L_2^2 + L_3^2 + L_4^2 - 2L_3L_4\cos\theta}{2L_1\sqrt{L_3^2 + L_4^2 - 2L_3L_4\cos\theta}}$$

TABLE 2

| θ | θ 1 | θ 2 |
|---|---|---|
| −60 | 0.00 | 60.00 |
| −30 | 15.50 | 32.09 |
| 0 | 0.00 | 0.00 |
| 30 | −32.09 | −15.50 |
| 60 | −60.00 | 0.00 |

(unit in degree)

Figure 60:
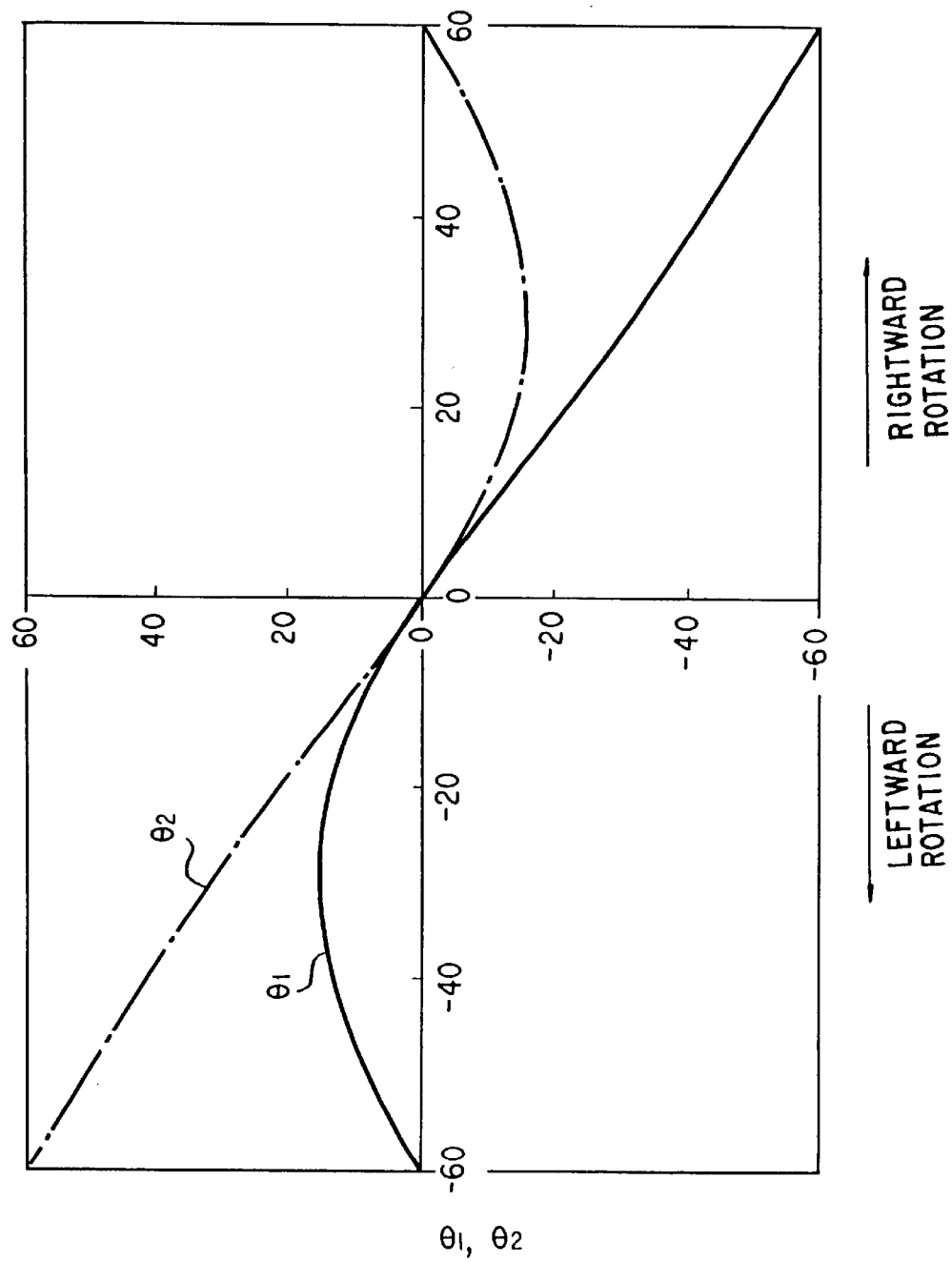
FIG. 60 is a graph showing the changing rotary angles of the first and second drive shafts with respect to the rotary angle of a motor link of the first bidirectional rotary link mechanism.

As will be apparent form the above equations (3) and (4), the graph in FIG. 60 and the Table 2 above, the said first and second drive link mechanisms 273 and 274 that are rotated by the said first and second driven links 287a and 287b which are driven by a rotation of the said motor link 289 will each be rotated by $\theta_1$ in a projecting direction and by $\theta_2$ in a retracting direction, reducing the angle of action in a retracting operation compared with a projecting operation. It should be noted here that the diagram of FIG. 59 is presented applying where $L_1:L_2:L_3:L_4=1:1:1:2$.

Figure 61:
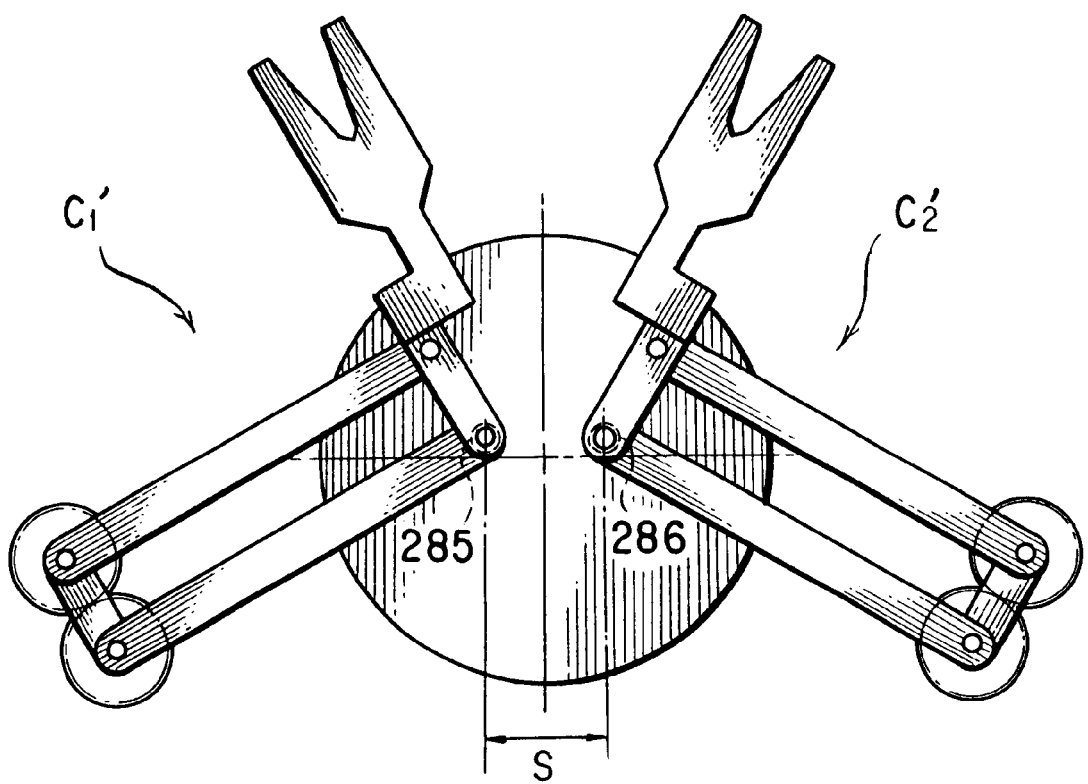
FIG. 61 is a top plan view showing a stand-by state in a modified example of the eighth embodiment of the present invention.

For the said second bidirectional rotary link mechanism $X_2$ of the above mentioned eighth embodiment of the invention, whilst the example has been shown in which the said drive shafts 285 and 286 of the respective drive link mechanisms 273 and 274 of the said first and second robotic link mechanisms $C_1$ and $C_2$ are coaxial, they may be spaced apart from each other by a distance S as shown in FIG. 61.

Figure 62:
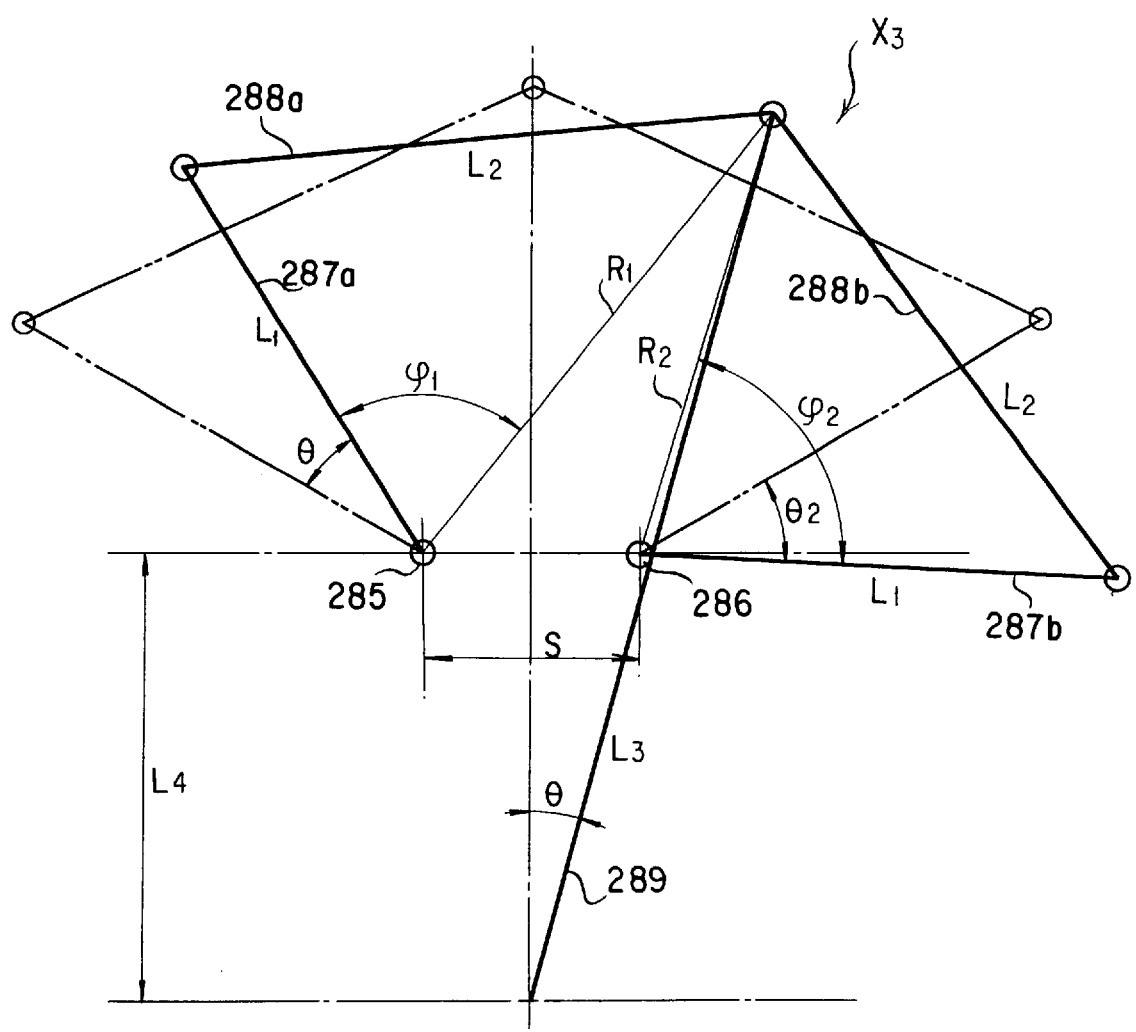

FIG. 62 shows a third bidirectional rotary link mechanism $X_3$ for driving a said pair of first and second robotic link mechanisms $C_1'$ and $C_2'$ when the said drive shafts 285 and 286 are spaced apart from each other. This construction is essentially the same as that of the said first bidirectional rotary link mechanism $X_1$ except that the drive shafts are spaced apart and an explanation of this example will follow that of the above mentioned first bidirectional rotary link mechanism $X_1$.

In FIG. 62, if the said motor link 289 is rotated rightwards by a predetermined angle θ, the said bidirectional rotary link mechanism $X_3$ will be rotated as distorted rightwards. If it is then assumed that the angle of rotation of the said first driven link 287a that is located at an upstream side in the rotary direction is $\theta_1$ and the angle of rotation of the said second driven link 287b that is located at an downstream side is $\theta_2$, the relationship that $\theta_1<\theta_2$ will apply. Also, the said motor link 289 is rotated reversely (i. e. leftwards), it will follow that $\theta_1>\theta_2$.

Referring to FIG. 62, an explanation will now be given of the fact that $\theta_1<\theta_2$ as mentioned above in this case.

Figure 63:
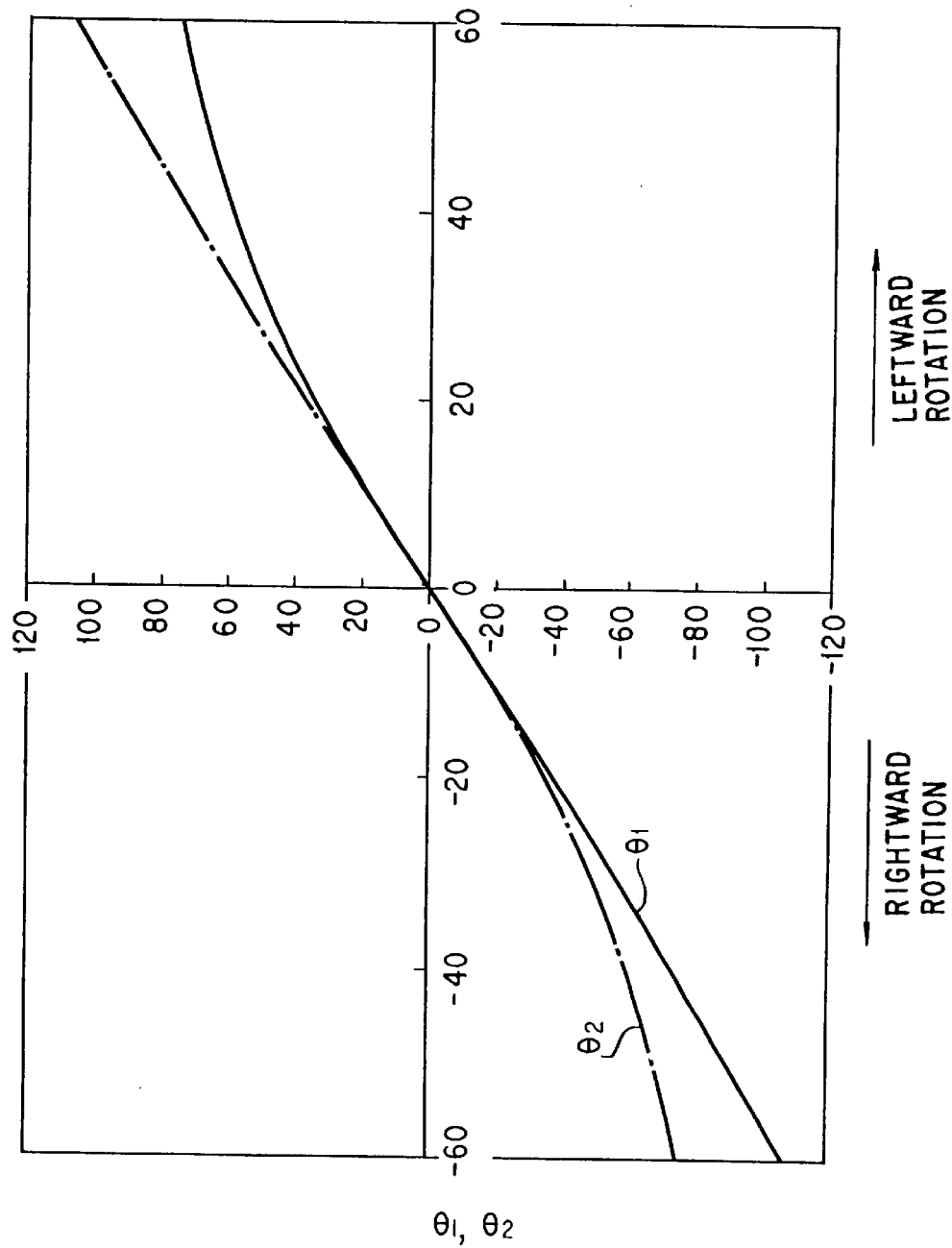
FIG. 63 is a graph showing the changing rotary angles of the first and second drive shafts with respect to the rotary angle of a motor link of the third bidirectional rotary link mechanism.

The respective angles of rotation $\theta_1$ and $\theta_2$ of the said first and second driven links 287a and 287b when the said motor link 289 is rotated rightwards by the angle θ are expressed by the following equations (5) and (6) and, when $L_1=L_2$, are expressed by the equations (7) and (8) below. And, they can be graphed as shown in FIG. 63. In this connection it should be noted that the graph of FIG. 63 applies when $L_1:L_2:L_3:L_4:S=1:1:1.8:0.8:0.2$. And, they can be shown also by Table 3 below.

$$\theta_1 = \tan^{-1}\frac{L_3\sin\theta - D/2}{L_3\cos\theta - L_4} + \tan^{-1}\frac{D/2}{L_3 - L_4} - (\varphi_1(0) - \varphi_1(\theta)) \quad (5)$$

$$\theta_2 = \tan^{-1}\frac{L_3\sin\theta + D/2}{L_3\cos\theta - L_4} - \tan^{-1}\frac{D/2}{L_3 - L_4} + (\varphi_2(0) - \varphi_2(\theta)) \quad (6)$$

$$\theta_1 = \tan^{-1}\frac{L_3\sin\theta - D/2}{L_3\cos\theta - L_4} + \tan^{-1}\frac{D/2}{L_3 - L_4} - \quad (7)$$

$$\cos^{-1}\frac{\sqrt{L_3^2 + L_4^2 + D^2/4 - 2L_3L_4}}{2L_1} +$$

$$\cos^{-1}\frac{\sqrt{L_3^2 + L_4^2 + D^2/4 - DL_3\sin\theta - 2L_3L_4\cos\theta}}{2L_1}$$

$$\theta_2 = \tan^{-1}\frac{L_3\sin\theta + D/2}{L_3\cos\theta - L_4} - \tan^{-1}\frac{D/2}{L_3 - L_4} + \quad (8)$$

$$\cos^{-1}\frac{\sqrt{L_3^2 + L_4^2 + D^2/4 - 2L_3L_4}}{2L_1} -$$

$$\cos^{-1}\frac{\sqrt{L_3^2 + L_4^2 + D^2/4 - DL_3\sin\theta - 2L_3L_4\cos\theta}}{2L_1}$$

TABLE 3

| θ | θ 1 | θ 2 |
|---|---|---|
| −60 | −106.71 | −75.12 |
| −30 | −55.66 | −49.09 |
| 0 | 0.17 | −0.17 |
| 30 | 49.09 | 55.66 |
| 60 | 75.12 | 106.71 |

(unit in degree)

In this example as well, that of the said drive shafts which is largely rotated by a rotation of the said motor link 289 is coupled to that of the said drive link mechanisms 273 and 274 which is operatively projected.

It should be noted that the fourth bidirectional rotary link mechanism $X_4$ has a construction in which the said two drive shafts of the second bidirectional rotary link mechanism $X_2$ are spaced apart from each other.

Figure 64:
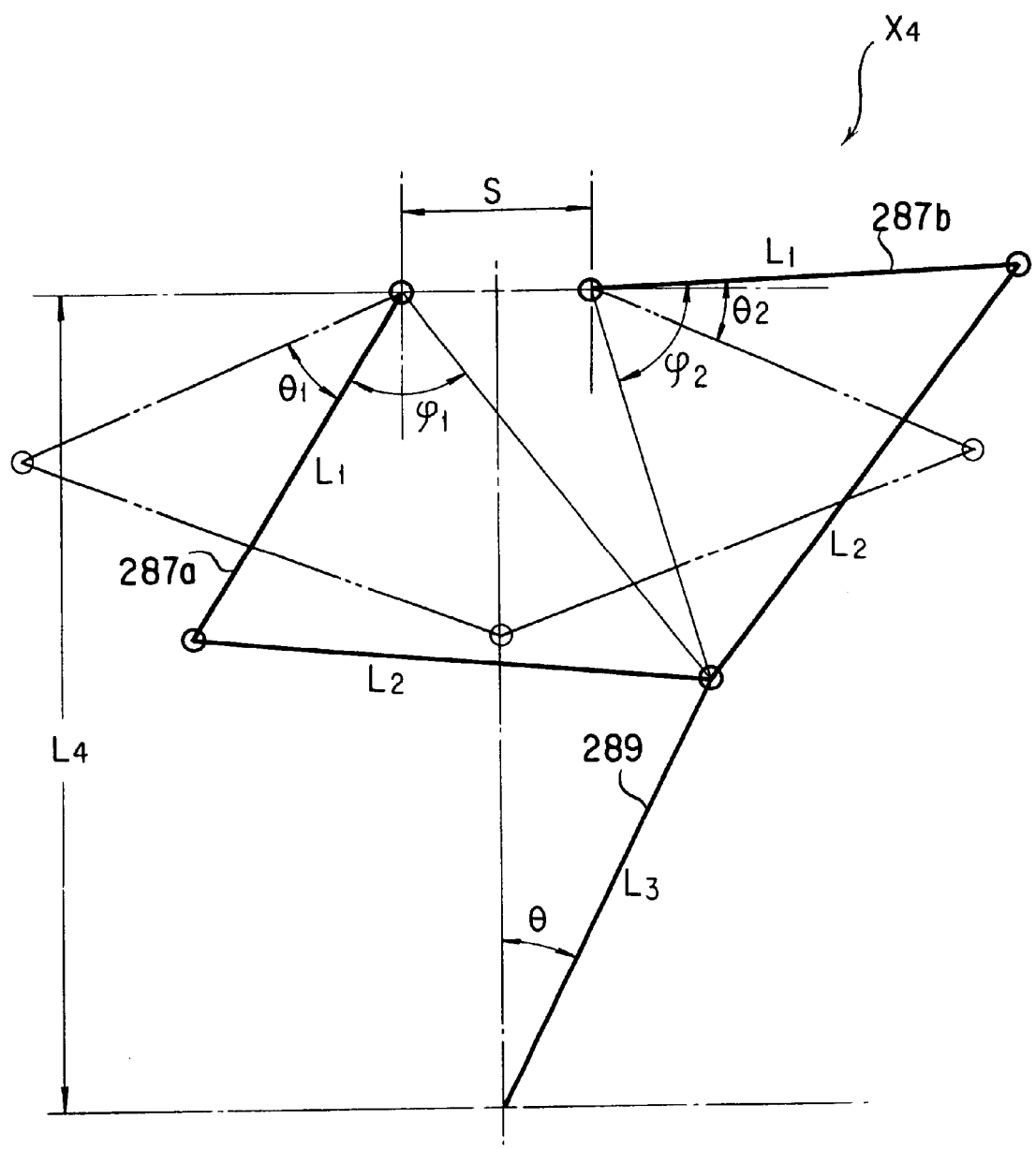

In FIG. 64, if the said motor link 289 is rotated rightwards by a predetermined angle θ, the said bidirectional rotary link mechanism $X_4$ will be rotated as distorted leftwards as shown in FIG. 64. If it is then assumed that the angle of rotation of the said first driven link 287a that is located at an upstream side in the rotary direction of the said motor link 289b is $\theta_1$ and the angle of rotation of the said second driven link 287b that is located at a downstream side is $\theta_2$, the relationship that $\theta_1>\theta_2$ will apply. Also, if the said motor link 289 is rotated reversely (i. e. leftwards), the relationship that $\theta_1<\theta_2$ will apply.

With reference to FIG. 64, an explanation will now be given of the fact that the relationship that $\theta_1<\theta_2$ applies in this case.

Figure 65:
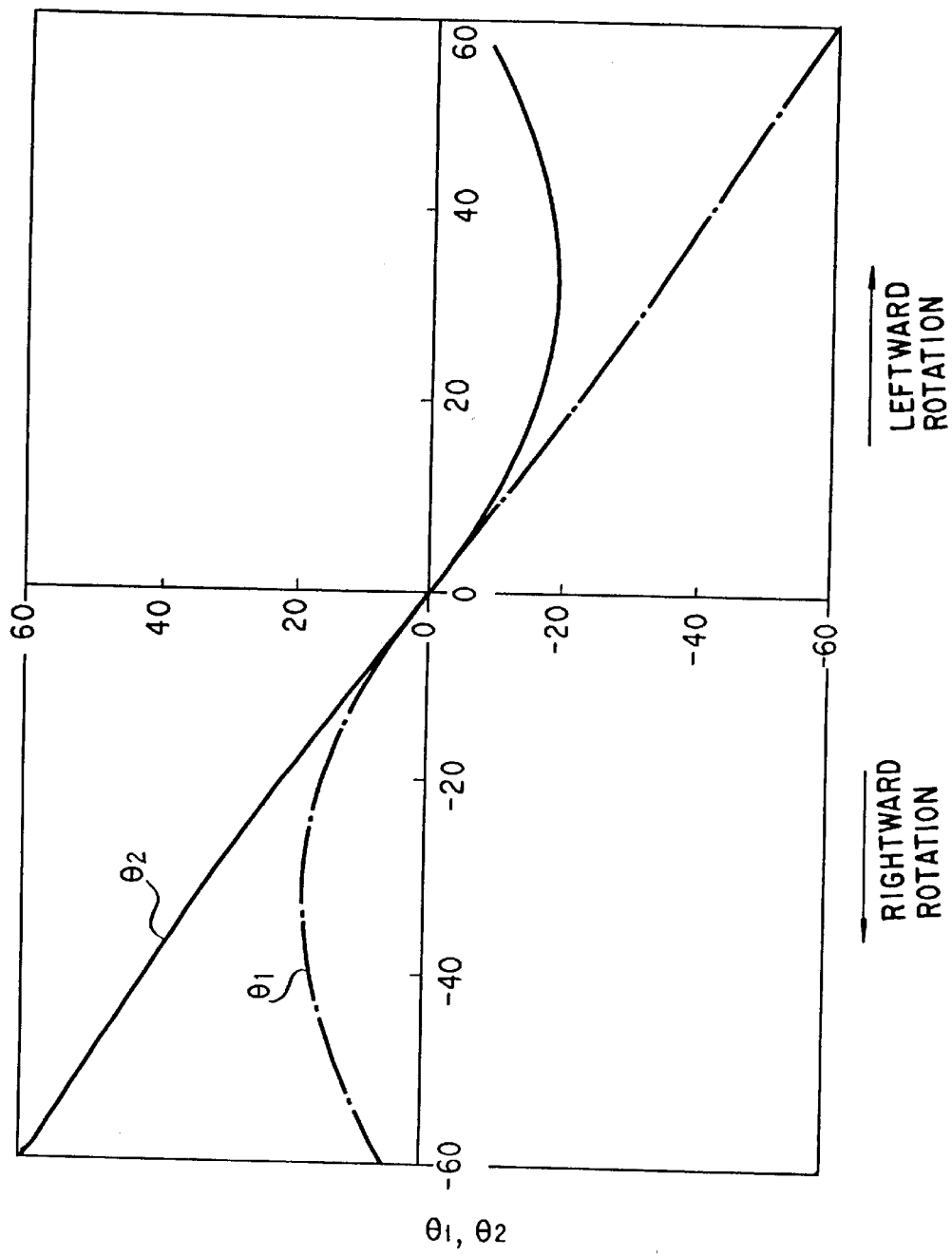
FIG. 65 is a graph showing the changing rotary angles of the first and second drive shafts with respect to the rotary angle of a motor link of the fourth bidirectional rotary link mechanism.

The respective angles of rotation $\theta_1$ and $\theta_2$ of the said first and second driven links 287a and 287b when the said motor link 289 is rotated by the angle θ, are expressed by the following equations (9) and (10) and, when $L_1=L_2$, are expressed by the equations (11) and (12). And, they can be graphed as shown in FIG. 65. In this connection it should be noted that the graph of FIG. 65 applies where $L_1:L_2:L_3:L_4:D=1:1:1:2:0.2$. And, if they are tabulated, Table 4 shows a result.

$$\theta_1 = -\tan^{-1}\frac{L_3\sin\theta + D/2}{L_4 - L_3\cos\theta} + \tan^{-1}\frac{D/2}{L_4 - L_3} - (\varphi_1(0) - \varphi_1(\theta)) \quad (9)$$

$$\theta_2 = -\tan^{-1}\frac{L_3\sin\theta - D/2}{L_4 - L_3\cos\theta} - \tan^{-1}\frac{D/2}{L_4 - L_3} - (\varphi_2(0) - \varphi_2(\theta)) \quad (10)$$

$$\theta_1 = -\tan^{-1}\frac{L_3\sin\theta + D/2}{L_4 - L_3\cos\theta} + \tan^{-1}\frac{D/2}{L_4 - L_3} - \quad (11)$$
$$\cos^{-1}\frac{\sqrt{L_3^2 + L_4^2 + D^2/4 - 2L_3L_4}}{2L_1} +$$
$$\cos^{-1}\frac{\sqrt{L_3^2 + L_4^2 + D^2/4 + DL_3\sin\theta - 2L_3L_4\cos\theta}}{2L_1}$$

$$\theta_2 = -\tan^{-1}\frac{L_3\sin\theta - D/2}{L_4 - L_3\cos\theta} - \tan^{-1}\frac{D/2}{L_4 - L_3} + \quad (12)$$
$$\cos^{-1}\frac{\sqrt{L_3^2 + L_4^2 + D^2/4 - 2L_3L_4}}{2L_1} +$$
$$\cos^{-1}\frac{\sqrt{L_3^2 + L_4^2 + D^2/4 - DL_3\sin\theta - 2L_3L_4\cos\theta}}{2L_1}$$

TABLE 4

| θ   | θ 1    | θ 2    |
| --- | ------ | ------ |
| −60 | 5.72   | 59.86  |
| −30 | 18.50  | 31.76  |
| 0   | 0.17   | −0.17  |
| 30  | −13.76 | −18.50 |
| 60  | −59.86 | −5.72  |

(unit in degree)

In the case of this example, the said first drive shaft that is coupled with the said first driven link 287a is coupled to the drive section of the said first robotic link mechanism $C_1'$ shown in FIG. 52 whereas the said second drive shaft that is coupled with the said second driven link 287b is coupled to the drive section of the said second robotic link mechanism $C_2'$.

Whilst each of the above mentioned first, second, third and fourth bidirectional rotary link mechanism $X_1$, $X_2$, $X_3$ and $X_4$ has been explained in connection with an example in which it makes use of a link mechanism, it should be noted that it may make use of a elliptical gear mechanism in another example.

Figure 66:
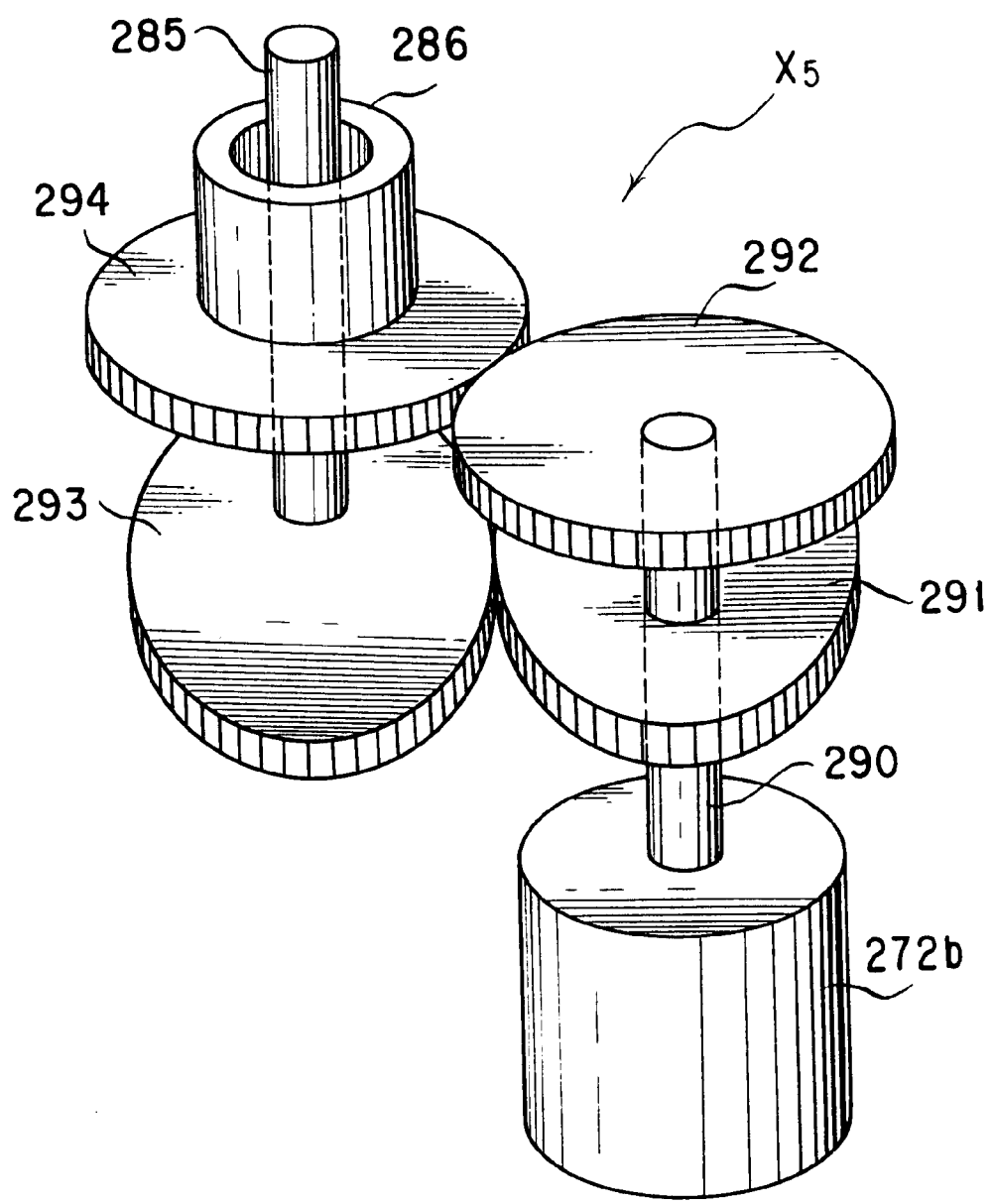
FIG. 66 is a perspective view showing a fifth bidirectional rotary link mechanism.

FIG. 66 shows a fifth bidirectional rotary link mechanism $X_5$ which constitutes the latter example.

A first elliptical gear 291 and a first circular gear 292 are fastened to an output shaft 290 of a said second motor unit 272b. A second elliptical gear 293 which meshes with the above mentioned first elliptical gear 291 and a second circular gear 294 which meshes with the above mentioned first circular gear 292 are both fastened to the one drive shaft 285 and another drive shaft 286 of the said drive shafts which are disposed coaxially in the said first and second robotic link mechanisms, respectively. The said elliptical gears 291 and 293 are fastened to the said shafts 285 and 290, respectively.

Figure 67:
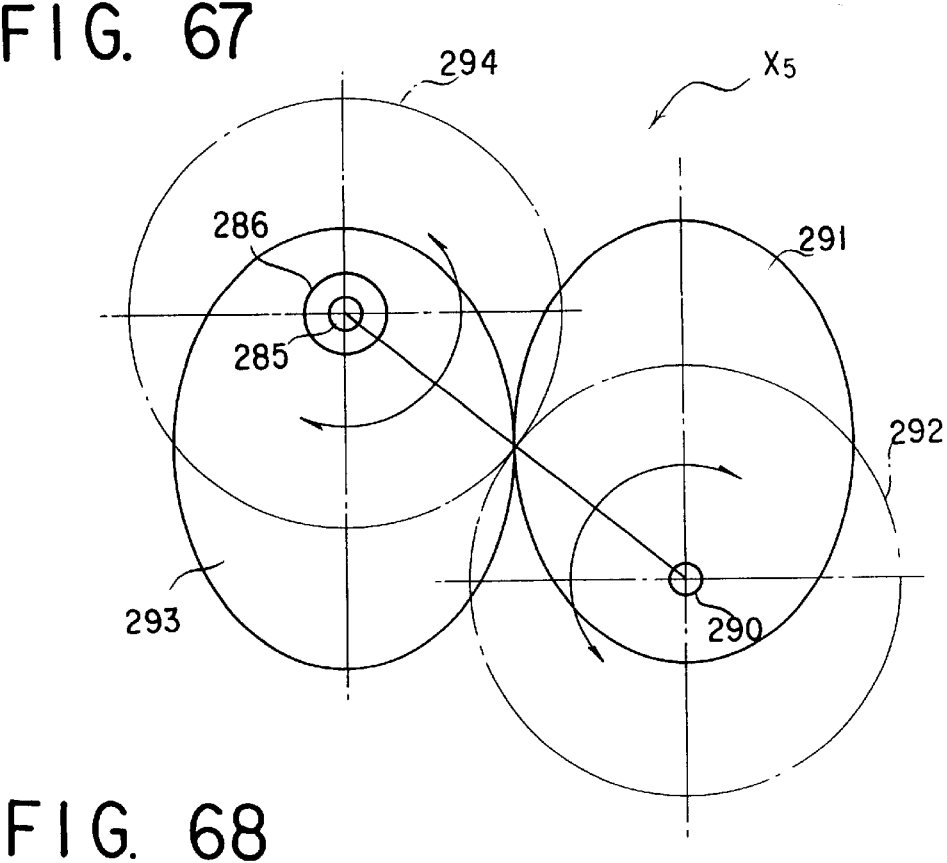
FIG. 67 is an explanatory view showing a stand-by state of the fifth bidirectional rotary link mechanism.
Figure 68:
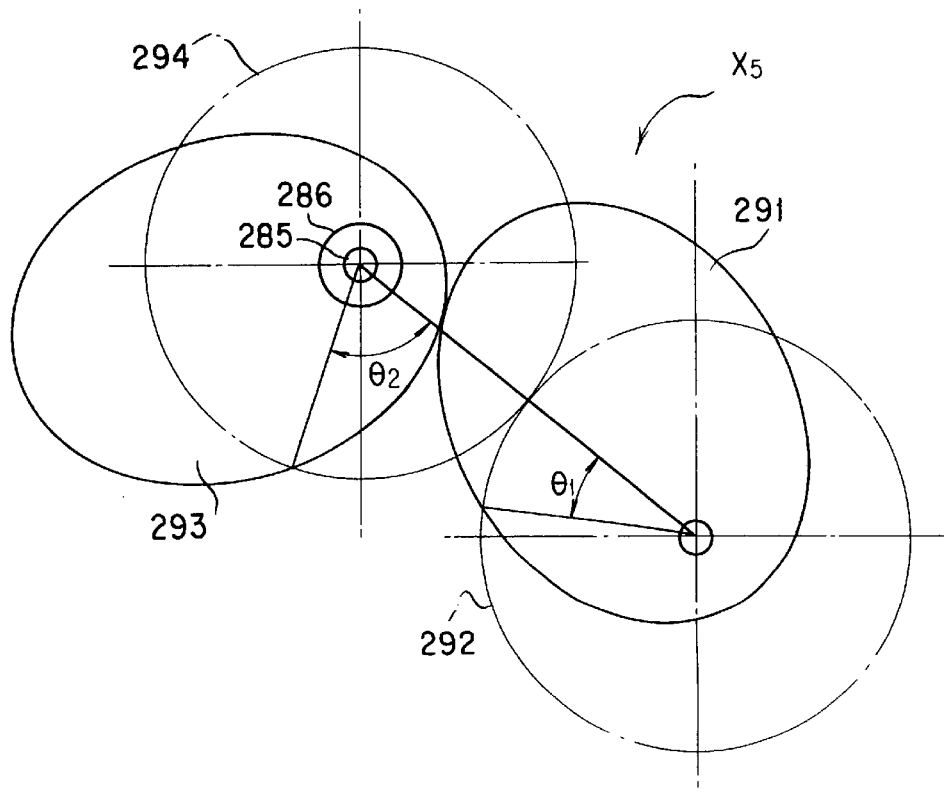
FIG. 68 is an explanatory view showing an operating state of the fifth bidirectional rotary link mechanism.

In this construction, if the said rotary shaft 290 of the second motor unit 272b is rotated, for example, from a neutral state as shown in FIG. 67 leftwards by an angle θ1 as shown in FIG. 68, the said second elliptical gear 293 will be rotated rightwards by an angle $\theta_2$. Then, the oppositely disposed attitudes of the said two elliptical gears 291 and 293 will meet the relationship that $\theta_1 < \theta_2$. On the other hand, the angle of rotation of the said second circular gear 294 is $\theta_1$. This will cause the said first drive shaft 285 and the said second drive shaft 286 to be rotated rightwards by $\theta_2$ and $\theta_1$, respectively. With the relationship that $\theta_1 < \theta_2$, the said first drive shaft 285 will be rotated more than the said second drive shaft 286.

On the other hand, if the said rotary shaft 290 is rotated from the said neutral state as shown in FIG. 67 rightwards by the angle $\theta_1$, likewise the above the said second elliptical gear 293 will be rotated leftwards by the angle $\theta_2$ and the said second circular gear 294 will be rotated leftwards by the angle $\theta_1$. Then, the oppositely disposed attitudes of the said two elliptical gears 291 and 293 will meet the relationship that $\theta_1 > \theta_2$. Consequently, now in order for the angle of rotation of the said second drive shaft 286 to be $\theta_2$ leftwards and for the angle of rotation of the said first drive shaft 285 to be $\theta_1$ ($\theta_2 > \theta_1$), the said rotary shaft 290 will be rotated rightwards by the angle $\theta_2$ that is greater than that of the above. This will cause the said second elliptical gear 293 to be rotated leftwards by the angle $\theta_1$ whilst causing the said second circular gear 294 to be rotated leftwards by the angle $\theta_2$. From this, it can be seen that by rotating the said second motor unit 272b rightwards by the angle $\theta_2$, the said first and second drive shafts 285 and 286 will be rotated leftwards by the angles $\theta_1$ and $\theta_2$, respectively and that with the relationship that $\theta_1 < \theta_2$, the said second drive shaft 286 will be rotated more than the said first drive shaft 285.

Accordingly, in case the above mentioned first and second drive shafts 285 and 286 have coupled, respectively, the said first robotic link mechanism $C_1$ and the said second robotic mechanism $C_2$ shown in FIG. 49 thereto, it can be seen that when the said first robotic link mechanism $C_1$ is operatively projected and the said second robotic link mechanism $C_2$ is operatively retracted, the said second motor unit 272b will be rotated leftwards by the angle $\theta_1$ and that they are conversely operated, it will be rotated rightwards by the angle $\theta_2$.

Figure 69:
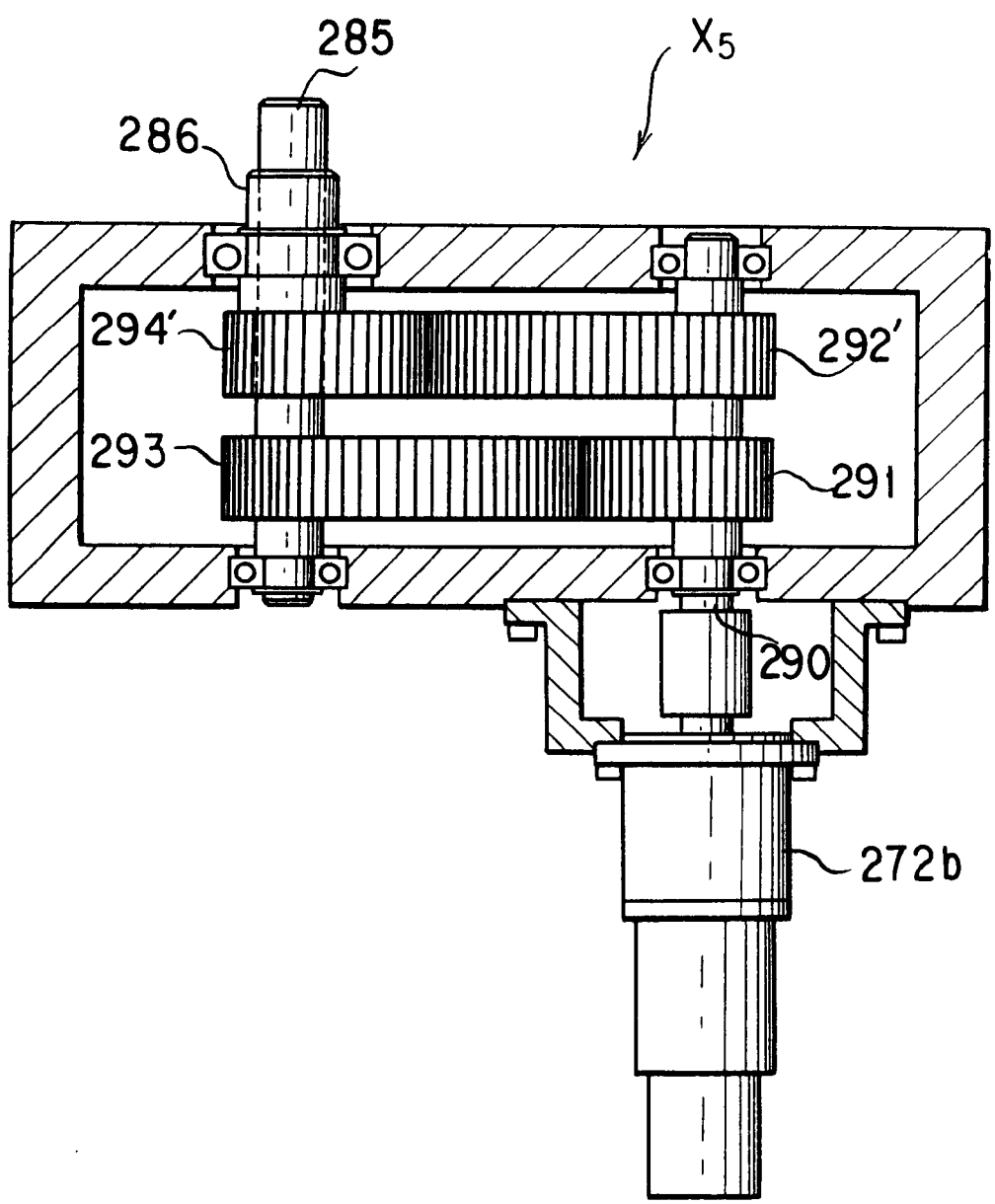
FIG. 69 is a cross sectional view showing another example of the fifth bidirectional rotary link mechanism.
Figure 70:
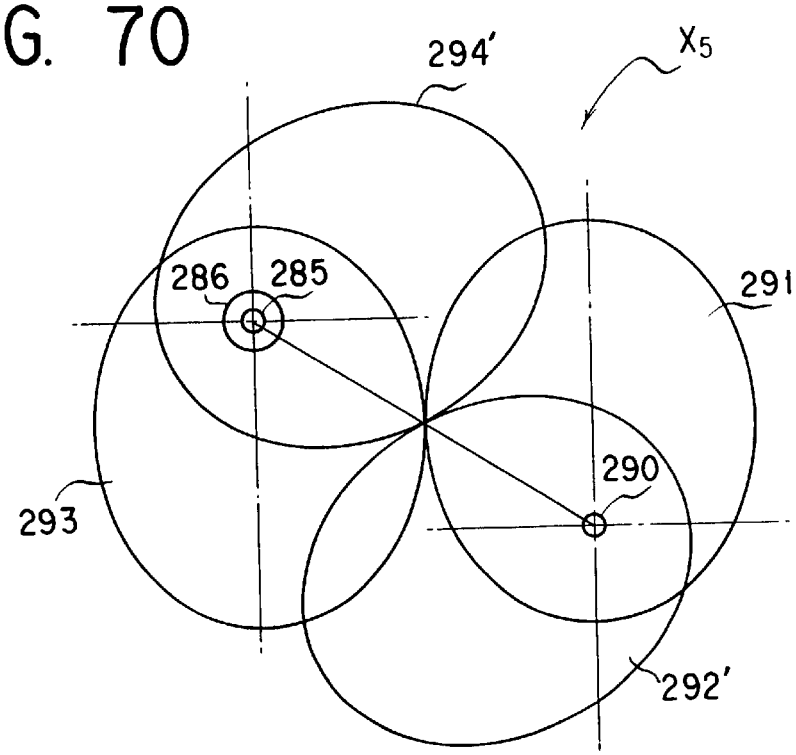
FIG. 70 is an explanatory view showing a stand-by state of the other example of the fifth bidirectional rotary link mechanism.

Whilst the above mentioned fifth bidirectional rotary link mechanism $X_5$ is constructed by a combination of elliptical gears and circular gears, it should be noted that the said circular gears 292 and 294 may be replaced by a pair of elliptical gears 292' and 294' which mesh with each other as shown in FIGS. 69 and 70.

Figure 71:
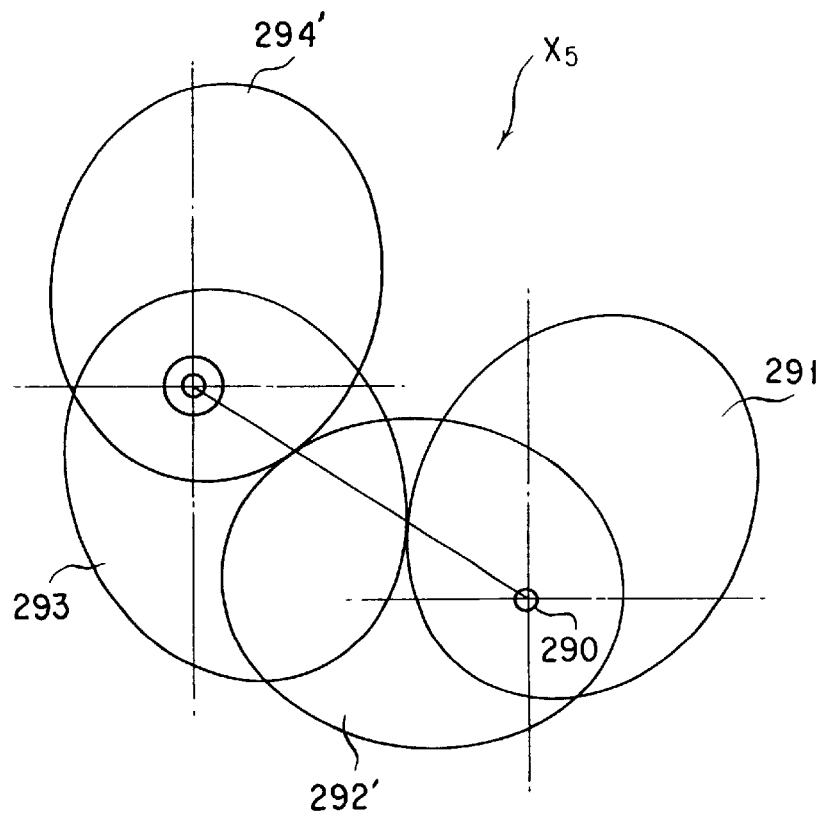
FIG. 71 is an explanatory view showing an operating state of the fifth bidirectional rotary link mechanism.

FIG. 71 shows an operational state in that case. Here it should be noted that the angle of rotation of the said first drive shaft 285 when the said motor unit 272b is rotated from its neutral state by a certain angle will be made equal to the angle of rotation of the said second drive shaft 286 when the said motor unit 272b is rotated reversely by the same angle and that an identical computing method may be employed for controlling the said first and second robotic link mechanisms $C_1$ and $C_2$ only with different symbols and they are made more readily controllable thereby.

(A Ninth Embodiment)

Whilst the said drive link mechanisms and the said driven link mechanisms of the said first and second robotic link mechanisms $C_1$ and $C_2$; $C_1'$ and $C_2'$ in the above mentioned seventh and eighth embodiments are each comprised of a parallel link mechanism, such a pair of parallel link mechanisms may be alternatively replaced by a belt link construction.

FIG. 72 shows one robotic link mechanism D, which comprises: a first arm 301 that is rotatably supported by a rotary table (not shown); a second arm 302 that is rotatably coupled to the forward end of the said first arm 301; a transfer table 303 that is rotatably coupled to a forward end portion of the said second arm 302; a first pulley 304 that is supported at a rotary base portion of the above mentioned first arm 301 coaxially therewith; a second pulley 306 that is supported in the said first arm 301 by being coupled to a portion for coupling the said first and second arms 301 and 302 together, coaxially with the centers of rotation thereof and at a shaft 305; a third pulley 307 that is supported in the said second arm 302; a fourth pulley 309 that is supported so as to be fastened to a rotary shaft 308 of the above mentioned transfer table 303 at a forward end portion of the said second arm 302; a first belt 310 that is wound on the above mentioned first and second pulleys 304 and 306; and a second belt 311 that is wound on the said third and fourth pulley 307 and 309.

And, the said rotary base portion of the first arm 301 is coupled to a first motor unit 315 via a driven pulley 312, a drive pulley 313 and a belt 314 whereas the said first pulley 304 has a shaft 316 that is coupled to a second motor unit 317. The ratio in diameter of the above mentioned first and second pulleys 304 and 306 is set to be 2:1, and the ratio in diameter of the said third and fourth pulleys 307 and 309 is set to be 1:2.

In the construction mentioned above, if in a state in which the said second motor unit 317 is halted, the said first motor unit 315 is driven to rotate the said first arm 301 in a direction, the said first pulley 304 will be brought into a state in which it is reversely rotated with a same angle of rotation relative to the said first arm 301. The angle of rotation of the said first pulley 304 will be transmitted to the second pulley 306 via the first belt 310 as double increased in speed so that the said second arm 302 may be rotated in a direction opposite to a rotary direction of the first arm 301 with a rotary angle two times greater than a rotary angle thereof. Then, the said third pulley 307 that is located at the rotary base side of the said second arm 302 will, like the above mentioned first pulley 304, be relatively rotated in the direction opposite to the rotary direction of the said second arm 302, this causing the said transfer table 303 to be rotated in a direction opposite to the rotary direction of the said second arm 302 and with a ½ angle of rotation.

A rotary operation of normal or reverse rotation by the above mentioned first motor unit 315 of the said transfer table 303 will cause it to be operatively projected and retracted radially thereof relative to the said rotary base portion of the first arm 301. And, by rotating the said first and second motor units 315 and 317 in an identical direction with an identical angle of rotation, the entire robotic link mechanism D aforesaid will be rotated.

With regard to the present embodiment, whilst an explanation has been given to one of the robotic link mechanism only, actually a pair of such robotic link mechanisms are used as in the previously mentioned embodiments and they are cooperated so that when one of the said transfer tables is operatively projected, the other transfer table may be operatively retracted.

Also in this embodiment, whilst a pair of motor units are shown as employed, one for the projecting and retracting operations and the other for the rotations, it should be noted that anyone of the said bidirectional rotary link mechanisms $X_1$, $X_2$, $X_3$, $X_4$ and $X_5$ in the above seventh embodiment may be used as coupled to the drive shaft of each of the respective drive shafts of such first arms of the said pair of robotic link mechanisms. In this way, the distances of the operative projection and retraction as needed for operatively projecting and retracting the said transfer tables can be reduced.

While the present invention has hereinbefore been described with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all equivalents thereof.

What is claimed is:

1. A handling robot comprising:
    a plurality of coaxial bosses, wherein at least two of said bosses are capable of rotating independent of each other;
    a drive source connected to each of said plurality of bosses;
    a first robotic link mechanism including:
        a first pair of arms, each of said first pair of arms having a forward end and being connected to a separate one of said bosses;
        a first pair of links, each of said first pair of links having a forward end and a coupled end, said coupled end of each of said first pair of links being coupled to a respective forward end of said first pair of arms; and
        a first transfer table coupled to said forward end of each of said first pair of links, wherein said first robotic link mechanism is operable to project and retract said first transfer table in a radial direction with respect to said bosses;
    a second robotic link mechanism including:
        a second pair of arms, each of said second pair of arms having a forward end and being connected to a separate one of said bosses, wherein at least one of said second pair of arms is connected to one of said bosses having one of said first pair of arms connected thereto;
        a second pair of links, each of said second pair of links having a forward end and a coupled end, said coupled end of each of said second pair of links being coupled to a respective forward end of said second pair of arms; and
        a second transfer table coupled to said forward end of each of said second pair of links, wherein said second robotic link mechanism is operable to project and retract said second transfer table in a radial direction with respect to said bosses; and
    wherein said first robotic link mechanism and said second robotic link mechanism are capable of being jointly rotated, and wherein said first robotic link mechanism and said second robotic link mechanism are arranged such that an angular position of said first robotic link mechanism with respect to a circumference of said bosses is separated from an angular position of said second robotic link mechanism with respect to said circumference of said bosses.

2. The robot of claim 1, wherein said angular position of said first robotic link mechanism is separated from said angular position of second robotic link mechanism by no more than 90 degrees with respect to said circumference of said bosses.

3. The robot of claim 1, wherein said first transfer table and said second transfer table have an identical vertical position.

4. The robot of claim 1, wherein said plurality of bosses comprises a first boss, a second boss, and a third boss, said first pair of arms including a first arm and a second arm, said second pair of arms including a third arm and a fourth arm, said first arm being connected to said first boss, said second arm and said third arm being connected to said second boss, and said fourth arm being connected to said third boss.

5. The robot of claim 1, wherein said plurality of bosses comprises a first boss and a second boss, said first pair of arms including a first arm and a second arm, said second pair of arms including a third arm and a fourth arm, said first arm and said fourth arm being connected to said first boss, and said second arm and said third arm being connected to said second boss.

6. The robot of claim 5, wherein said first arm and said fourth arm extend radially from a side surface of said first boss at diametrically opposite locations on said first boss, said second arm and said third arm extending radially in diametrically opposite directions with respect to said second boss, said second arm extending from a side surface of said second boss and said third arm extending from a vertical leg column located on a top surface of said second boss.

7. The robot of claim 5, wherein said first arm and said fourth arm extend radially from a side surface of said first boss at diametrically opposite locations on said first boss, said second arm and said third arm extending radially from a side surface of said second boss at diametrically opposite locations on said second boss.

8. A handling robot comprising:
a plurality of coaxial bosses, wherein at least two of said bosses are capable of rotating independent of each other;
a drive source connected to each of said plurality of bosses;
a first robotic link mechanism including:
a first pair of arms, each of said first pair of arms having a forward end and being connected to a separate one of said bosses;
a first pair of links, each of said first pair of links having a forward end and a coupled end, said coupled end of each of said first pair of links being coupled to a respective forward end of said first pair of arms; and
a first transfer table coupled to said forward end of each of said first pair of links, wherein said first robotic link mechanism is operable to project and retract said first transfer table in a radial direction with respect to said bosses;
a second robotic link mechanism including:
a second pair of arms, each of said second pair of arms having a forward end and being connected to a separate one of said bosses, wherein at least one of said second pair of arms is connected to one of said bosses having one of said first pair of arms connected thereto;
a second pair of links, each of said second pair of links having a forward end and a coupled end, said coupled end of each of said second pair of links being coupled to a respective forward end of said second pair of arms; and
a second transfer table coupled to said forward end of each of said second pair of links, wherein said second robotic link mechanism is operable to project and retract said second transfer table in a radial direction with respect to said bosses; and
wherein said first robotic link mechanism and said second robotic link mechanism are capable of being jointly rotated, and wherein said plurality of bosses comprises a first boss, a second boss, and a third boss, said first pair of arms including a first arm and a second arm, said second pair of arms including a third arm and a fourth arm, said first arm being connected to said first boss, said second arm and said third arm being connected to said second boss, and said fourth arm being connected to said third boss.

9. The robot of claim 8, wherein said first robotic link mechanism and said second robotic link mechanism are arranged such that one of said first transfer table and said second transfer table can be positioned above the other.

10. The robot of claim 8, wherein said first arm extends radially from a side surface of said first boss, said second arm and said third arm extending radially from a side surface of said second boss at diametrically opposite locations on said second boss, and said fourth arm extending radially from a side surface of said third boss.

11. The robot of claim 10, wherein said first robotic link mechanism and said second robotic link mechanism are arranged such that one of said first transfer table and said second transfer table can be positioned above the other.

12. The robot of claim 10, wherein said first robotic link mechanism and said second robotic link mechanism are arranged such that an angular position of said first robotic link mechanism with respect to a circumference of said bosses is separated from an angular position of said second robotic link mechanism with respect to said circumference of said bosses.

13. A handling robot comprising:
a rotary table;
a first drive source connected to said rotary table for rotating said rotary table;
a first robotic link mechanism including:
a first drive link mechanism having a forward end and a drive end and being supported by said rotary table so as to be capable of rotating;
a first driven link mechanism having a forward end and a coupled end, said coupled end being coupled to said forward end of said first drive link mechanism such that said first driven link mechanism is capable of rotating in synchronism with a rotation of said first drive link mechanism; and
a first transfer table coupled to said forward end of said first driven link mechanism, wherein said first robotic link mechanism is operable to project and retract said first transfer table in a radial direction with respect to said rotary table;
a second robotic link mechanism including:
a second drive link mechanism having a forward end and a drive end and being supported by said rotary table so as to be capable of rotating;
a second driven link mechanism having a forward end and a coupled end, said coupled end being coupled to said forward end of said second drive link mechanism such that said second driven link mechanism is capable of rotating in synchronism with a rotation of said second drive link mechanism; and
a second transfer table coupled to said forward end of said second driven link mechanism, wherein said second robotic link mechanism is operable to project and retract said second transfer table in a radial direction with respect to said rotary table;
a second drive source connected to said drive end of said first drive link mechanism and said drive end of said second drive link mechanism for rotating said first drive link mechanism and said second drive link mechanism; and
wherein said first robotic link mechanism and said second robotic link mechanism are capable of being jointly rotated, and wherein said first robotic link mechanism and said second robotic link mechanism are arranged such that an angular location of said first robotic link mechanism with respect to a circumference of said rotary table is separated from an angular position of said second robotic link mechanism with respect to said circumference of said rotary table.

14. The robot of claim 13, wherein at least one of said first drive link mechanism, said first driven link mechanism, said second drive link mechanism, and said second driven link mechanism comprises a pair of parallel links.

15. The robot of claim 13, wherein at least one of said first drive link mechanism, said first driven link mechanism, said second drive mechanism, and said second driven link mechanism comprises a belt mechanism.

16. A handling robot comprising:
   a rotary table;
   a first drive source connected to said rotary table for rotating said rotary table;
   a first robotic link mechanism including:
      a first drive link mechanism having a forward end and a drive end and being supported by said rotary table so as to be capable of rotating;
      a first driven link mechanism having a forward end and a coupled end, said coupled end being coupled to said forward end of said first drive link mechanism such that said first driven link mechanism is capable of rotating in synchronism with a rotation of said first drive link mechanism; and
      a first transfer table coupled to said forward end of said first driven link mechanism, wherein said first robotic link mechanism is operable to project and retract said first transfer table in a radial direction with respect to said rotary table;
   a second robotic link mechanism including:
      a second drive link mechanism having a forward end and a drive end and being supported by said rotary table so as to be capable of rotating;
      a second driven link mechanism having a forward end and a coupled end, said coupled end being coupled to said forward end of said second drive link mechanism such that said second driven link mechanism is capable of rotating in synchronism with a rotation of said second drive link mechanism; and
      a second transfer table coupled to said forward end of said second driven link mechanism, wherein said second robotic link mechanism is operable to project and retract said second transfer table in a radial direction with respect to said rotary table;
   a second drive source connected to said drive end of said first drive link mechanism and said drive end of said second drive link mechanism for rotating said first drive link mechanism and said second drive link mechanism; and
   wherein said first robotic link mechanism and said second robotic link mechanism are capable of being jointly rotated, and wherein said first transfer table and said second transfer table have an identical vertical position.

* * * * *